(12) United States Patent
Iwaki et al.

(10) Patent No.: US 7,656,508 B2
(45) Date of Patent: Feb. 2, 2010

(54) DISTANCE MEASURING APPARATUS, DISTANCE MEASURING METHOD, AND COMPUTER PROGRAM PRODUCT

(75) Inventors: Hidekazu Iwaki, Hachioji (JP); Akio Kosaka, Hachioji (JP); Takashi Miyoshi, Atsugi (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/985,991

(22) Filed: Nov. 19, 2007

(65) Prior Publication Data
US 2008/0079954 A1   Apr. 3, 2008

Related U.S. Application Data

(63) Continuation of application No. PCT/JP2006/309664, filed on May 15, 2006.

(30) Foreign Application Priority Data

| May 19, 2005 | (JP) | ............................. 2005-147174 |
| May 19, 2005 | (JP) | ............................. 2005-147175 |
| May 19, 2005 | (JP) | ............................. 2005-147231 |
| May 19, 2005 | (JP) | ............................. 2005-147232 |
| Jul. 19, 2005 | (JP) | ............................. 2005-209087 |

(51) Int. Cl.
*G01C 3/08* (2006.01)

(52) U.S. Cl. .................................................... 356/4.03

(58) Field of Classification Search ........ 356/3.01–28.5
See application file for complete search history.

(56) References Cited

U.S. PATENT DOCUMENTS 5,828,443 A * 10/1998 Fujioka et al. ............. 356/5.08

| 6,181,271 | B1 | 1/2001 | Hosaka et al. |
| 6,408,247 | B1 | 6/2002 | Ichikawa et al. |
| 6,590,521 | B1 * | 7/2003 | Saka et al. ..................... 342/70 |
| 6,823,261 | B2 | 11/2004 | Sekiguchi |
| 6,888,622 | B2 * | 5/2005 | Shimomura ................ 356/4.01 |
| 2001/0031068 | A1 | 10/2001 | Ohta et al. |
| 2006/0132752 | A1 * | 6/2006 | Kane ......................... 356/5.02 |

FOREIGN PATENT DOCUMENTS

| JP | 63-46363 B2 | 9/1988 |
| JP | 63-43172 Y2 | 11/1988 |
| JP | 2-39275 A | 2/1990 |
| JP | 6-230115 A | 8/1994 |
| JP | 6-275104 A | 9/1994 |
| JP | 8-171151 A | 7/1996 |
| JP | 10-186033 A | 7/1998 |
| JP | 2000-266539 A | 9/2000 |
| JP | 2000-329852 A | 11/2000 |
| JP | 2004-85337 A | 3/2004 |

\* cited by examiner

*Primary Examiner*—Thomas H Tarcza
*Assistant Examiner*—Luke D Ratcliffe
(74) *Attorney, Agent, or Firm*—Frishauf, Holtz, Goodman & Chick, P.C.

(57) ABSTRACT

A distance measuring apparatus includes a detecting unit which detects a distance to an object located in a predetermined detection range; an imaging unit which generates an image signal group corresponding to a predetermined imaging field; a calculating unit which calculates the distance to the object located in the imaging field based on the image signal group; and an interpolating unit which either interpolates a detection result by the detecting unit by using a calculation result by the calculating unit, or interpolates the calculation result by the calculating unit by using the detection result by the detecting unit.

4 Claims, 42 Drawing Sheets

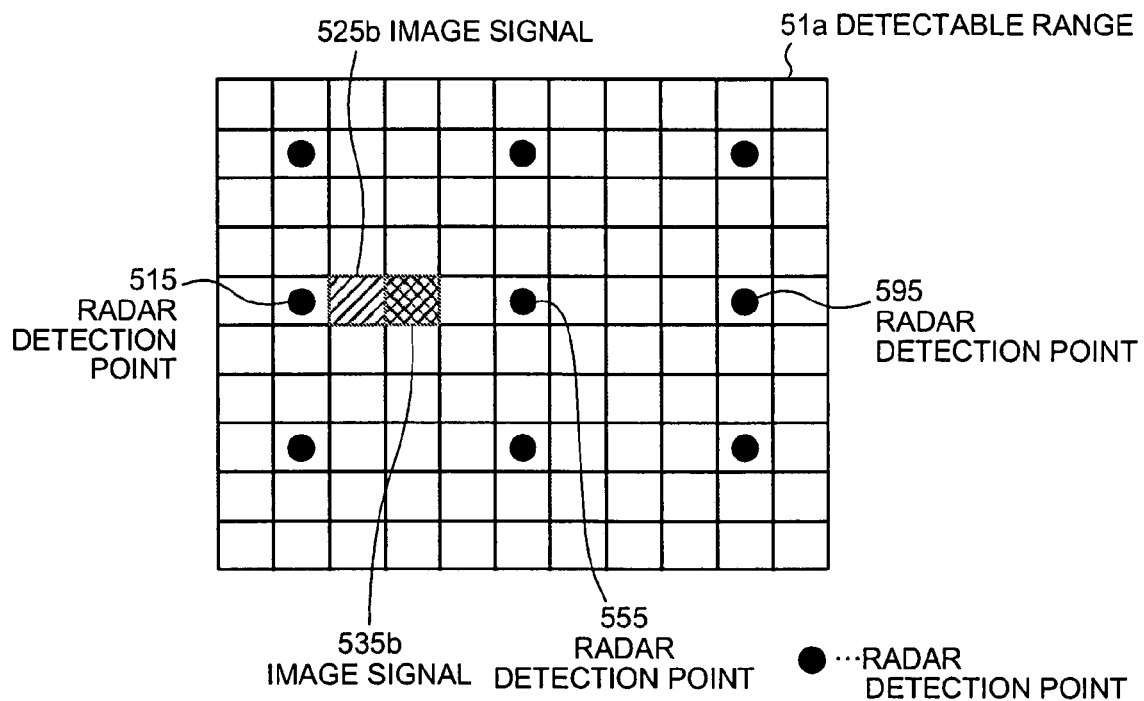
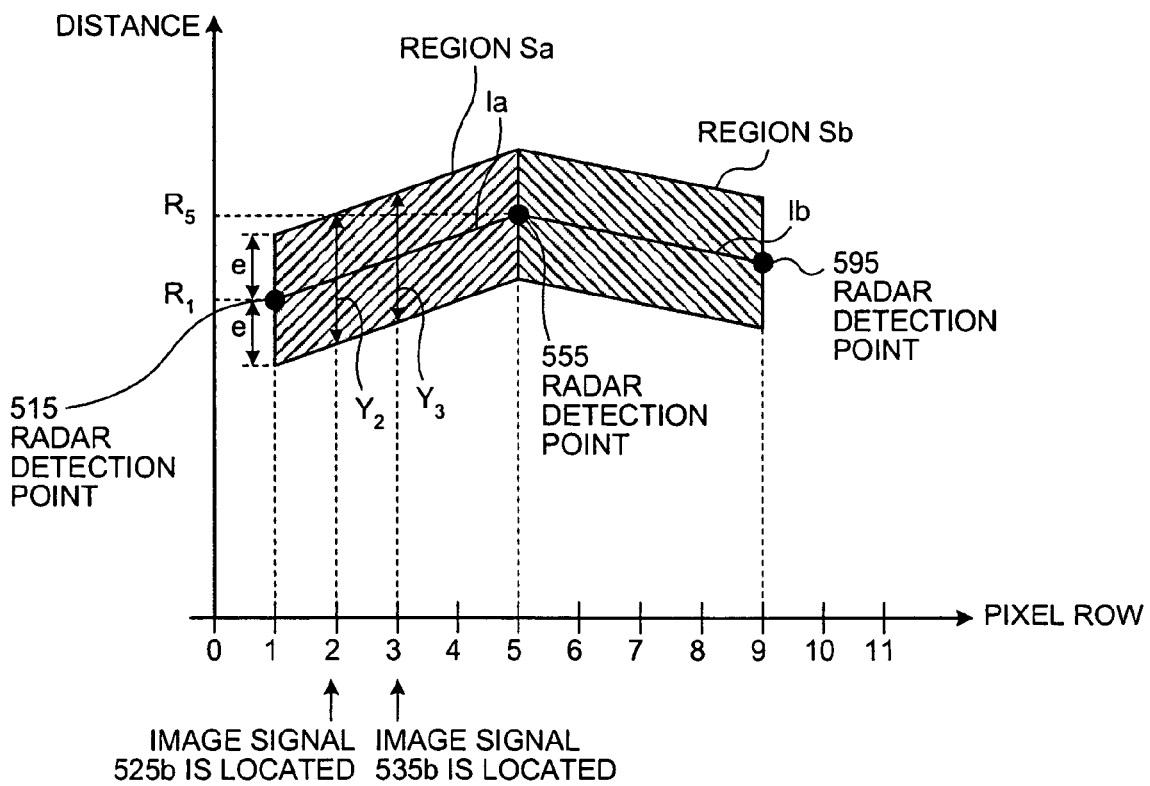

525b IMAGE SIGNAL
16b LEFT IMAGE SIGNAL GROUP
REGION $S_{11}$
16a RIGHT IMAGE SIGNAL GROUP

535b IMAGE SIGNAL
16b
REGION $S_{22}$
16a

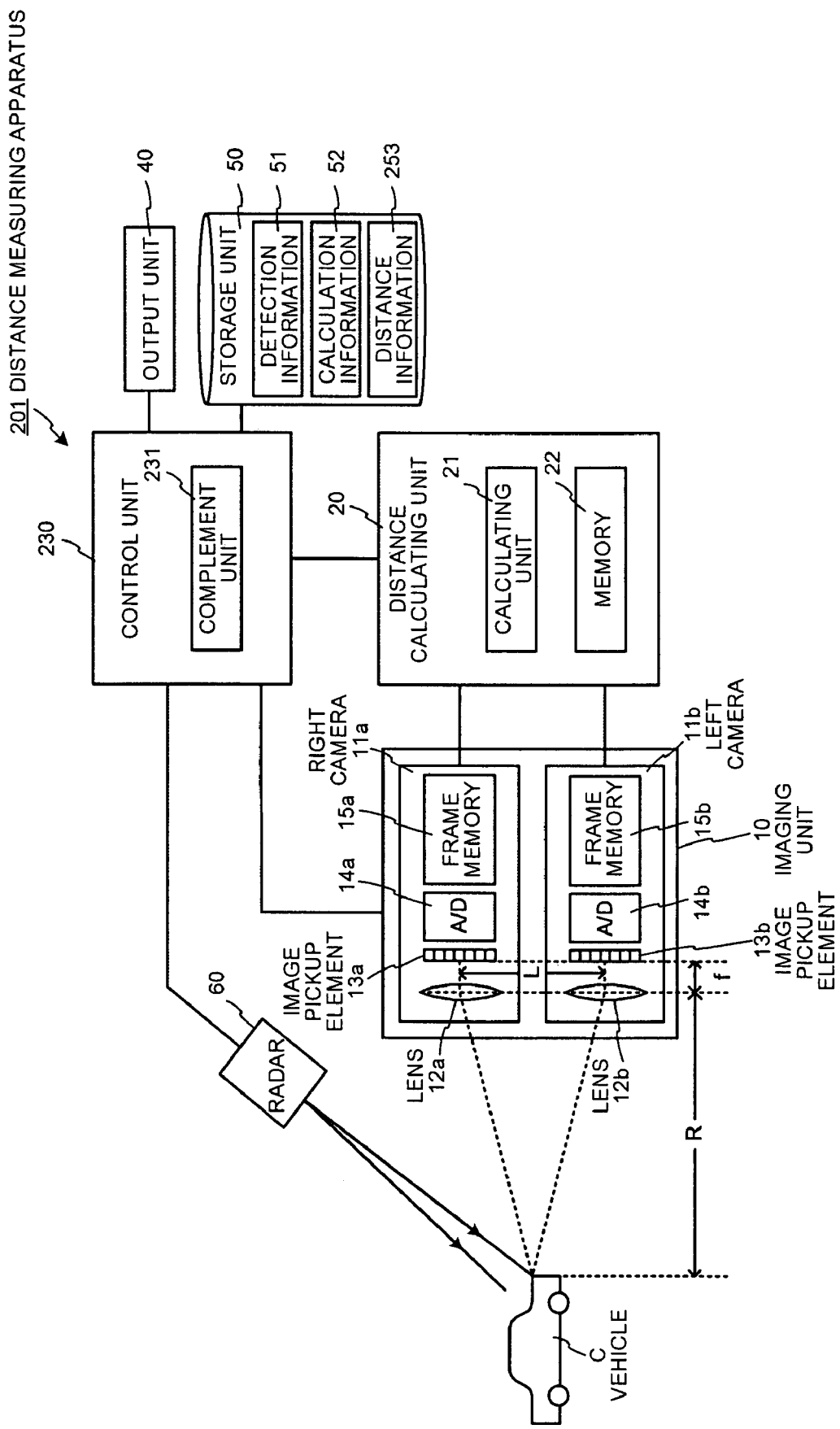

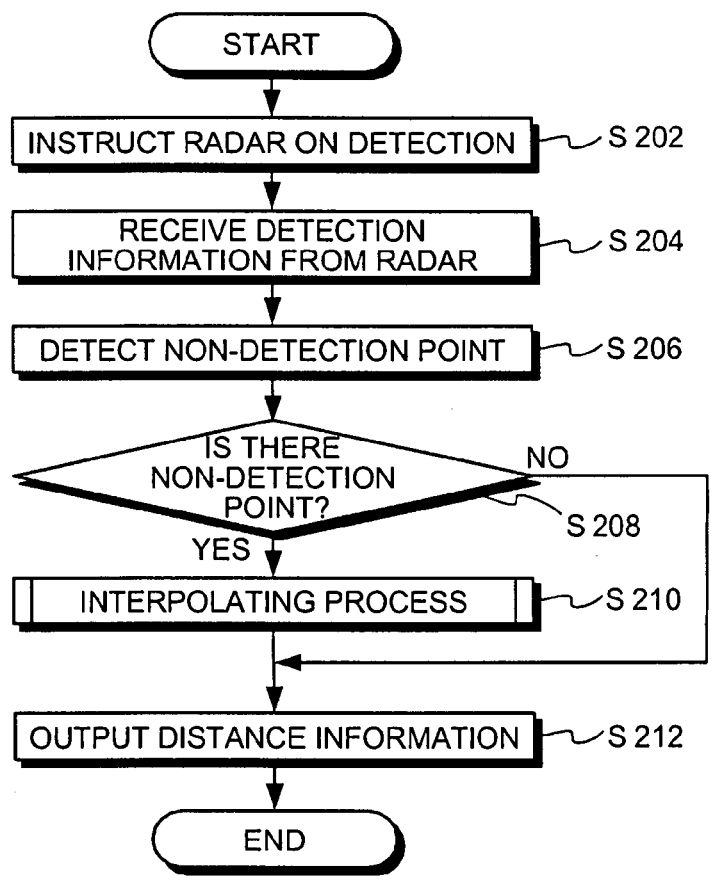
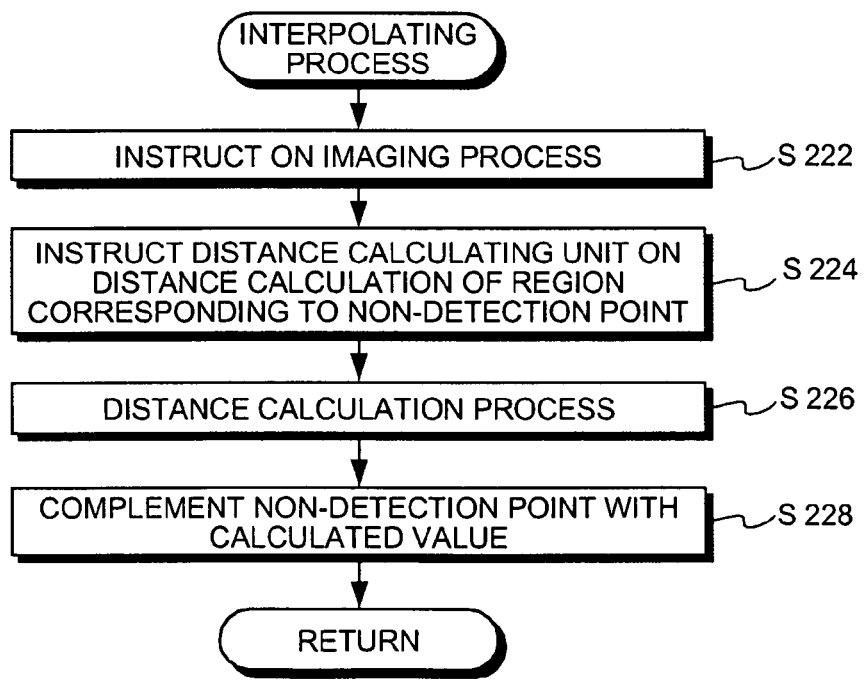

REGION S2a

● ··· RADAR DETECTION POINT
× ··· RADAR NON-DETECTION POINT

351a CALCULATION DATA

◯ ··· CALCULATION POINT

352a RELIABILITY DATA

352b LOW-RELIABILITY REGION

⊘ ··· RELIABILITY CALCULATION POINT

FIG.35
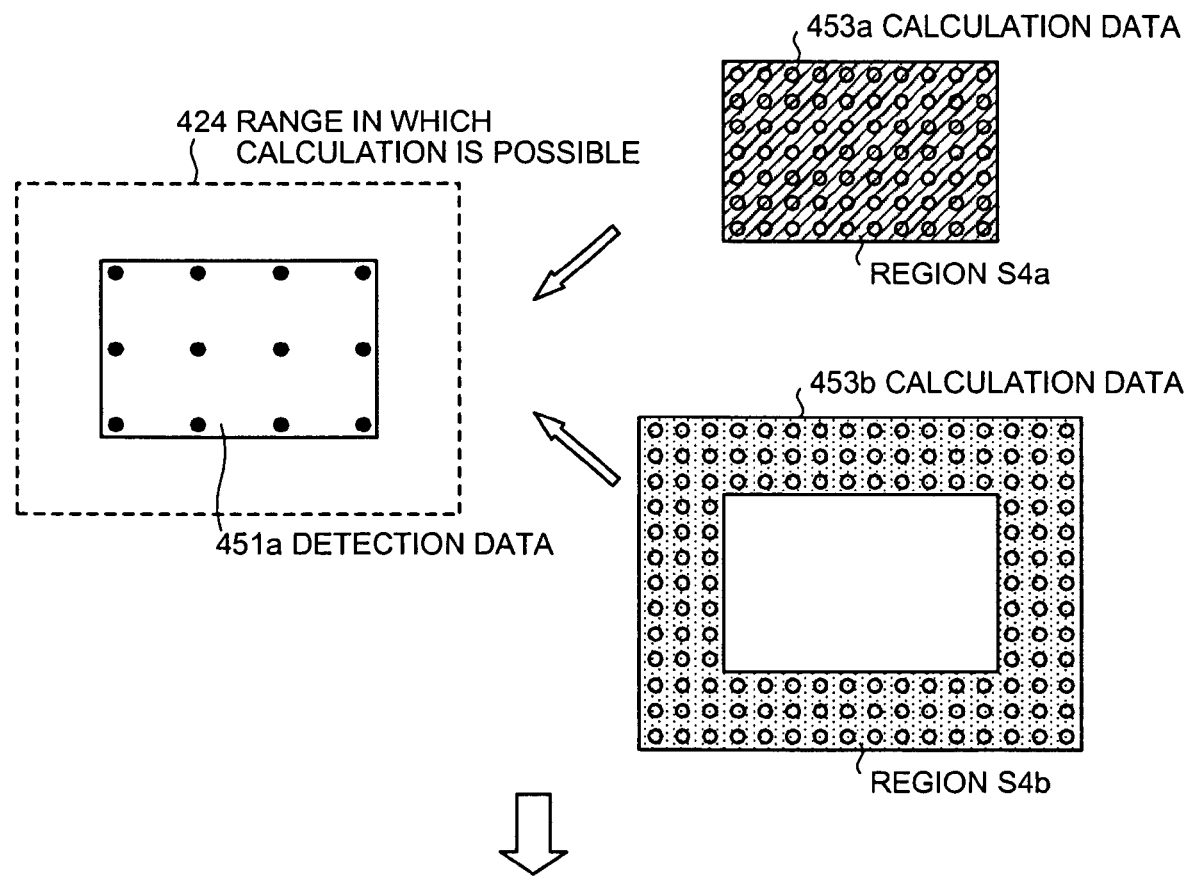
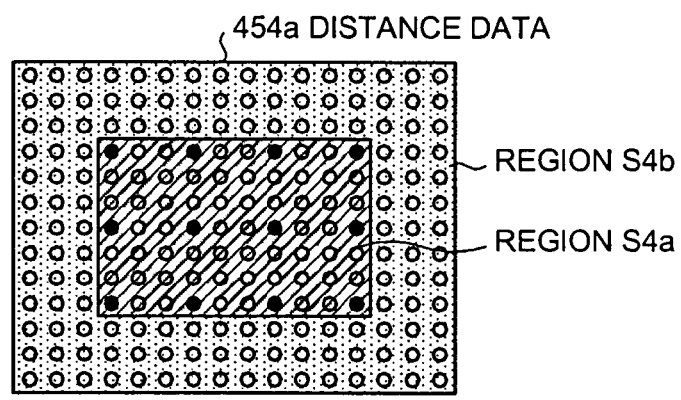
● ···RADAR DETECTION POINT
○ ···CALCULATION POINT

651a DETECTION DATA

● ···RADAR DETECTION POINT

653a DISTANCE DATA

● ···RADAR DETECTION POINT
○ ···CALCULATION POINT

DISTANCE MEASURING APPARATUS, DISTANCE MEASURING METHOD, AND COMPUTER PROGRAM PRODUCT

CROSS-REFERENCE TO RELATED APPLICATIONS

This application is a continuation of PCT international application Ser. No. PCT/JP2006/309664 filed May 15, 2006 which designates the United States, incorporated herein by reference, and which claims the benefit of priority from Japanese Patent Applications No. 2005-147174, filed May 19, 2005; No. 2005-147175, filed May 19, 2005; No. 2005-147231, filed May 19, 2005; No. 2005-147232, filed May 19, 2005; and No. 2005-209087, filed Jul. 19, 2005, and all incorporated herein by reference.

BACKGROUND OF THE INVENTION

1. Field of the Invention

The present invention relates to a distance measuring apparatus, a distance measuring method, and a distance measuring program, for measuring a distance to an object.

2. Description of the Related Art

Recently, a variety of devices mounted on vehicle are realized following popularization of vehicle. As such a vehicle-mounted device, there is a distance measuring apparatus for measuring inter-vehicle distance between own vehicle and a vehicle ahead to perform various processes such as an alarm output based on the measured inter-vehicle distance.

Conventionally, a distance measuring apparatus provided with radar has been proposed as such a distance measuring apparatus (refer to Japanese Published Examined Utility Model Application No. S63-43172). The radar distance measuring apparatus detects a presence of obstacle or a distance to the obstacle by sending an outgoing wave such as a laser light or the like in an anterior direction and detecting a reflected wave from the obstacle such as the vehicle ahead or the like.

However, in the conventional radar distance measuring apparatus, an interval between each detection point is wide and distance information has been obtained only sparsely, so that there has been a case in which accuracy is insufficient, when performing various processes such as the alarm output based on this distance information.

SUMMARY OF THE INVENTION

A distance measuring apparatus according to an aspect of the present invention includes a detecting unit which detects a distance to an object located in a predetermined detection range; an imaging unit which generates an image signal group corresponding to a predetermined imaging field; a calculating unit which calculates the distance to the object located in the imaging field based on the image signal group; and an interpolating unit which either interpolates a detection result by the detecting unit by using a calculation result by the calculating unit, or interpolates the calculation result by the calculating unit by using the detection result by the detecting unit.

A distance measuring method according to another aspect of the present invention includes detecting a distance to an object located in a predetermined detection range; generating an image signal group corresponding to a predetermined imaging field; calculating the distance to the object located in the imaging field based on the image signal group; and either interpolating a detection result by the detecting by using a calculation result by the calculating or interpolating the calculation result by using the detection result.

A computer program product according to still another aspect of the present invention has a computer readable medium including programmed instructions for measuring distance. The instructions, when executed by a computer, cause the computer to perform the distance measuring method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a view illustrating a detectable range of radar shown in FIG. 1;

FIG. 4 is a view illustrating a calculation range setting process shown in FIG. 2;

FIG. 12 is a block diagram showing a schematic configuration of a distance measuring apparatus according to a second embodiment;

FIG. 13 is a flowchart showing a procedure until output of the distance information is completed in the distance measuring apparatus shown in FIG. 12;

FIG. 14 is a flowchart showing a procedure of an interpolation process shown in FIG. 13;

FIG. 35 is a view illustrating the interpolation process shown in FIG. 31;

DETAILED DESCRIPTION OF THE PREFERRED EMBODIMENTS

Figure 1:
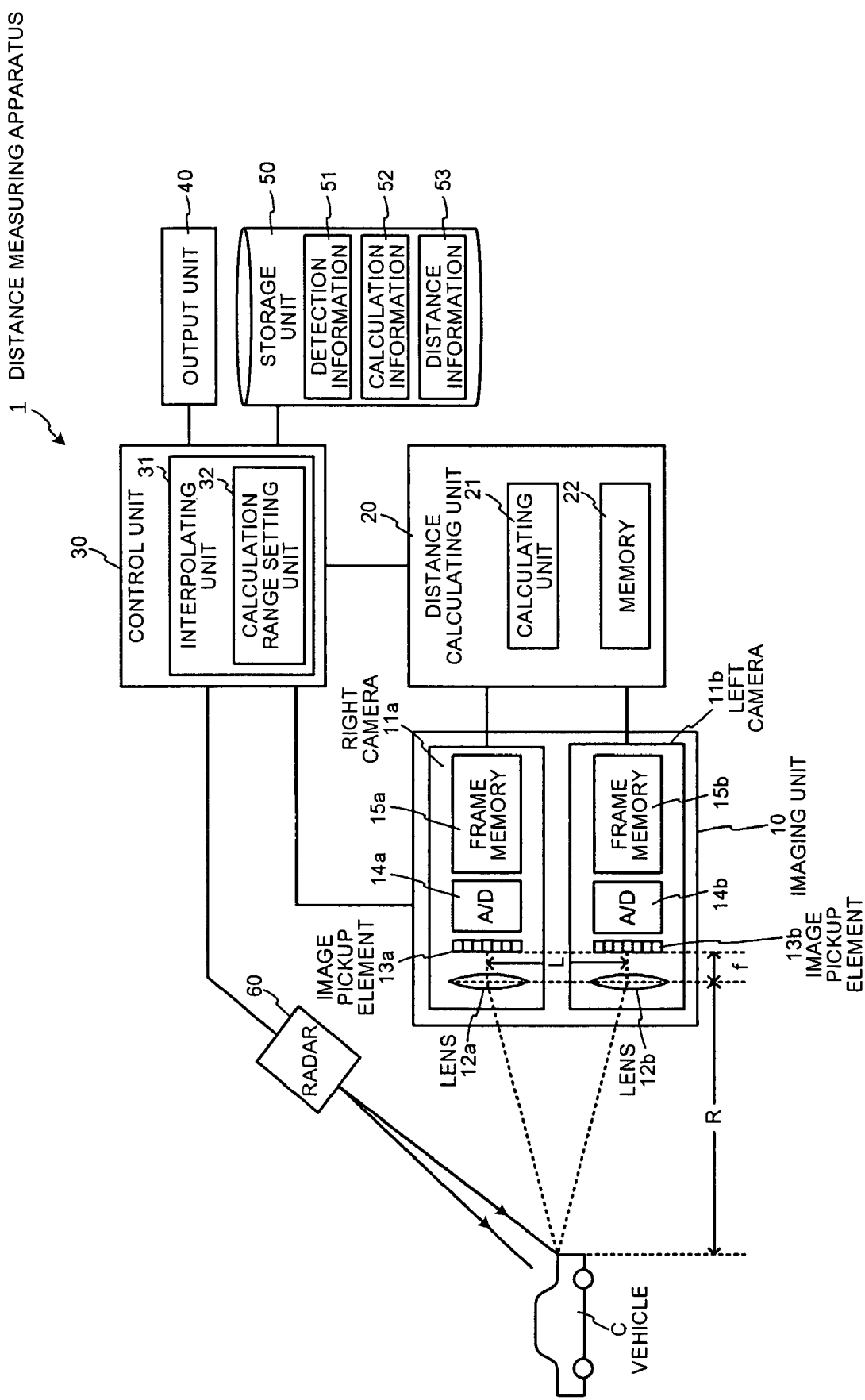
FIG. 1 is a block diagram showing a schematic configuration of a distance measuring apparatus according to a first embodiment.

Hereinafter, embodiments of a distance measuring apparatus, a distance measuring method and a distance measuring program according to the present invention will be described in detail based on the drawings. Meanwhile, the invention is not limited to the embodiments. In addition, in the drawings, the same reference numerals are assigned to the same parts.

First, the distance measuring apparatus according to a first embodiment will be described, taking the distance measuring apparatus mounted on a vehicle for outputting distance information in a detection range. Based on the distance information output from the distance measuring apparatus, various safety drive assist processes by other devices or the like are performed. The distance measuring apparatus according to the first embodiment interpolates between detected values by radar with calculated values obtained by a distance calculating unit performing a distance calculation. FIG. 1 is a block diagram showing a schematic configuration of the distance measuring apparatus according to the first embodiment.

As shown in FIG. 1, a distance measuring apparatus 1 according to the first embodiment has an imaging field including at least a detection range of radar 60 and is provided with an imaging unit 10 for generating an image signal group corresponding to the imaging field, a distance calculating unit 20 for calculating a distance to an object located in the imaging field based on the image signal group generated by the imaging unit 10, a control unit 30 for controlling each process and each operation of each component composing the distance measuring apparatus, an output unit 40 for outputting various information including the distance information, a storage unit 50 for storing various information including the distance information, and the radar 60 for detecting a distance to an object located in a predetermined detection range. The imaging unit 10, the distance calculating unit 20, the output unit 40, the storage unit 50 and the radar 60 are electrically connected to the control unit 30. Also, the control unit 30 is provided with an interpolating unit 31 having a calculation range setting unit 32.

The imaging unit 10 is provided with a right camera 11a and a left camera 11b. The right camera 11a and the left camera 11b output the image signal group corresponding to the imaging field thereof, respectively. The right and left cameras 11a and 11b are provided with lenses 12a and 12b, image pickup elements 13a and 13b, analog/digital (A/D) converting units 14a and 14b, and frame memories 15a and 15b, respectively. The lenses 12a and 12b collect light entering from a predetermined view angle. The image pickup elements 13a and 13b arranged so as to correspond to the lenses 12a and 12b, respectively, are realized by a CCD, a CMOS or the like, for detecting the light penetrating the lenses 12a and 12b and converting the same to an analog image signal. The A/D converting units 14a and 14b convert the analog image signals output from the image pickup elements 13a and 13b to digital image signals, respectively. The frame memories 15a and 15b store the digital image signals output from the A/D converting units 14a and 14b, and output the digital image signal group corresponding to one picked-up image as the image signal group corresponding to the imaging field as needed.

The distance calculating unit 20 is provided with a calculating unit 21 for processing the image signal group output from the imaging unit 10 and calculating the distance to the object located in the imaging field, and a memory 22 for storing the image signal group output from the imaging unit 10. The distance calculating unit 20 detects the image signal provided with a predetermined condition out of the image signal group corresponding to the calculation range set by the calculation range setting unit 32 and calculates the distance to the object located in the imaging field.

The calculating unit 21 calculates the distance to the object located in the imaging field based on the image signal group output from the imaging unit 10 by using a stereo method. The calculating unit 21 detects an image signal, which is matched with an arbitrary image signal in a left image signal group output from the left camera 11b, out of a right image signal group output from the right camera 11a, and calculates the distance by a triangulation based on a movement amount I of the detected image signal from the arbitrary image signal. The movement amount described herein indicates a so-called disparity amount. The calculating unit 21 obtains a distance R from the imaging unit 10 to a vehicle C, which is a target object, by using the following equation (1). In equation (1), f is a focal distance of the lenses 12a and 12b, and L is a width between optic axes of the lenses 12a and 12b. Further, the movement amount I may be obtained based on the number of traveled pixels and a pixel pitch.

$$R = f \cdot L / I \quad (1)$$

The calculating unit 21 calculates the distance R corresponding to each image signal, and the distance calculating unit 20 relates the calculated value and the positional information in the imaging field to each other and outputs them to the control unit 30. Meanwhile, although a case of a parallel stereo has been described herein for simplicity, the parallel stereo by a calculation process may be realized by calibrating and correcting by rectification a crossing of the optic axes with an angle, the focal distances different from each other, and the positional relationships between the image pickup elements and the lens different from each other.

The control unit 30 is realized by a CPU or the like executing a processing program stored in the storage unit 50 for controlling each process or operation among the imaging unit 10, the distance calculating unit 20, the output unit 40, the storage unit 50 and the radar 60. The control unit 30 performs a predetermined input/output control regarding information input to and output from each of the components, and performs predetermined information process to the information.

The interpolating unit 31 interpolates between the detected values of the radar 60 with the calculated values output from the calculating unit 20 based on detection information 51 detected from the radar 60 and calculation information 52 output from the distance calculating unit 20. The interpolating unit 31 outputs a detection result, obtained by interpolating between the detected values of the radar 60 with the calculated value, as the distance information.

In addition, the interpolating unit 31 is provided with a calculation range setting unit 32 for setting a calculation range in the distance calculating unit 20, based on the detection information 51 of the radar 60. The calculation range setting unit 32 obtains a predetermined function passing through the detected values, and sets a region through which the predetermined function passes as the calculation range in the calculating unit 20. Meanwhile, in the first embodiment, a case in which the calculation range setting unit 32 obtains a linear function passing through the detected values and sets the region through which the linear function passes as the calculation range in the calculating unit 20 will be described.

The output unit 40 is realized by a liquid crystal display, an organic electroluminescence display or the like for displaying various display information such as an image picked up by the imaging unit 10 in addition to the distance information. Also, the output unit 40 is further provided with a speaker for outputting various sound information such as an alarm sound for informing approach of the vehicle C ahead, other than the distance information.

The storage unit 50 is provided with a ROM in which various information such as the processing program is stored in advance and a RAM for storing a calculation parameter of each process, various information output from each component, write information, sound information, and the like. For example, the storage unit 50 stores the detection information 51 output from the radar 60, the calculation information 52 output from the distance calculating unit 20, and distance information 53 output from the interpolating unit 31.

The radar 60 sends a predetermined outgoing wave, receives a reflected wave, which is the outgoing wave reflected on a surface of the object, and detects the distance from the radar 60 to the object on which the outgoing wave is reflected and the direction in which the object is located based on, for example, sending and receiving conditions. The radar 60 detects the distance from the distance measuring apparatus 1 to the object on which the outgoing wave is reflected based on a sending angle of the outgoing wave, an incident angle of the reflected wave, a receiving strength of the reflected wave, a time period from sending of the outgoing wave to receiving of the reflected wave, and a frequency variation of the reflected wave. The radar 60 outputs the detected data 51 in which the detected distance value to the object located in the detection range and the positional information in the detection range are related to each other to the control unit 30. The radar 60 sends a laser beam, infrared radiation or millimeter wave as the outgoing wave.

Figure 2:
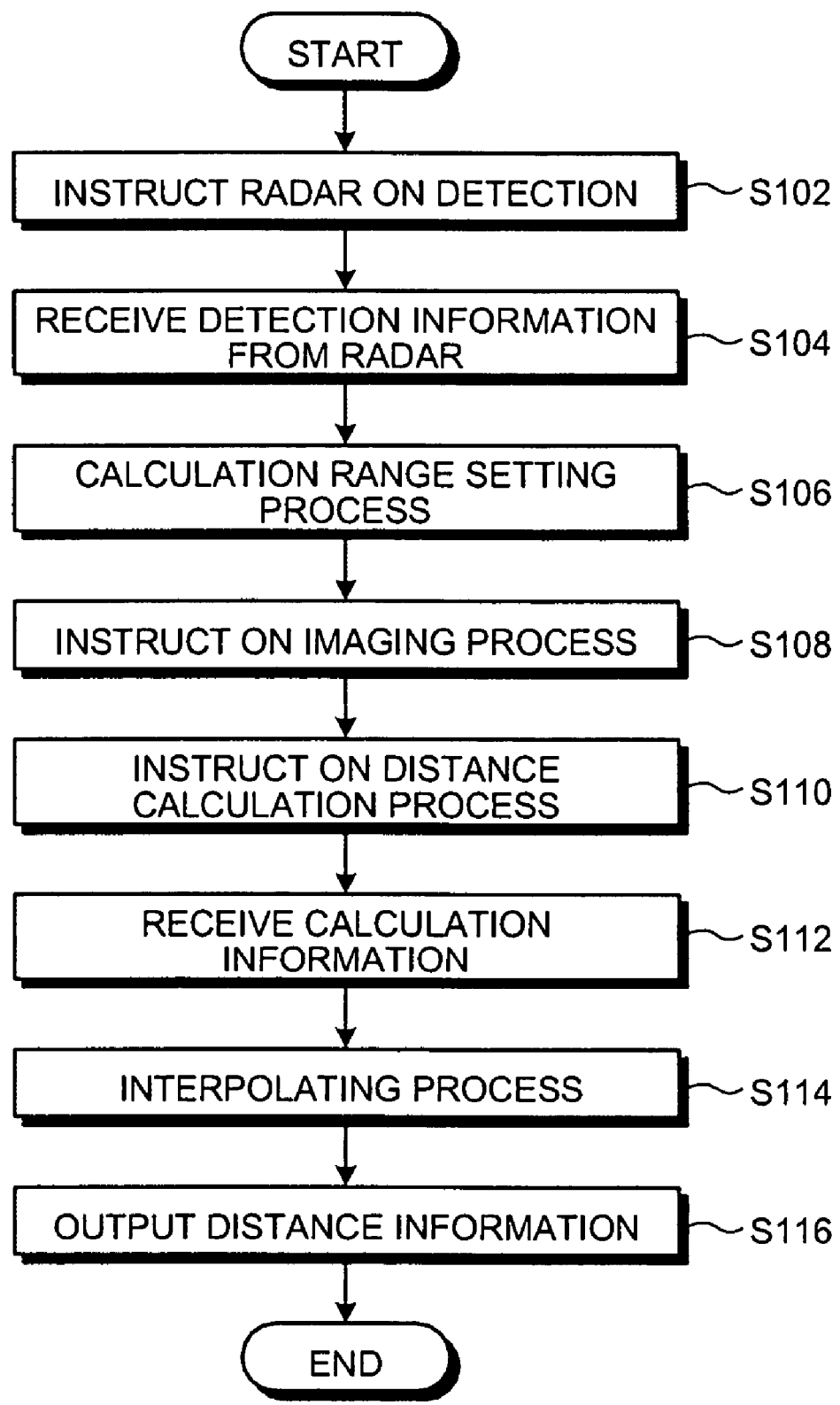
FIG. 2 is a flowchart showing a procedure until an output of distance information is completed in the distance measuring apparatus shown in FIG. 1.

Next, a processing operation until the interpolating unit 31 outputs the distance information 53 out of the processing operations performed by the distance measuring apparatus 1 will be described. FIG. 2 is a flowchart showing a procedure until the interpolating unit 31 completes output of the distance information 53 in the distance measuring apparatus 1.

As shown in FIG. 2, the control unit 30 first instructs the radar 60 on a detection process for detecting the distance to the object located in the detection range (step S102). The radar 60 detects the distance to the object located in the detection range following the instruction of the control unit 30, and outputs the detection information 51 to the control unit 30. The control unit 30 receives the detection information 51 output from the radar 60 (step S104).

After that, the calculation range setting unit 32 obtains the linear function passing through the detected values based on the detection information 51 received from the radar 60, and performs a calculation range setting process for setting the region through which the linear function passes as the calculation range in the calculating unit 20 (step S106). Herein, the calculation range setting unit 32 sets the calculation ranges each corresponding to each of the image signals of the image signal group output from the imaging unit 10.

Next, the control unit 30 instructs the imaging unit 10 on the imaging process (step S108). The imaging unit 10 performs the imaging process following the instruction of the control unit 30, and the right camera 11a and the left camera 11b output the image signal group corresponding to each imaging field, respectively.

After that, the control unit 30 instructs the calculating unit 20 on the distance calculation process (step S110). The calculating unit 21, according to the instruction of the control unit, detects the image signal, which is matched with an arbitrary image signal in the left imaging signal group, from the image signal group corresponding to the calculation range set by the calculation range setting unit 32, out of the right image signal group output from the right camera 11a, and performs the distance calculation corresponding to the arbitrary image signal. The distance calculating unit 20 outputs the calculation information 52 to the control unit 30 after the calculating unit 21 performs the distance calculation to each image signal. The control unit 30 receives the calculation information 52 output from the distance calculating unit 20 (step S112).

The interpolating unit 31 performs an interpolation process for interpolating between each detected value of the radar 60 with the calculated value output from the calculating unit 20 (step S114). The control unit 30 outputs an interpolation result, obtained by interpolating between the detected values with the calculated value, as the distance information 53 (step S116).

Next, the calculation range setting process performed by the calculation range setting unit 32 will be specifically described. FIG. 3 is a view showing one example of a detectable range in the radar 60. In FIG. 3, points at which the radar 60 detects the distance to the object located in the detection range are indicated by radar detection points "•". Meanwhile, in FIG. 3, the detectable range of the radar 60 and the image signal group output from the imaging unit 10 are overlapped, and each cell in FIG. 3 corresponds to each image signal of the left image signal group output from the left camera 11b, for example. Hereinafter, a case in which the calculation range in the distance calculating unit 20 is set with regard to image signals 525b and 535b located between radar detection points 515 and 555 out of the image signal group shown in FIG. 3, in the calculation range setting process, will be described.

FIG. 4 is a view illustrating the calculation range setting process shown in FIG. 2. In FIG. 4, the number of pixel rows in a pixel line on which the radar detection points 515 and 555 are located in the image signal group shown in FIG. 3 is indicated in the horizontal axis, and the detected distance of the radar detection points 515 and 555 detected by the radar 60 are indicated in the vertical line. In FIG. 4, a pixel row "1" is the number of rows corresponding to the radar detection point 515, and a pixel row "5" is the number of rows corresponding to the radar detection point 555. Also, an image signal 525b corresponds to a pixel row "2" and an image signal 535b corresponds to a pixel row "3".

The calculation range setting unit 32 first obtains the linear function passing through the radar detection points 515 and 555. In this case, as shown in FIG. 4, the linear function passing through the radar detection points 515 and 555 is a straight line la.

The calculation range setting unit 32 obtains a region Sa, which is formed by adding a predetermined value e above and below the straight line la. For example, the predetermined value e is determined based on a possibility of distribution of each distance value between the radar detected values.

Next, the calculation range setting unit 32 sets a calculation range for the image signals 525b and 535b based on the region Sa. Specifically, the calculation region setting unit 32 obtains a distance width Y2 on the region Sa in the pixel row "2" as the calculation range corresponding to the image signal 525b. The calculation range setting unit 32 sets the image signal group corresponding to the distance width Y2 out of the right image signal group, as the calculation range corresponding to the image signal 525b. The calculation range corresponding to the image signal 525b will be specifically described with reference to FIG. 5.

Figure 5:
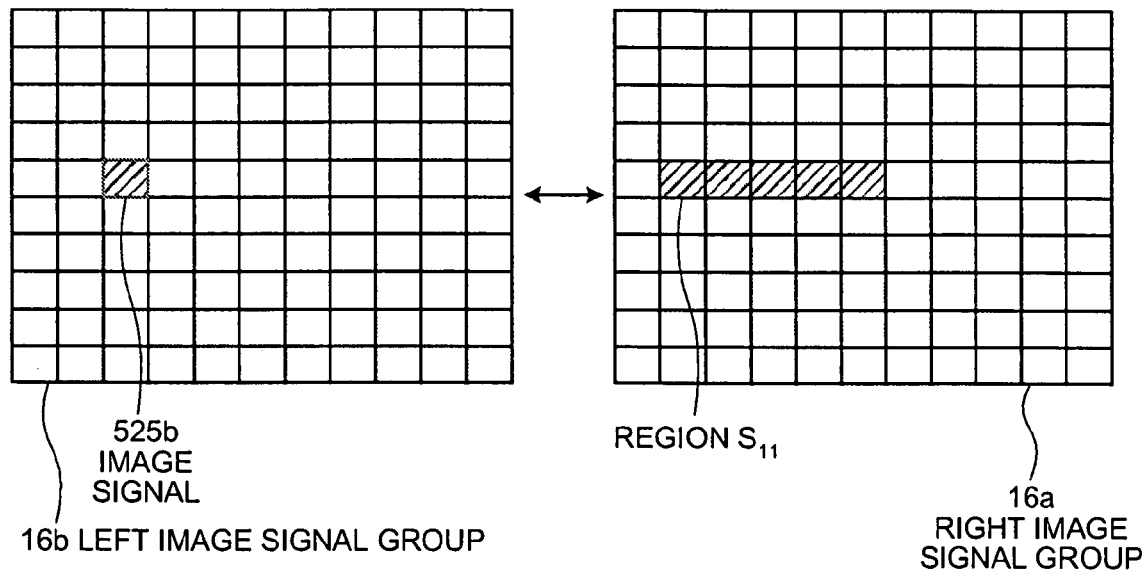
FIG. 5 is a view illustrating a distance calculation process performed by a distance calculating unit shown in FIG. 1.

FIG. 5 is a view showing the right image signal group output from the right camera 11a and the left image signal group output from the left camera 11b. The calculation range setting unit 32 sets the image signal group corresponding to the distance width Y2 shown in FIG. 4 out of the right image signal group 16a, as the calculation range corresponding to the image signal 525b in the left image signal group 16b. In this case, the image signal group corresponding to the distance width Y2 shown in FIG. 4 out of the right image signal group 16a is the image signal group located in a region S11 shown in FIG. 5, for example. After that, the calculating unit 21 detects the image signal, which is matched with the image signal 525b, from the image signal group located in the calculation range set by the calculation range setting unit 32, that is to say, the region S11 of the right image signal group 16a. The calculating unit 21 obtains the movement amount I from the position of the detected image signal, and calculates the distance value corresponding to the image signal 525b by using the equation (1). As a result, a calculation point 525 shown in FIG. 7 may be obtained.

Figure 6:
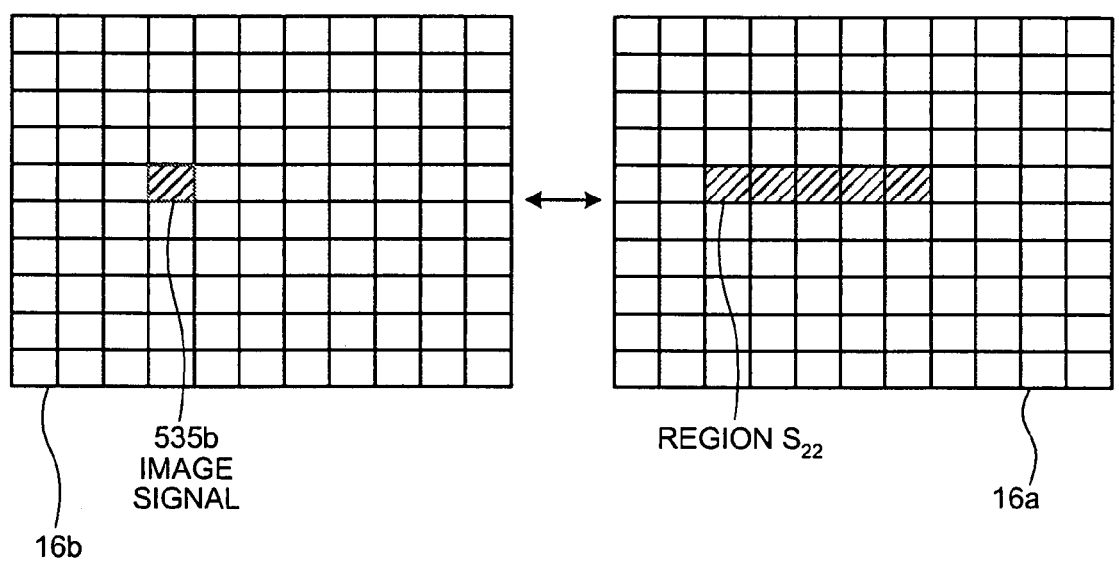
FIG. 6 is a view illustrating the distance calculation process performed by the distance calculating unit shown in FIG. 1.

Also, in a case in which the calculation range setting unit 32 sets the calculation range corresponding to the image signal 535b, the calculation range setting unit 32 obtains a distance width Y3 on the region Sa in the pixel row "3", and sets the image signal group corresponding to the distance width Y3 out of the right image signal group, as the calculation range corresponding to the image signal 535b. In this case, the calculation range setting unit 32 sets the image signal group corresponding to the distance width Y3 shown in FIG. 4, for example, the image signal group located in a region S22 shown in FIG. 6, out of the right image signal group 16a, as the calculation range corresponding to the image signal 535b in the left image signal group 16b. After that, the calculating unit 21 detects the image signal, which is matched with the image signal 535b, from the image signal group located in the region S22 of the right image signal group 16a, and calculates the distance value corresponding to the image signal 535b. As a result, a calculation point 535 shown in FIG. 7 may be obtained.

Figure 7:
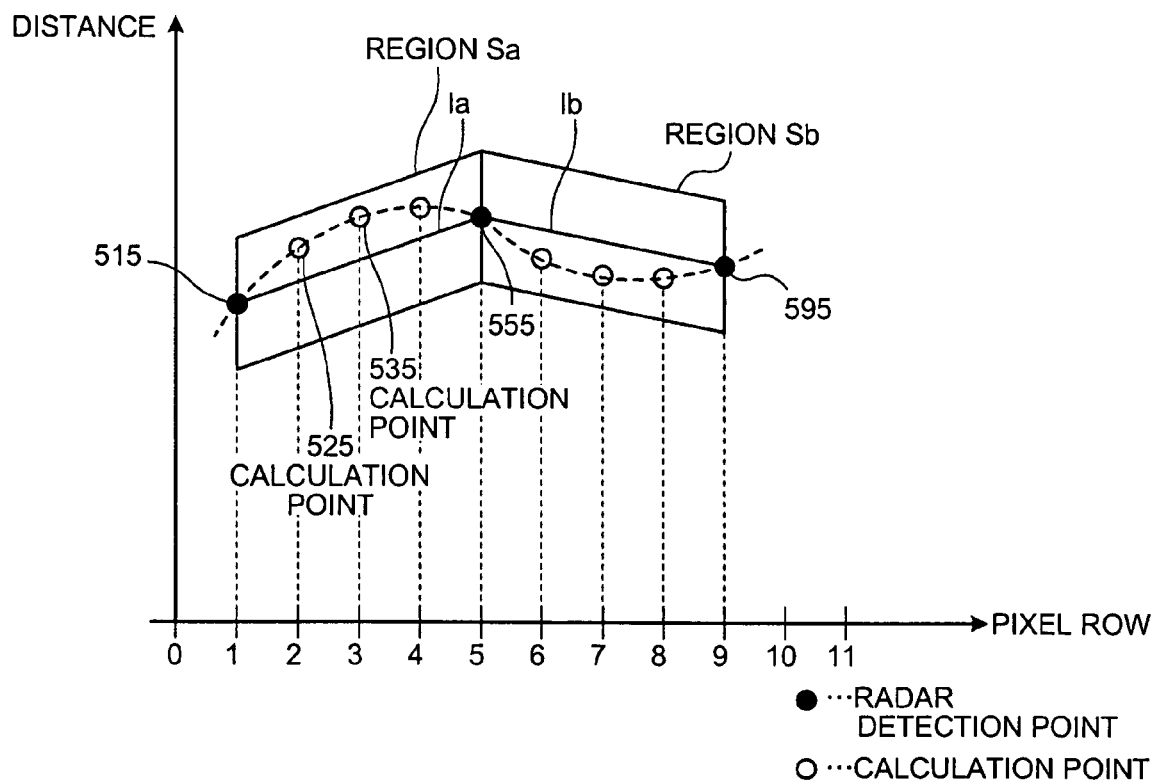
FIG. 7 is a view illustrating an interpolation process shown in FIG. 2.

Also, in a case in which the calculation range of each image signal located between the radar detection points 555 and 595 shown in FIG. 3 is set, a straight line lb, which passes through the radar detection points 555 and 595 as shown in FIG. 4, is obtained, and the calculation range is set for each image signal based on a region Sb, which has the straight line lb on its center. The distance calculating unit 20 sequentially performs the distance calculation process for each image signal, and consequently, the distance value of each calculation point located between the radar detection points 515, 555 and 595 will be obtained, as shown in FIG. 7. In this manner, the calculation range setting unit 32 sets the calculation range corresponding to each image signal, which is a calculation target, based on the radar detection point. Also, the distance calculating unit 20 detects the image signal, which is matched with the image signal of the calculation target in the left image signal group 11b, from the image signal located in the calculation range set by the calculation range setting unit 32, out of the right image signal group 11*a*, and performs the distance calculation.

Figure 8:
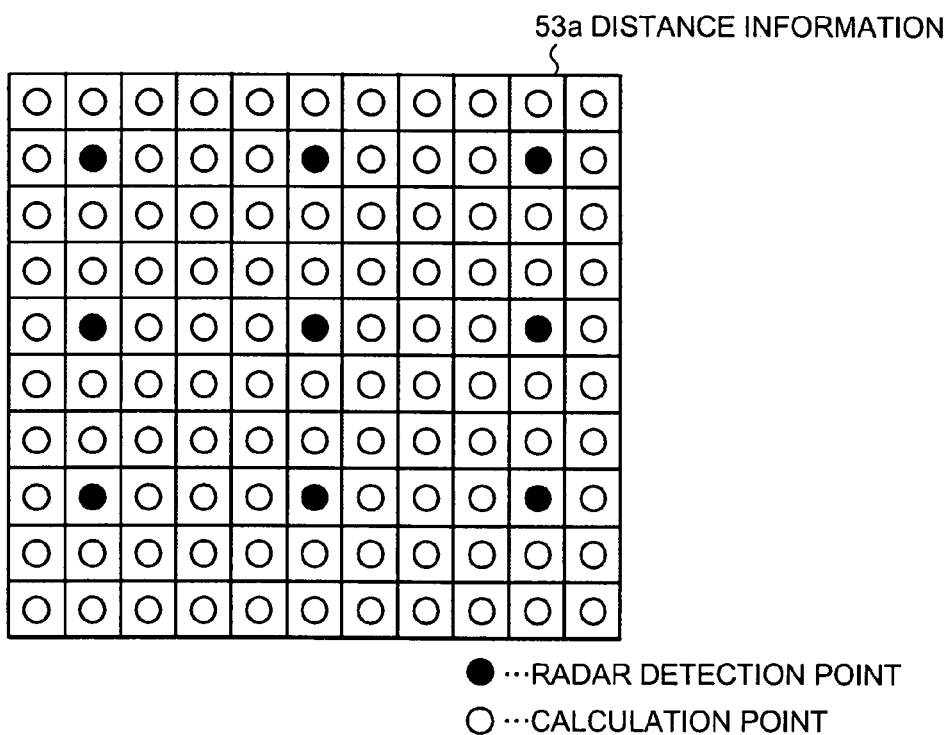
FIG. 8 is a view showing one example of distance information shown in FIG. 1.

After that, in the interpolation process shown in FIG. 2 (step S114), the interpolating unit 31 performs the interpolation process by interpolating between the radar detection points (indicated by "•") with the calculation points (calculation points are indicated by "○") calculated at the distance calculating unit 20, as shown in FIG. 8. The interpolating unit 31 outputs the interpolation result of the interpolation process as the distance information 53.

In this manner, in the distance measuring apparatus 1 according to the first embodiment, since the distance information 53 obtained by interpolating between each of the detection points at the radar 60 with the calculated value at the distance calculating unit 20 is output, it becomes possible to obtain detailed distance information. As a result, it becomes possible that the distance measuring apparatus 1 accurately performs various safety drive assist processes based on the distance information 53.

Figure 9:
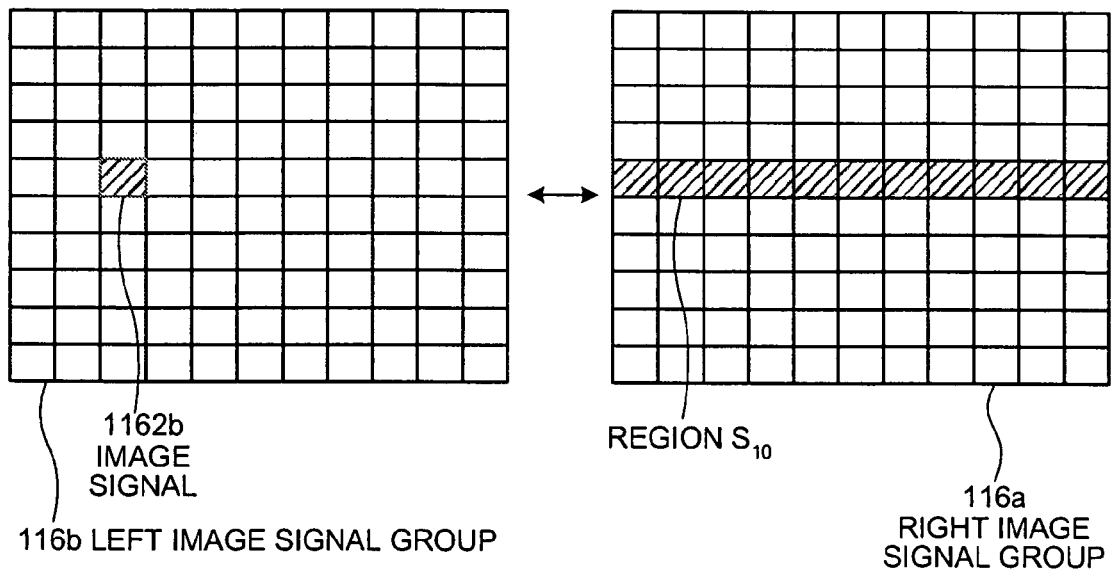
FIG. 9 is a view illustrating the distance calculation process performed by a distance calculating unit in a conventional distance measuring apparatus.

In addition, in the conventional distance measuring apparatus, when the distance calculating unit performs the distance calculation process for the image signal 1162*b* of the left image signal group 116*b* shown in FIG. 9, it has been required to detect the image signal, which is matched with the image signal 1162*b*, from all the image signals of the right image signal group 116*a* located on the same straight line with an arbitrary straight line, which passes through the image signal 1162*b*. That is to say, conventionally, it has been required that the distance calculating unit detects the image signal, which is matched with the image signal 1162*b*, from a region S10, which includes all the image signals located on the same straight line with the image signal 1162*b*.

On the other hand, in the distance measuring apparatus 1 according to the first embodiment, the distance calculating unit 20 searches for the image signal, which is matched with the image signal being the calculation target of the left image signal group, from the image signals included in the calculation range set by the calculation range setting unit 32 out of the right image signal group 16*a*. Therefore, in the distance measuring apparatus 1 according to the first embodiment, the detection range of the image signal matched with the arbitrary image signal becomes narrower in the distance calculating unit 20, as compared to the conventional distance measuring apparatus, so that the number of the image signals to be considered for conformity is reduced. Therefore, in the distance measuring apparatus 1 according to the first embodiment, it becomes possible to reduce a processing time required for detecting the image signal, as compared to the conventional distance measuring apparatus. As a result, in the distance measuring apparatus 1 according to the first embodiment, it becomes possible to obtain the distance information more rapidly as compared to the conventional distance measuring apparatus.

Figure 10:
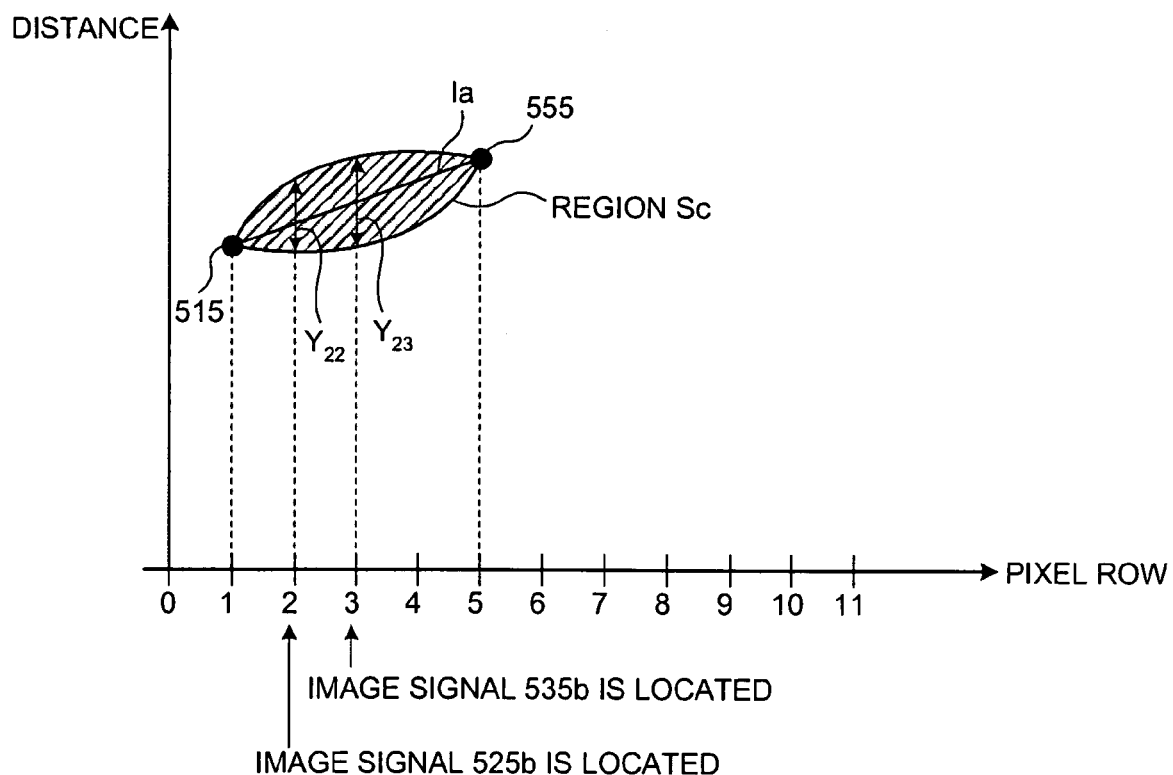
FIG. 10 is a view illustrating a calculation range setting process shown in FIG. 2.

Meanwhile, the calculation range setting unit 32 may set the calculation range based on a region Sc, which is formed based on a predetermined possibility distribution with the straight line la on the center, as shown in FIG. 10. In this case, as shown in FIG. 10, the calculation range for the image signal 525*b* is set based on a distance Y22 on the region Sc on the pixel row "2", and the calculation range for the image signal 535*b* is set based on a distance Y23 on the region Sc on the pixel row "3".

Also, although the calculation range setting unit 32 obtains the linear function, which passes through the radar detected values, and set the calculation range in the distance calculation unit 20 based on the region through which the linear function passes, in the first embodiment, the invention is not limited to this, and a quadratic function or a cubic function, which pass through the radar detected values, may be obtained, and it is sufficient that a predetermined function, which passes through the radar detected values and has a high probability of approximating the distance value between the radar detection points is obtained.

Also, although a case in which the calculation range setting unit 32 obtains the linear function, which passes through the radar detected values, and sets the calculation range in the distance calculating unit 20 based on the region through which the linear function passes has been described in the first embodiment, the invention is not limited to this, and the calculation range of the distance calculating unit 20 may be sequentially set based on the radar detected value or the calculated value located in the vicinity of the image signal, which is the calculation target.

Figure 11:
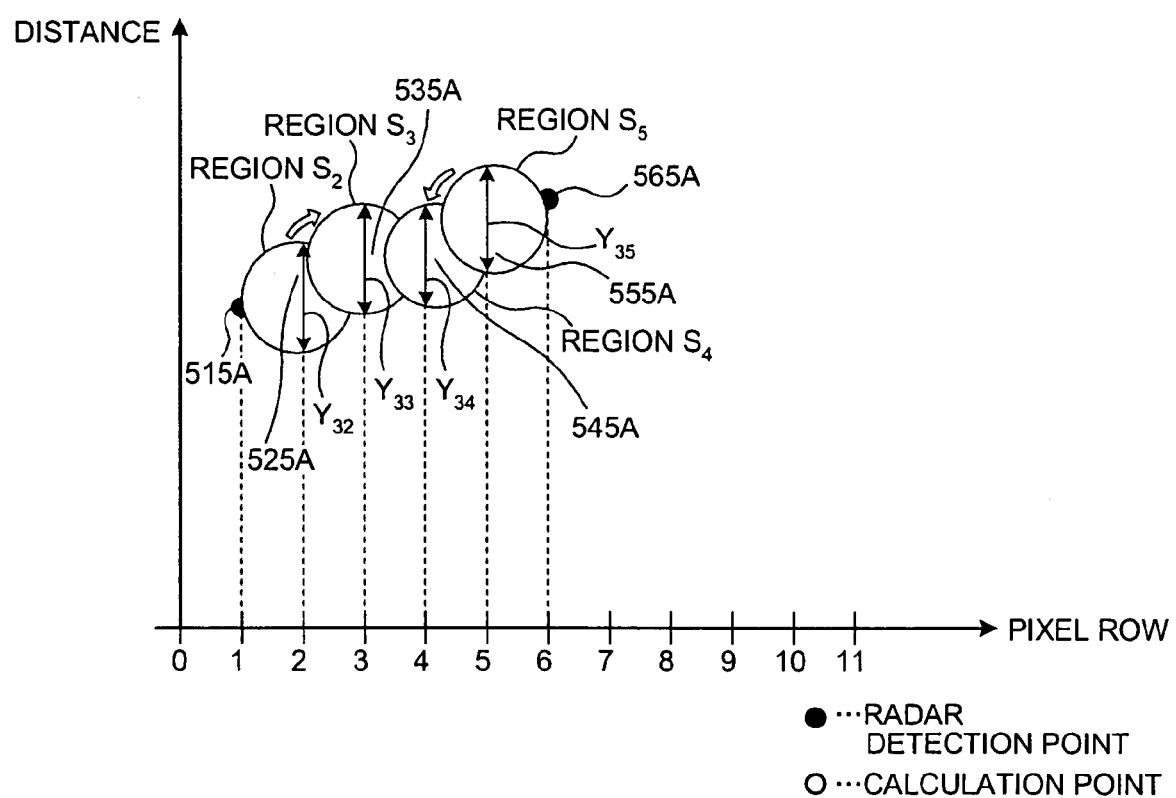
FIG. 11 is a view illustrating the calculation range setting process shown in FIG. 2.

For example, a case in which the calculation range setting unit 32 sets the calculation range for the image signal located on the pixel row "2" shown in FIG. 11 will be described. In this case, the calculation range setting unit 32 sets a region S2, based on the radar detection point 515A, which is adjacent to the image signal located on the pixel row "2". For example, the region S2 is defined based on the distribution possibility of the calculated values of the image signal located on the pixel row "2". Then, the calculation range setting unit 32 sets the image signal group corresponding to the distance width Y32 on the region S2 as the calculation range of the image signal positioned on the pixel row "2". The distance calculating unit 20 detects the predetermined image signal from the image signal group corresponding to the distance width Y32 and obtains the distance value on a calculation point 525A by performing the distance calculation process.

Also, the calculation range setting unit 32 sets a region S3 based on the calculation point 525A calculated by the distance calculating unit 20, which is adjacent to the image signal located on the pixel row "3" and sets the calculation range corresponding to the distance width Y33 of the region S3, when the calculation range setting unit 32 sets the calculation range for the image signal located on the pixel row "3". Further, in a case in which the calculation range setting unit 32 sets the calculation range for the image signal located on the pixel row "5", the calculation range may be set based on a calculation point 545A or a radar detection point 565A adjacent to the pixel row "5". In this manner, the calculation range setting unit 32 may sequentially set the calculation range based on the radar detection point or the calculation point, located in the vicinity of the image signal, which is to be the calculation target. Also, FIG. 3 is a view obtained by overlapping the detection range in the radar 60 and the imaging range in the imaging unit 10, and although a case in which the radar detection point corresponds to any of the regions on which each image signal is located has been described, the radar detection point does not necessarily conform to the position of each image signal output from the imaging unit 10. In such a case, the calculation range setting unit 32 may interpolate each of the radar detected values of the same pixel line as the image signal, which is to be the calculation target, by using a linear interpolation or the like, based on a plurality of radar detected values, which are located in the vicinity of the image signal, which is to be the calculation target, and set the calculation range by using the interpolated detected values.

Next, a distance measuring apparatus according to a second embodiment will be described. FIG. 12 is a block diagram showing a schematic configuration of the distance measuring apparatus according to the second embodiment. As shown in FIG. 12, a distance measuring apparatus 201 according to the second embodiment is provided with a control unit 230 in place of the control unit 30 of the distance measuring apparatus 1 shown in FIG. 1.

The control unit 230 has the function similar to that of the control unit 30 and is provided with a complement unit 231. The complement unit 231 has the function similar to that of the interpolating unit 31 shown in FIG. 1, and detects a non-detection point from the detection result from the radar 60 and outputs the detection result obtained by complementing the non-detection point with the calculated value at the distance calculating unit 20 as the distance information. Also, the complement unit 231 instructs the distance calculating unit 20 on the distance calculation of the region corresponding to the non-detection point in the detection result. The storage unit 50 stores distance information 253 output from the complement unit 231. Also, the radar 60 does not receive the reflected wave when it sends the outgoing wave to a region in which an object reflecting the outgoing wave does not exist or to a region in which an object provided with a member for absorbing the outgoing wave exists. Therefore, such a region is the non-detection point, distance of which is not detected in the detection information 51.

Next, a processing operation until the control unit 230 outputs the distance information 253 out of the operation of the distance measuring apparatus 201 will be described. FIG. 13 is a flowchart showing a procedure until the control unit 230 completes the output of the distance information 253 in the distance measuring apparatus 201.

As shown in FIG. 13, the control unit 230 first instructs the radar 60 on the detection process for detecting the distance to an object located in the detection range (step S202). The radar 60 detects the distance to the object located in the detection range, following the instruction of the detection process by the control unit 230, and outputs the detection information 51 to the control unit 230. The control unit 230 receives the detection information 51 from the radar 60 (step S204), and the complement unit 231 detects the non-detection point in the detection range of the radar 60 in the received detection information 51 (step S206). Next, the complement unit 31 judges whether the non-detection point exists or not in the received detection result (step S208). The complement unit 231 performs a complementing process for complementing the non-detection point with the calculated value of the distance calculating unit 20 (step S210), when it judges that there is the non-detection point (step S208: Yes), and outputs the detection result obtained by complementing the non-detection point with the calculated value of the distance calculating unit 20, as the distance information (step S212). On the other hand, the complement unit 231 outputs the received detection information 51 as the distance information 253 (step S212), when it judges that there is no non-detection point (step S208: No).

Next, the complementing process shown in FIG. 13 will be described. FIG. 14 is a flowchart showing a procedure of the complementing process shown in FIG. 13. As shown in FIG. 14, the control unit 230 instructs the imaging unit 10 on the imaging process (step S222). Next, the complement unit 231 instructs the distance calculating unit 20 on the distance calculation of the region corresponding to the detected non-detection point (step S224). The distance calculating unit 20 performs the distance calculation process for calculating the distance of the region corresponding to the non-detection point (step S226), following the calculation instruction of the complement unit 231, and outputs each calculated value to the control unit 230, as the calculation information 52. The complement unit 231 complements the calculated value calculated by the distance calculating unit 20 to the non-detection point in the detection information 51 by using the calculation information 52 output from the distance calculating unit 20 (step S228) and terminates the complementing process.

Figure 15:
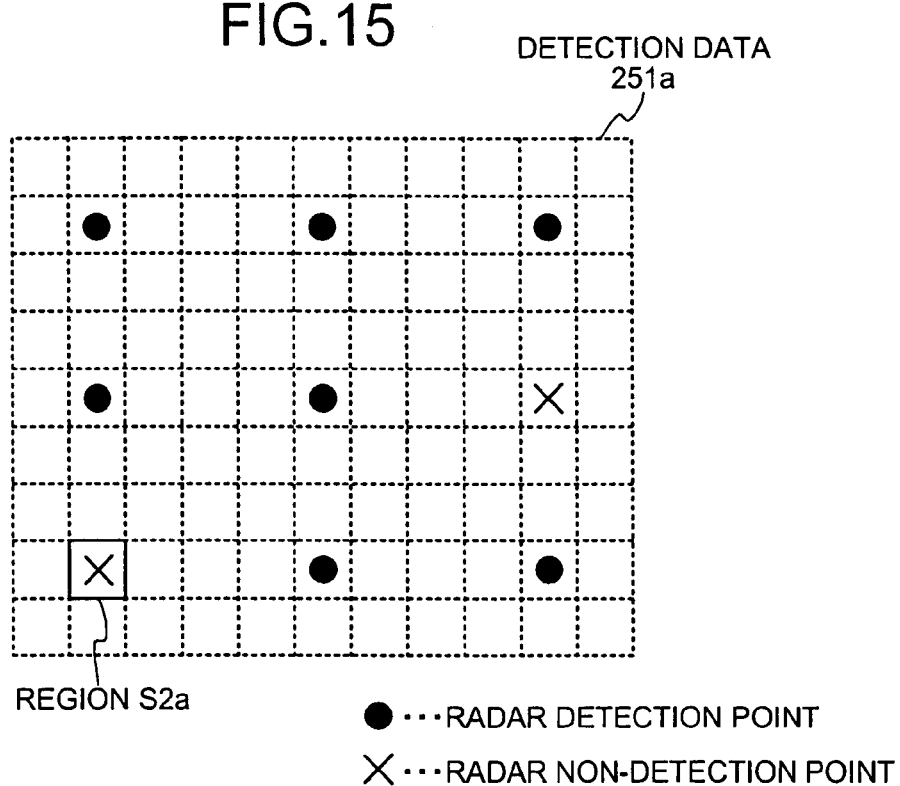
FIG. 15 is a view showing one example of detection information shown in FIG. 12.

Next, each procedure shown in FIGS. 13 and 14 will be specifically described. FIG. 15 is a view showing one example of the detection information 51 shown in FIG. 12. In the detected data 251a shown in FIG. 15, points on which the radar 60 detects the distance to the object located in the detection range are indicated as the radar detection points "•", and the points which are not detected are indicated as the radar non-detection points "x".

The complement unit 231 instructs the imaging unit 10 on the imaging process (step S222) and after that, instructs the distance calculating unit 20 on the distance calculation of the region corresponding to the radar non-detecting point, for example, the region S2a in FIG. 15 (step S224), when the complement unit 231 detects the radar non-detection point in the detected data 251a (step S208: Yes).

Figure 16:
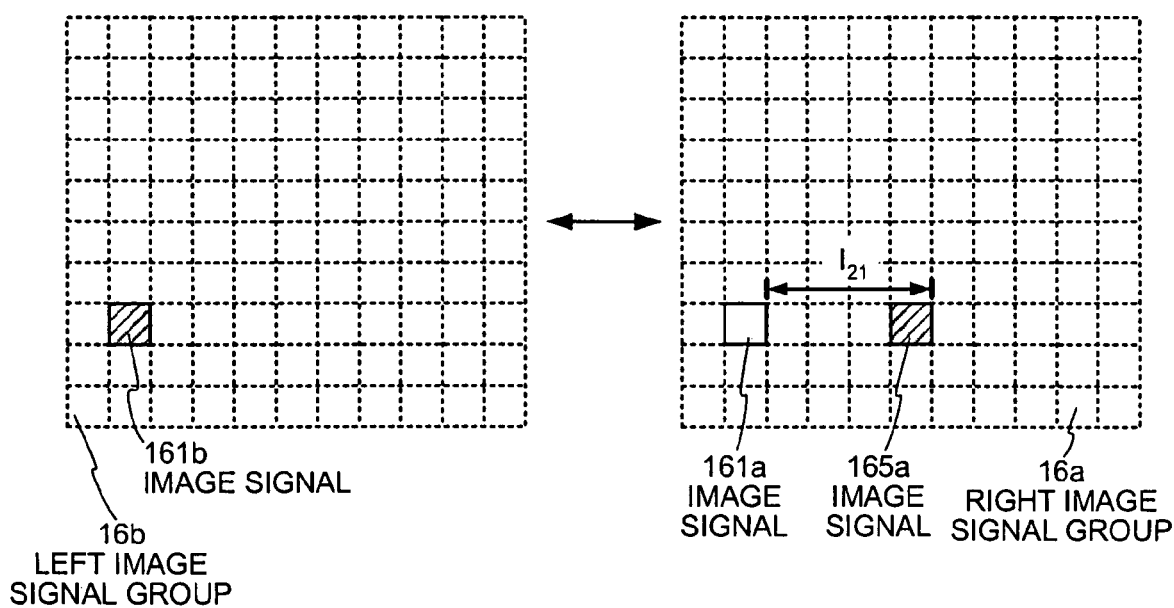
FIG. 16 is a view illustrating a distance calculation process performed by a distance calculating unit shown in FIG. 12.

The distance calculating unit 20 performs the distance calculation in the region S2a based on the right image signal group 16a output from the right camera 11a and the left image signal group 16b output from the left camera 11b as shown in FIG. 16 (step S226), following the instruction of the complement unit 231. In a case in which the image signal corresponding to the region S2a in the left image signal group 16b is 161b, the calculating unit 21 first compares the image signals 161a located on a portion corresponding to the image signal 161b in the right image signal group 16a with the image signal group 161b and examines whether the image signals 161a and 161b are matched with each other or not. The calculating unit 21 searches for the image signal, which is matched with the image signal 161b, while sequentially travels in a right direction in FIG. 16, when this judges that the image signals 161a and 161b are not matched with each other. In a case in which the calculating unit 21 detects the image signal 165a, which is matched with the image signal 161b, in the right image signal group 16a, this obtains a movement amount I21 from the image signal 161a to the image signal 165a and calculates the distance in the region S2a by using equation (1). In this manner, the distance calculating unit 20 performs the distance calculation only for the region corresponding to the non-detection point in the detection information 51 of the radar 60, and outputs each calculated value calculated corresponding to the region to the control unit 230 as the calculation information 52.

Next, a process in which the complement unit 231 complements the calculated value calculated by the distance calculating unit 21 to the non-detection point in the detection information 51 (step S228) will be described using FIG. 17. Herein, in FIG. 17, as in FIG. 15, the points on which the radar 60 detects the distance to the object located in the detection range are indicated as the radar detection points "•", and the points which are not detected are indicated by the radar non-detection points "x", and the regions, distance of which is calculated by the distance calculating unit 20 are indicated by a calculation points "○".

Figure 17:
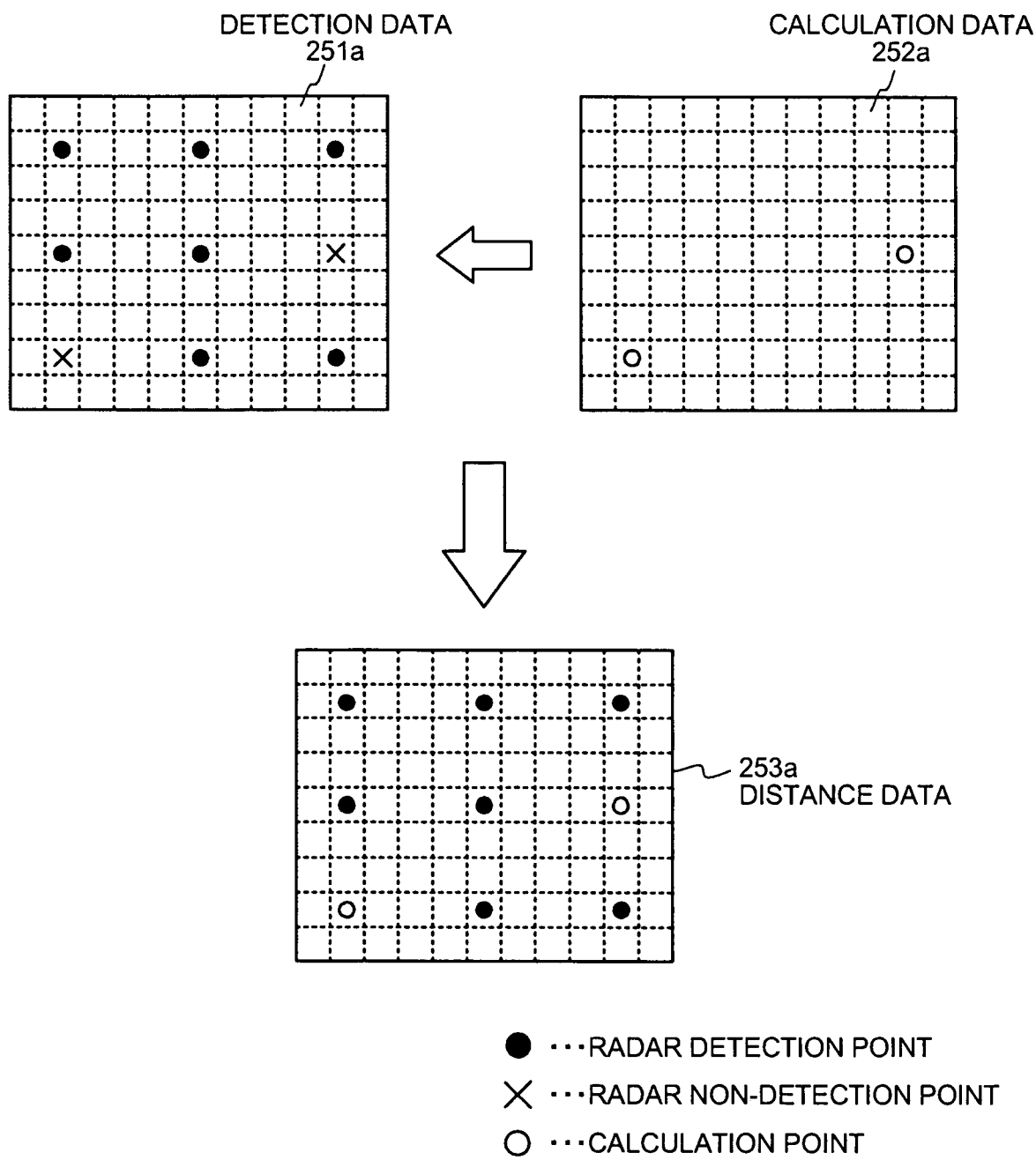
FIG. 17 is a view illustrating an interpolation process performed by an interpolating unit shown in FIG. 12.

As shown in FIG. 17, first, calculated data 252a obtained by calculating a distance in the region corresponding to the non-detection point of the detected data 251a is output from the distance calculating unit 20. Next, the complement unit 231 generates distance data 253a by complementing the non-detection point in the detected data 251a output from the radar 60 with the calculated value in the calculated data 252a output from the distance calculating unit 20. As a result, in the distance measuring apparatus 201, it is possible to output the distance information corresponding to all the detection points in the detection range.

Figure 18:
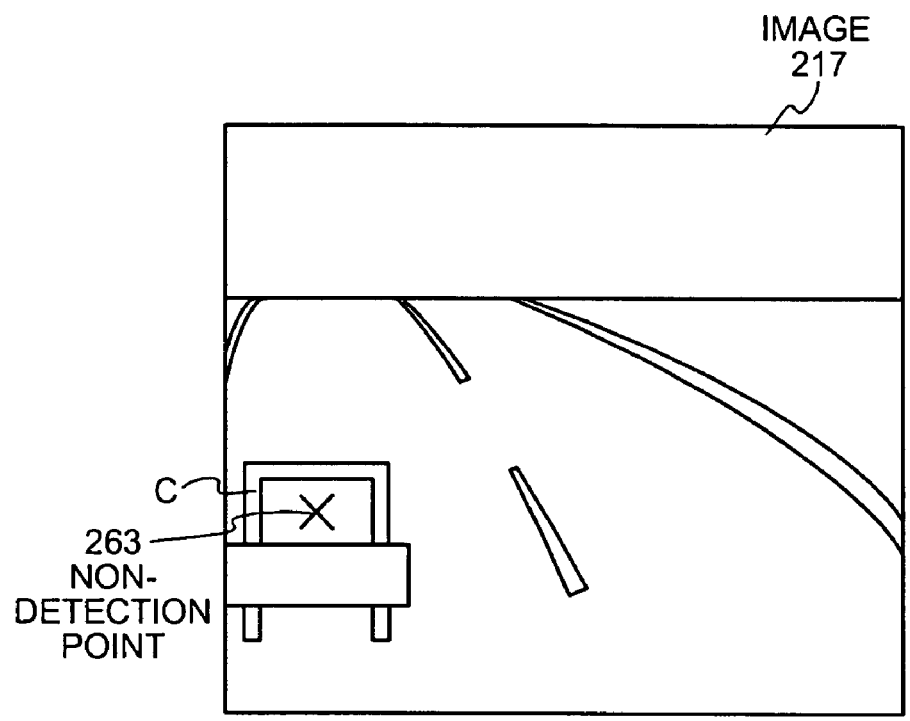
FIG. 18 is a view showing one example of an image picked up by an imaging unit shown in FIG. 12.

With the conventional distance measuring apparatus, it has not been possible to detect the distance corresponding to all the points at which the outgoing wave has been sent. For example, with the conventional distance measuring apparatus, as shown in an image 217 in FIG. 18, in a case in which the outgoing wave has been sent from the radar to a glass portion of the vehicle C ahead, the outgoing wave is absorbed into the glass, and the radar cannot receive the reflected wave. Therefore, in the conventional distance measuring apparatus, the distance information corresponding to the region is made a non-detection point 263 and it is not possible to output the distance between the own vehicle and the vehicle C. Therefore, in the conventional distance measuring apparatus, it is not possible to output an alarm sound even when the vehicle C is close to the own vehicle, so that it is not possible to inform a driver of the own vehicle that the vehicle C ahead is approaching. Consequently, the conventional distance measuring apparatus has the negative effect that this could not accurately perform the safety drive assist.

Figure 19:
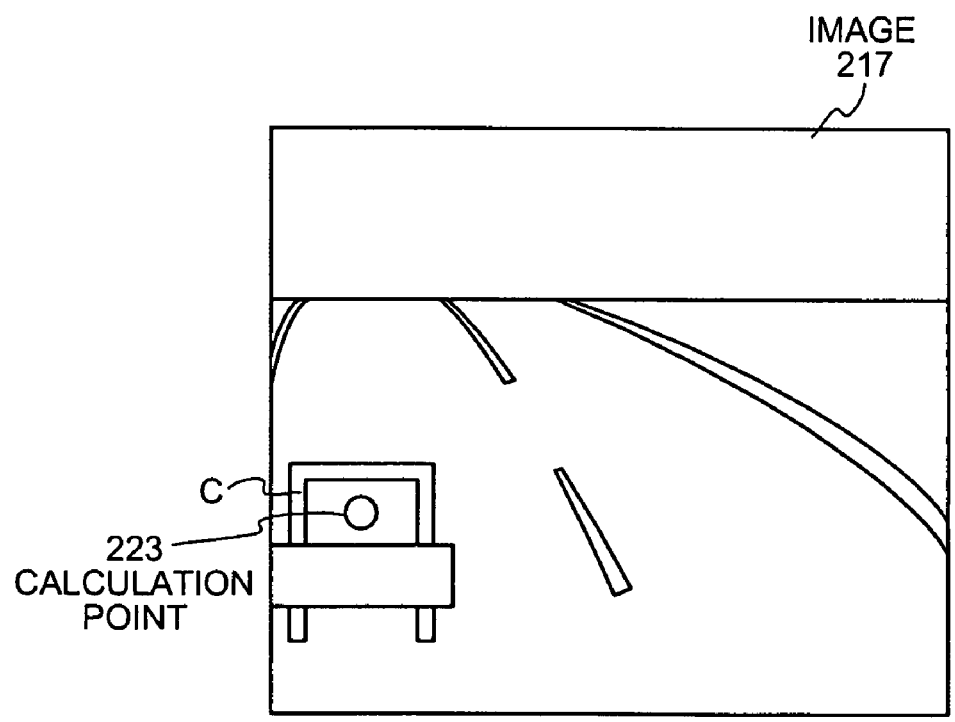
FIG. 19 is a view showing one example of the image picked up by the imaging unit shown in FIG. 12.

On the other hand, in the distance measuring apparatus 201 according to the second embodiment, the complement unit 231 detects the non-detection in the detection information 51, and outputs the distance information 253 obtained by complementing the calculated value calculated by the distance calculating unit 20 to the non-detection point. That is to say, the distance measuring apparatus 201 is capable of outputting the distance information for all the points at which the outgoing wave is sent. For example, as shown in FIG. 19, even when the distance of the region corresponding to the glass portion of the vehicle C ahead is not detected by the radar 60 and this is made the non-detection point, the complement unit 231 complements the non-detection point with a calculation point 223 calculated by the distance calculating unit 20. Therefore, in the distance measuring apparatus 201, even in a case in which the vehicle C is located on a position, distance of which cannot be detected by the radar 60 and the vehicle C approaches the own vehicle, it is possible to inform the driver that the vehicle C ahead is approaching by outputting the alarm sound from the output unit 40 based on the calculated value 23. Therefore, according to the distance measuring apparatus 1 according to the second embodiment, it is possible to accurately perform the safety drive assist.

Also, in the second embodiment, the distance calculating unit 20 performs the distance calculation process only for the region instructed by the complement unit 231. That is to say, the distance calculating unit 20 is not required to perform the distance calculation process for all the image signals in the image signal group output from the imaging unit 10. For this reason, in the second embodiment, it becomes possible to reduce the time required for the distance calculation process in the distance calculating unit 20, as compared to the case in which the distance calculation process is performed for all the image signals. As a result, according to the distance measuring apparatus 201, it becomes possible to reduce the processing time required from the instruction to the radar 60 on the distance detection to the output of the distance information of the complement unit 231, and it becomes possible to rapidly obtain the accurate distance information.

Figure 20:
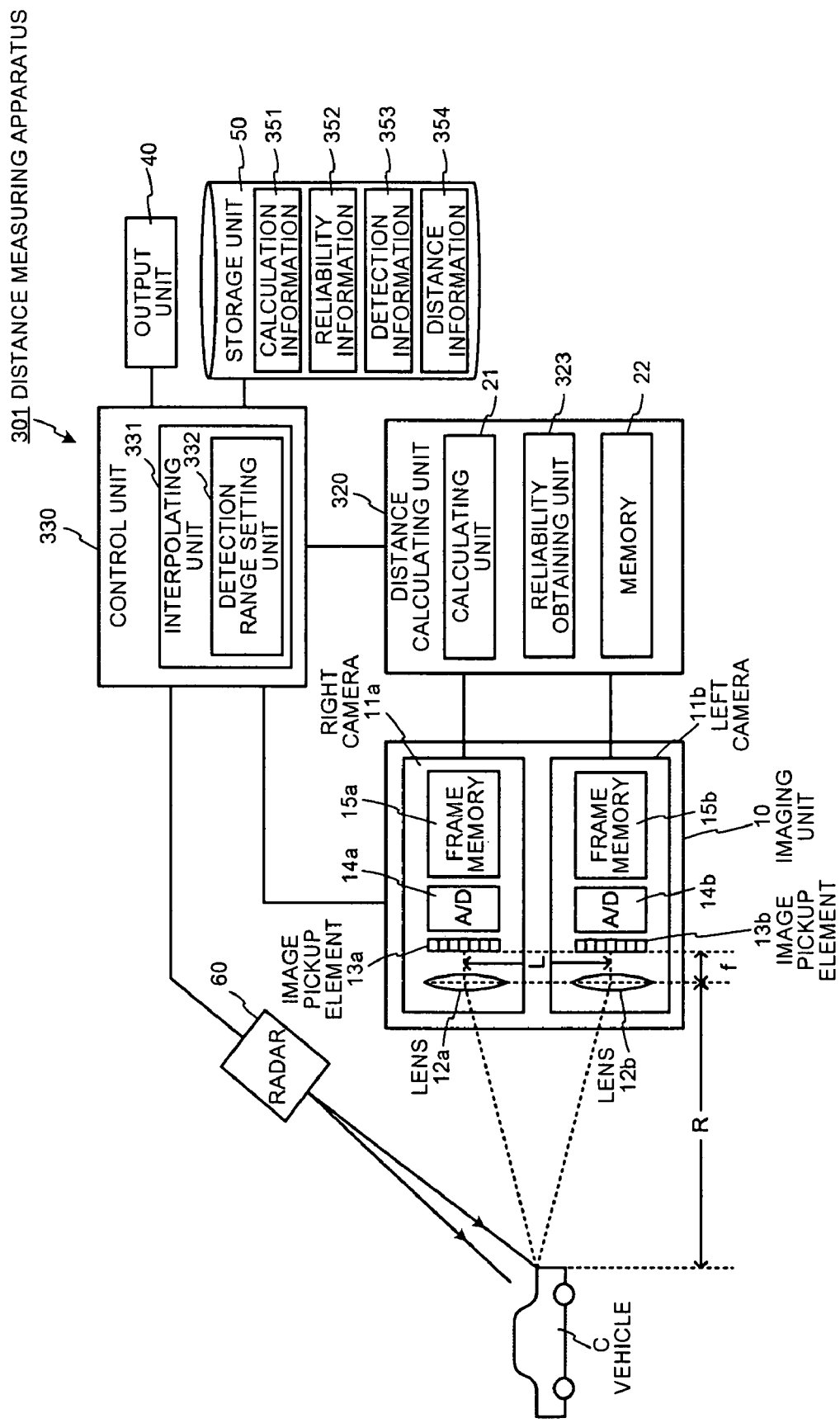
FIG. 20 is a block diagram showing a schematic configuration of a distance measuring apparatus according to a third embodiment.

Next, a distance measuring apparatus according to a third embodiment will be described. FIG. 20 is a block diagram showing a schematic configuration of a distance information device according to the third embodiment. As shown in FIG. 20, a distance measuring apparatus 301 according to the third embodiment is provided with a distance calculating unit 320 in place of the distance calculating unit 20 of the distance measuring apparatus 1 shown in FIG. 1, and is provided with a control unit 330 in place of the control unit 30 in the distance measuring apparatus 1. Meanwhile, the storage unit 50 stores calculation information 351 and reliability information 352 output from a distance calculating unit 320, detection information 353 output from the radar 60, and distance information 354 output from the interpolating unit 331.

The distance calculating unit 320 is further provided with a reliability obtaining unit 323 as compared to the distance calculating unit 20 shown in FIG. 1. The reliability obtaining unit 323 obtains reliability of the calculated value by the calculating unit 21. The calculating unit 21 calculates a distance to an object located in an imaging field based on the image signal group output from the imaging unit 10, using the stereo method. The calculating unit 21 detects the image signal, which is matched with an arbitrary image signal in the left image signal group output from the left camera 11b, out of the right image signal group output from the right camera 11a, and calculates the distance by triangulation based on the movement amount I from the arbitrary image signal in the detected image signal. The movement amount described herein indicates a so-called disparity amount.

Herein, the calculating unit 21 detects the image signal, which is matched the best with the image signal being the calculation target, from the right image signal group, by sequentially comparing each image signal in the right image signal group located on the same straight line with an arbitrary straight line, which passes through the image signal being the calculation target of the left image signal group, with the image signal being the calculation target. Specifically, a local region with the image signal being the calculation target on the center thereof is provided in the left image signal group, and the region similar to the local region is provided in the right image signal group. Then, while scanning the local region in the right image signal group on the above-described straight line, a local region whose conformity with the local region in the left image signal group is the highest is searched. As a result of this search, it becomes possible to detect the image signal located on the center of the local region whose conformity is the highest, as the image signal, which is matched the best with the image signal being the calculation target. The calculation unit 21 calculates as the conformity an SSD (Sum of Squared Difference) being a square sum of a difference between the image signals in the local region. The calculating unit 21 calculates the SSD each time it searches for the local region, and detects the image signal located on the center of the local region having the SSD, which is the minimum value, as the image signal, which is matched the best with the image signal being the calculation target.

The reliability obtaining unit 323 obtains the conformity, which is calculated by the calculating unit 21 for each image signal, as reliability, and the distance calculating unit 320 outputs reliability information 352 obtained by relating the obtained reliability to the positional information in the imaging field to the control unit 330.

The control unit 330 has the function similar to that of the control unit 30, and is provided with an interpolating unit 331. The interpolating unit 331 has the function similar to that of the interpolating unit 31 shown in FIG. 1, and replaces the calculated value, reliability of which does not satisfy predetermined evaluation criteria out of calculation information 351 with the detected value of the radar 60 corresponding to the calculated value and outputs the same as the distance information 354 based on the calculation information 351 and the reliability information 352 output from the distance calculating unit 320. The detection range setting unit 332 obtains the range which corresponds to the calculated value, reliability of which does not satisfy the evaluation criteria, based on the calculation information 351 and the reliability information 352, and sets this range as the detection range of the radar 60. The control unit 330 instructs the radar 60 on the detection process for detecting the distance to the object located in the detection range set by the detection range setting unit 332. As a result, the detection information 353 output from the radar 60 is the detection result of the detection range set by the detection range setting unit 332. The interpolating unit 331 replaces the calculated value, reliability of which does not satisfy the evaluation criteria out of the calculation information 351 with the detected value of the radar 60 corresponding to the calculated value by using the detection information 353 output from the radar 60. The detected value of the radar 60 is a high-accuracy value, so that the distance information 354 obtained by replacing the calculated value, reliability of which does not satisfy the evaluation criteria with the detected value of the radar 60 is considered to be provided with required reliability. Meanwhile, the predetermined evaluation criteria are determined based on the reliability required for the distance information 354 output from the distance measuring apparatus 301.

Figure 21:
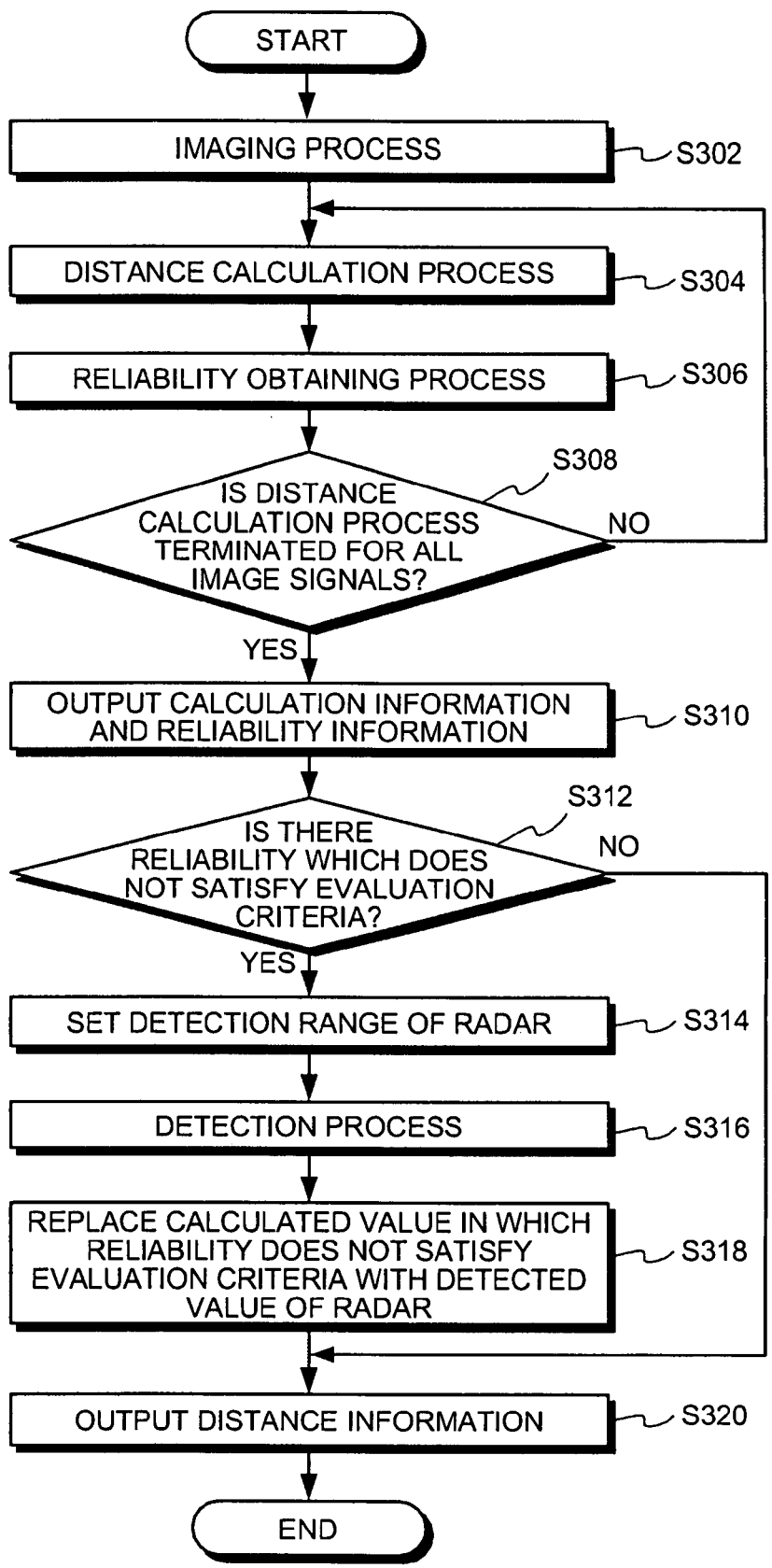
FIG. 21 is a flowchart showing a procedure until output of distance information is completed in the distance measuring apparatus shown in FIG. 20.

Next, the processing operation until the distance calculating unit 320 outputs the distance information 354, out of the processing operations performed by the distance measuring apparatus 301, will be described. FIG. 21 is a flowchart showing the procedure until the distance calculating unit 320 completes the output of the distance information 354 in the distance measuring apparatus 301.

As shown in FIG. 21, the control unit 330 first instructs the imaging unit 10 on the imaging process, and the imaging unit 10 performs the imaging process for imaging a predetermined imaging field under a control by the control unit 330 (step S302), and the right and left cameras 11a and 11b output the image signal group, respectively.

The control unit 330 instructs the distance calculating unit 320 on the distance calculation process for processing the image signal group output from the imaging unit 10 to calculate the distance to the object located in the imaging field. The distance calculating unit 320 receives the instruction from the control unit 330 and the calculating unit 21 performs the distance calculation process for calculating the distance value corresponding to the image signal for each image signal of the image signal group output from the right camera 11a and the left camera 11b (step S304). In addition, the reliability obtaining unit 323 performs a reliability obtaining process for obtaining the minimum value of the SSD value obtained when detecting as the image signal, which is matched the best with the image signal being the calculation target, as the reliability, in the distance calculation process in the calculating unit 21 (step S306).

Thereafter, the calculating unit 21 judges whether the distance calculation process is completed for all the image signals of the image signal group output from the imaging unit 10 or not (step S308). The calculating unit 21 shifts to a step S304 when it judges that the distance calculation process is not completed for all the image signals (step S308: No) to perform the distance calculation process for the image signal to be a next calculation target. In addition, when the calculating unit 21 judges that the distance calculation process is completed for all the image signals (step S308: Yes), the distance calculating unit 320 outputs the calculation information 351 and the reliability information 352 to the control unit 330 (step S310).

Next, in the control unit 330, the interpolating unit 331 refers to the reliability information 352 to compare each reliability and evaluation criteria, and judges whether the reliability which does not satisfy the evaluation criteria exists or not (step S312).

When the interpolating unit 331 judges that there is the reliability which does not satisfy the evaluation criteria, (step S312: Yes), the detection range setting unit 332 obtains the range in which the reliability which does not satisfy the evaluation criteria is distributed, based on the positional information corresponding to the reliability which does not satisfy the evaluation criteria, and sets this range as the detection range of the radar 60 (step S314). Meanwhile, in the calculation information 351, each calculated value and the positional information in the imaging field are related to each other, and in the reliability information 352, the reliability in each calculated value and the positional information in the imaging field corresponding to the calculated value are related to each other. Therefore, the range in which the reliability which does not satisfy the evaluation criteria is distributed is the range corresponding to the calculated value having the reliability which does not satisfy the evaluation criteria. Therefore, the detection range setting unit 332 sets the range corresponding to the calculated value having the reliability which does not satisfy the evaluation criteria as the detection range of the radar 60.

After that, the radar 60 performs the detection process for detecting the distance to the object located in the detection range set by the detection range setting unit 332 (step S316) under the control by the control unit 330, and outputs the detection information 353. The interpolating unit 331 replaces the calculated value, reliability of which does not satisfy the evaluation criteria out of the calculated value of the calculation information 351 with the detected value of the radar 60 in the detection information 353 (step S318), and outputs the replaced information as the distance information 354 (step S320).

Also, when the interpolating unit 331 judges that there is no reliability which does not satisfy the evaluation criteria as a result of the reference to the reliability information 352 (step S312: No), it is considered that each calculated value of the calculation information 351 has the required reliability, so that the interpolating unit 331 outputs the calculation information 351 output from the calculating unit 21 as the distance information 354 (step S320).

Figure 22:
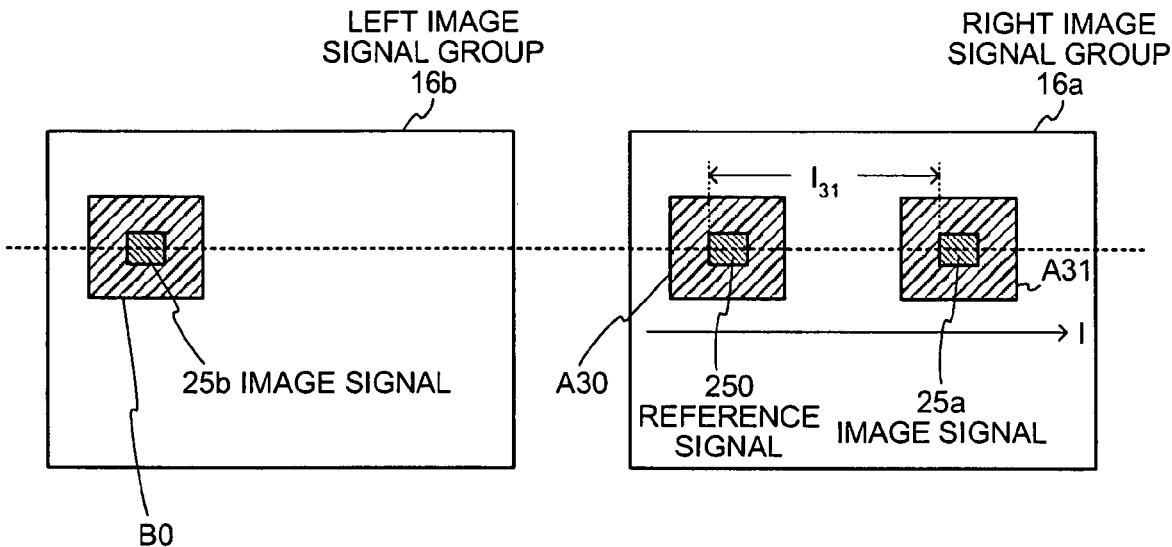
FIG. 22 is a view illustrating a distance calculation process shown in FIG. 21.
Figure 23:
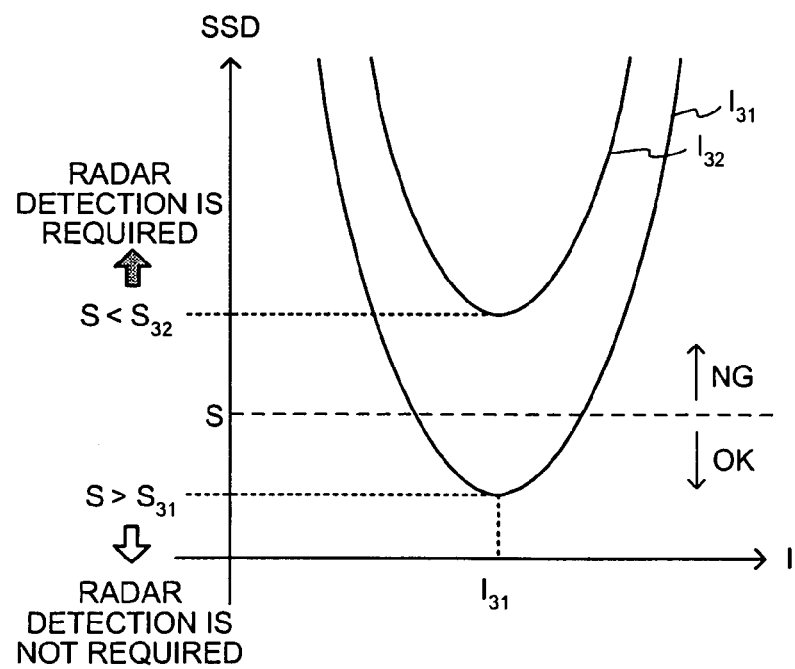
FIG. 23 is a view illustrating a reliability obtaining process shown in FIG. 21.
Figure 24:
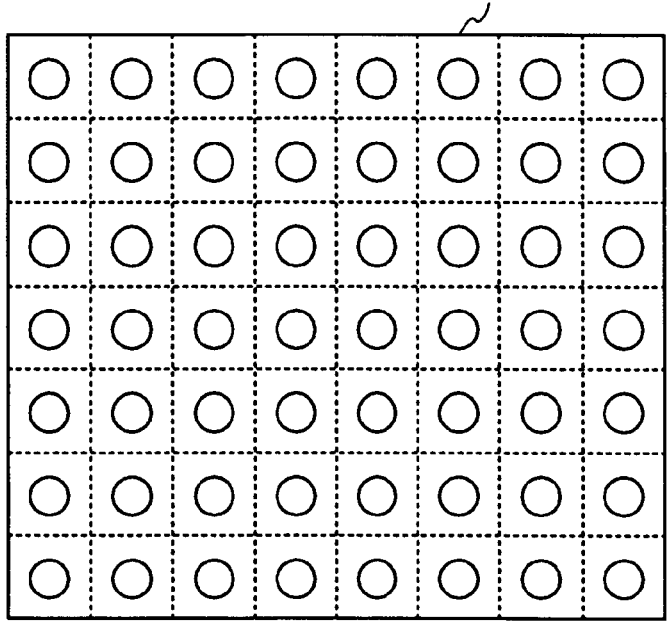
FIG. 24 is a view showing one example of calculation information shown in FIG. 20.

Next, each procedure shown in FIG. 21 will be specifically described. First, the distance calculation process in the calculating unit 21 (step S304) will be described. FIG. 22 is a view illustrating the distance calculation process and schematically illustrating the right image signal group output from the right camera 11a and the left image signal group output from the left camera 11b. As shown in FIG. 22, first, the calculating unit 21 sets a local region B0 having the image signal 25b being the calculation target on the center thereof in the left image signal group 16b. Also, the calculating unit 21 sets a local region A30, range of which is the same as that of the local region B0, having a reference signal 250, position of which is the same as that of the image signal 25b as the center thereof, also in the right image signal group 16a. After that, the calculating unit 21 scans the local region on the same straight line as an arbitrary straight line passing through the image signal 25b, while sequentially calculating the SSD, which is the conformity. As a result, a change in SSD value for the change in movement amount of the local region, as shown in a curved line 131 in FIG. 23, is obtained, and for example, the image signal 25a, which is located on the center of the local region A31, SSD value of which is the minimum, is detected as the image signal which is matched the best with the image signal 25b. After that, the calculating unit 21 obtains a movement amount l31 based on the reference signal 250, and calculates the distance value, which corresponds to the image signal 25b, by using the equation (1). Also, the reliability obtaining unit 323 obtains the SSD, which is the minimum value, out of each SSD value calculated in the distance calculation process for the image signal 25b, as the reliability (step S306). As a result of the distance calculation process for all the image signals, the calculated data 351a in which each calculated value is related to the positional information of each image signal, which is the calculation target, as shown in FIG. 24, and reliability data 352a in which the reliability in each calculated value is related to the positional information of each image signal, which is the calculation target, as shown in FIG. 25, are output from the distance calculating unit 320 (step S310).

The interpolating unit 331 refers to the reliability data 352a to judge whether each reliability of the reliability data 352a satisfies the evaluation criteria or not. In this case, since the SSD value is obtained as the reliability, it is considered that the lower the SSD value, the higher the conformity and the reliability. Therefore, the interpolating unit 331 judges whether each reliability exceeds predetermined evaluation criteria S or not. For example, as shown in FIG. 23, reliability $S_{31}$ of the calculated value which corresponds the curved line $l_{31}$ is under the evaluation criteria S. Therefore, since the reliability $S_{31}$ is provided with required reliability, it is not necessary to replace the calculated value which corresponds to the reliability $S_{31}$ with the detected value of the radar 60, and detection by the radar 60 is not necessary. On the other hand, reliability $S_{32}$ of the calculated value which corresponds to a curved line $l_{32}$ shown in FIG. 23 exceeds the evaluation criteria S, and is not provided with the required reliability. Therefore, since it is required to replace the calculated value which corresponds to the reliability $S_{32}$ with the detected value of the radar 60, it is necessary to detect a range in which the reliability $S_{32}$ is distributed with the radar 60.

Figure 25:
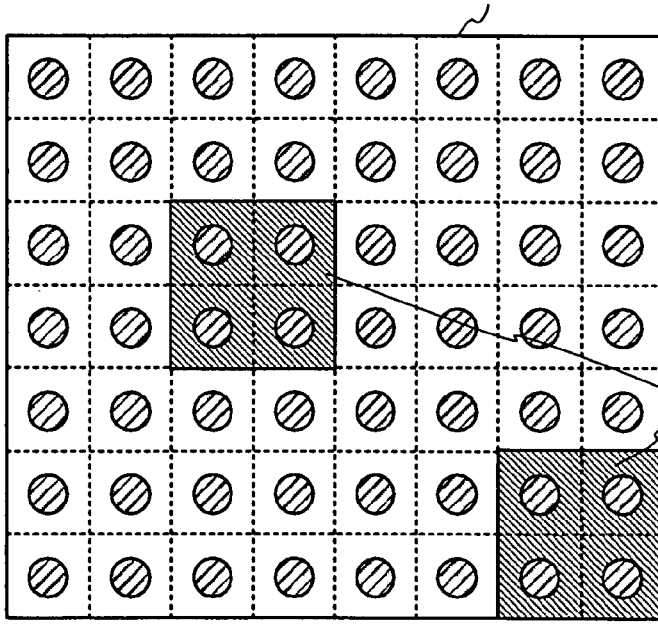
FIG. 25 is a view showing one example of reliability information shown in FIG. 20.
Figure 26:
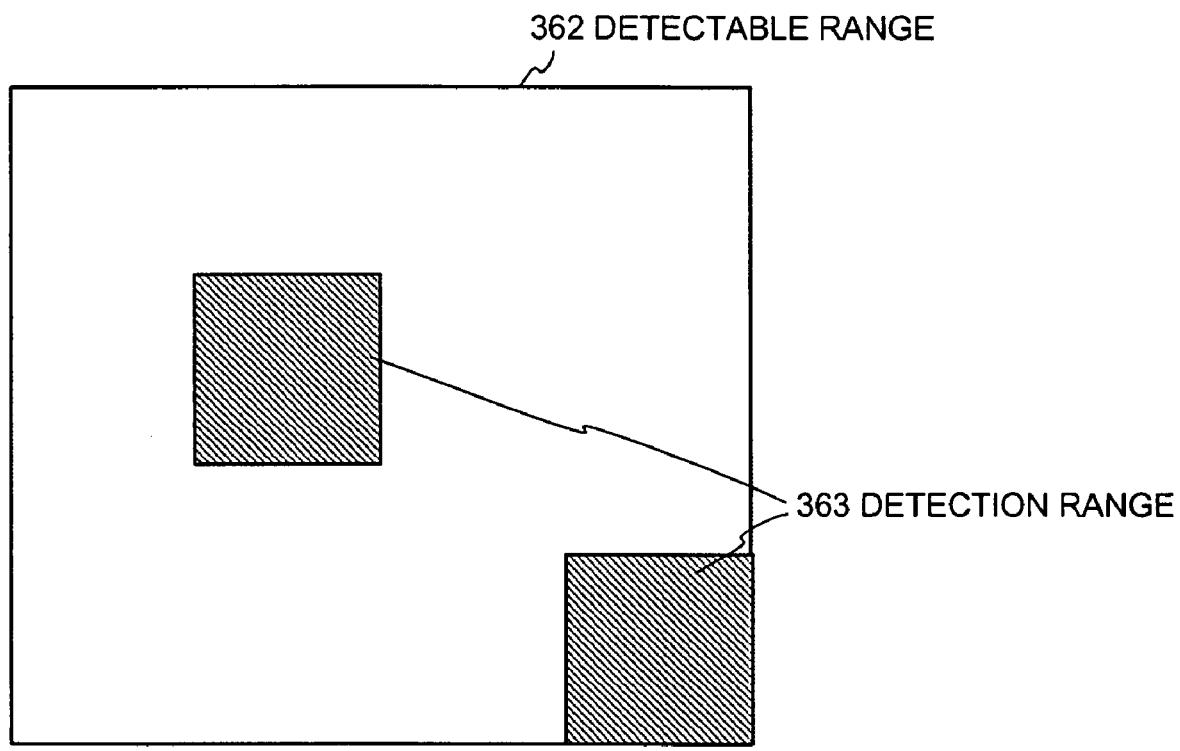
FIG. 26 is a view illustrating a detectable range of radar shown in FIG. 20.
Figure 27:
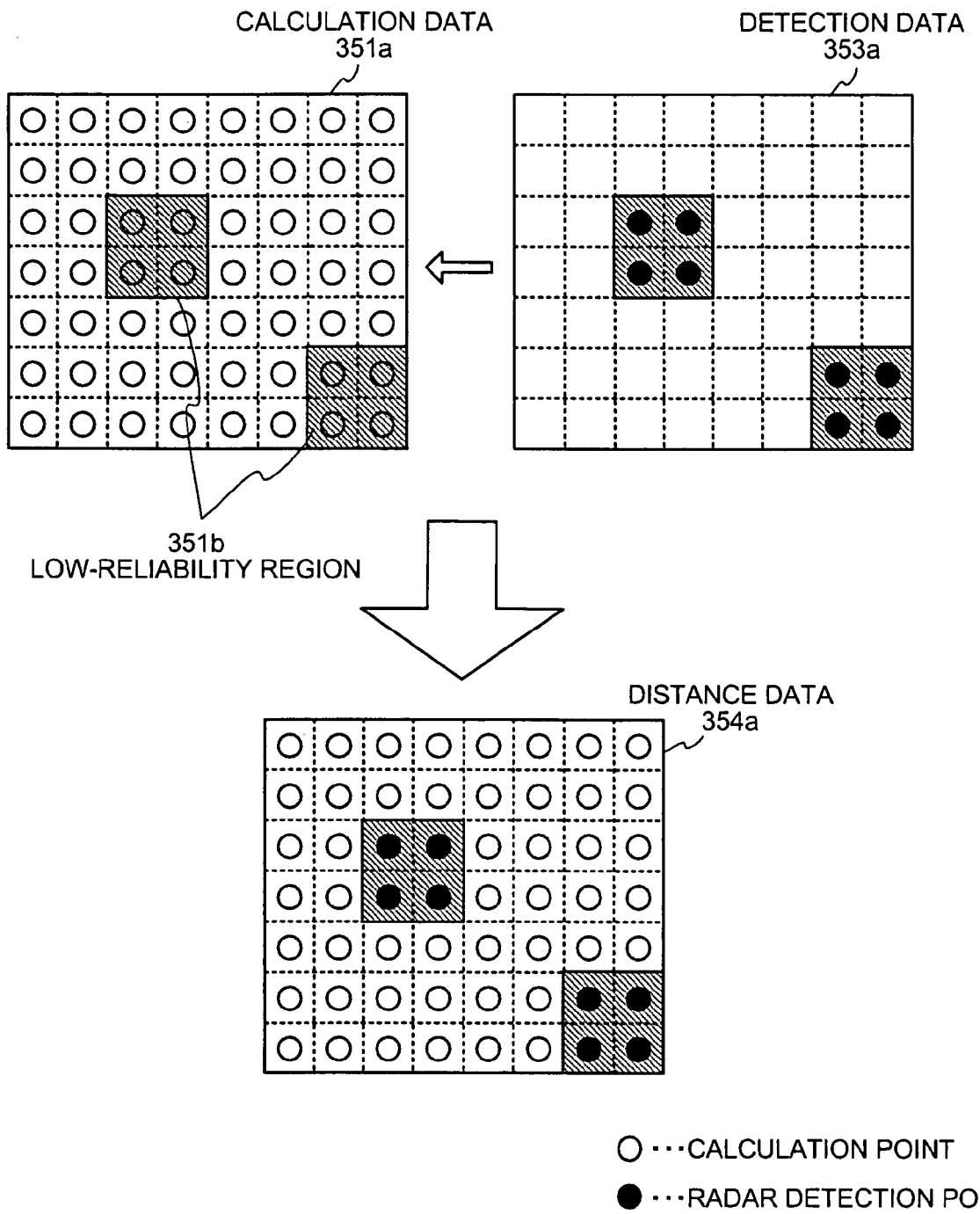
FIG. 27 is a view illustrating a process of an interpolating unit shown in FIG. 20.

In this manner, the interpolating unit 331 judges whether each reliability satisfies the evaluation criteria or not, and obtains a low-reliability region 352b in which reliability which does not satisfy the evaluation criteria is distributed as shown in FIG. 25. Next, the detection range setting unit 332 sets a region which corresponds to the low-reliability region 352b obtained by the interpolating unit 331 out of the detectable range 362, as a detection range 363, as shown in FIG. 26 (step S314). After that, the radar 60 performs the detection process for detecting the distance to the object which is located in the detection range 363 set by the detection range setting unit 332 (step S316). As a result, detected data 353a in which only the detected value in the detection range corresponding to the low-reliability region is included is output from the radar 60, for example, as shown in FIG. 27. After that, the interpolating unit 331 replaces the calculated value of the low-reliability region 351b in which the calculated values having the reliability which does not satisfy the evaluation criteria is distributed out of the calculated values of the calculated data 351a with the detected value of the detected data 353a (step S318) to generate the distance data 354a and outputs the same (step S320).

In this manner, the distance measuring apparatus 301 according to the third embodiment obtains the reliability for each calculated value of the calculation information and outputs the distance information obtained by replacing the calculated value, reliability of which does not satisfy the evaluation criteria with the detected value of the radar 60. The detected value of the radar 60 has the reliability higher than that of the calculated value calculated in the distance calculating unit 320. Therefore, according to the distance measuring apparatus 301 according to the third embodiment, it is possible to obtain the distance information having the high reliability, which satisfies the predetermined reliability, so that it becomes possible to accurately perform various safety drive assist processes based on the distance information.

Also, in the third embodiment, the detection range setting unit 332 sets only a range in which the calculated values, reliability of which does not satisfy the evaluation criteria are distributed, out of the calculation information output from the distance calculating unit 320, as the detection range of the radar 60. Therefore, in the third embodiment, the time required for the detection process may be shortened as compared to the case in which the radar 60 detects the distance value for all the detectable range, so that it becomes possible to rapidly obtain the distance information having a high reliability.

Meanwhile, the case in which the SSD value is calculated as the conformity between the image signals as the reliability and this SSD value is obtained as the reliability has been described in the third embodiment, the invention is not limited to this, and it is possible that other values indicating the conformity between the image signals are calculated and obtained as the reliability. For example, an SAD (Sum of Absolute Difference), which is the sum of an absolute value of a difference between the image signals in the local region, or an NCC (Normalized Cross Correlation), which is a normalized cross correlation between the image signals in the local region may be obtained as the reliability. The calculating unit 21 detects the image signal, SAD value of which is the minimum as the image signal, which is matched the best, when calculating the SAD value, and the reliability obtaining unit 323 obtains the SAD value which corresponds to the image signal as the reliability. The interpolating unit 331 judges that the SAD value satisfies the evaluation criteria in a case in which the SAD value being the reliability is under the predetermined evaluation criteria, and judges that the SAD value does not satisfy the evaluation criteria in a case in which this exceeds the predetermined evaluation criteria. In addition, the calculating unit 21 detects the image signal, NCC value of which is the maximum as the image signal which is matched the best when calculating the NCC value, and the reliability obtaining unit 323 obtains the NCC value which corresponds to the image signal as the reliability. The interpolating unit 331 judges that the NCC value satisfies the evaluation criteria, in a case in which the NCC value being the reliability exceeds the predetermined evaluation criteria, and judges that the NCC value does not satisfy the evaluation criteria in a case in which this is below the predetermined evaluation criteria.

Figure 28:
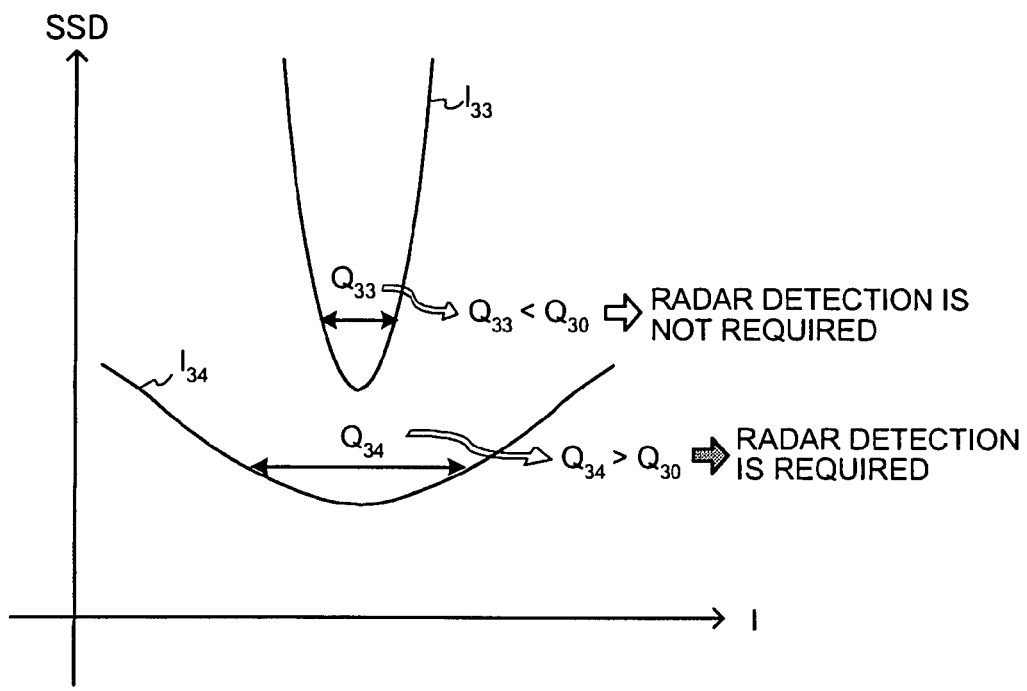
FIG. 28 is a view illustrating the reliability obtaining process shown in FIG. 21.

Also, although the case in which the value itself of the SSD value is compared with the evaluation criteria has been described in the third embodiment, the invention is not limited to this, and it is possible to obtain a Q value of the curved line indicating the change in SSD value for the change in the movement amount of the local region as the reliability and make a comparison with the evaluation criteria based on whether the Q value exceeds the predetermined value being the evaluation criteria or not. For example, in a case in which the Q value is $Q_{33}$, which is not higher than the evaluation criteria $Q_{30}$, as a curved line $l_{33}$ shown in FIG. 28, in the image signal detected in the distance calculation process, the conformity with the image signal being the calculation target is extremely high as compared to an adjacent image signal. Therefore, the calculated value calculated based on the image signal detected in this case is considered to satisfy the required reliability. Therefore, the calculated value which corresponds to the curved line $l_{33}$ is provided with the required reliability and it is not necessary to replace the calculated value with the detected value of the radar 60. On the other hand, in a case in which the Q value is $Q_{34}$, which exceeds the evaluation criteria $Q_{30}$ as a curved line $l_{34}$ shown in FIG. 28, the image signal detected in the distance calculation process has a smaller difference in conformity between the same and the image signals being the calculation targets, as compared to the adjacent image signal. Herein, in a case in which the Q value exceeds the evaluation criteria $Q_{30}$, when considering an accuracy of process condition in each process, a difference between the conformity of the detected image signal and the conformity of the adjacent image signal becomes minute, and it is not always true that the detected image signal actually has the highest conformity. Therefore, it is highly possible that the reliability of the calculation point based on the image signal corresponding to the Q value, which is $Q_{34}$, is low. Therefore, the detection range setting unit 332 judges that it is necessary that the calculated value corresponding to the curved line $l_{34}$ be replaced with the detected value of the radar 60, and sets the detection range corresponding to this calculation point.

Figure 29:
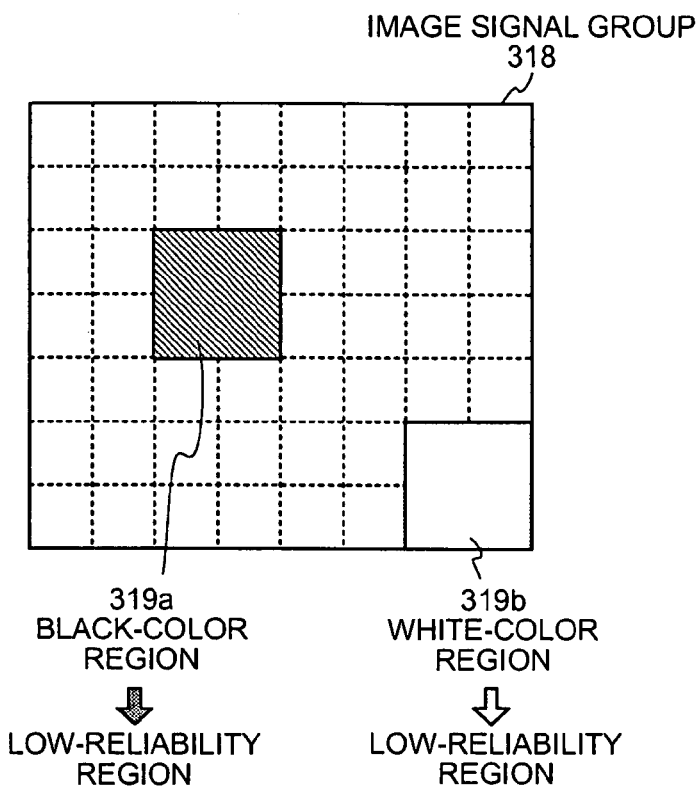
FIG. 29 is a view showing one example of an image signal group output from the imaging unit 10 shown in FIG. 20.

In addition, although the case in which the reliability obtaining unit 323 obtains the conformity as the reliability has been described in the third embodiment, the reliability obtaining unit 323 may obtain color information included in the image signal being the calculation target as the reliability. In this case, the interpolating unit 331 judges a region in which the color information of the image signals, which is located in the vicinity, is substantially the same as the low-reliability region, and the detection range setting unit 332 sets the low-reliability region judged by the interpolating unit 331 as the detection range of the radar 60. This is because it is difficult that the calculating unit 21 detects the image signal which is matched with the image signal included in a black-color region 319a provided with substantially same color information from the other image signal group, as shown in FIG. 29. That is to say, in the other signal group also, the image signal included in the region corresponding to the black-color region 319a is provided with the same color information. Therefore, the image signals distributed in this region have substantially equivalent conformity and there is no difference in conformity. As a result, the calculating unit 21 cannot detect the image signal which is matched with the image signal included in the black-color region 319a from the other image signal group. Therefore, in the third embodiment, a region in which the color information of the image signal locating in the vicinity is subsequently the same, for example, the black-color region 319a and a white-color region 319b shown in FIG. 29, may be obtained as the low-reliability region, based on the color information obtained as the reliability. In this case, the detection range setting unit 332 sets the detection range of the radar 60 by relating the same to the black-color region 319a and the white-color region 319b, and the interpolating unit 331 replaces the calculated value in the black-color region 319a and the white-color region 319b with the detected value of the radar 60. As a result, it becomes possible that the distance measuring apparatus 301 outputs the distance information having high reliability.

Figure 30:
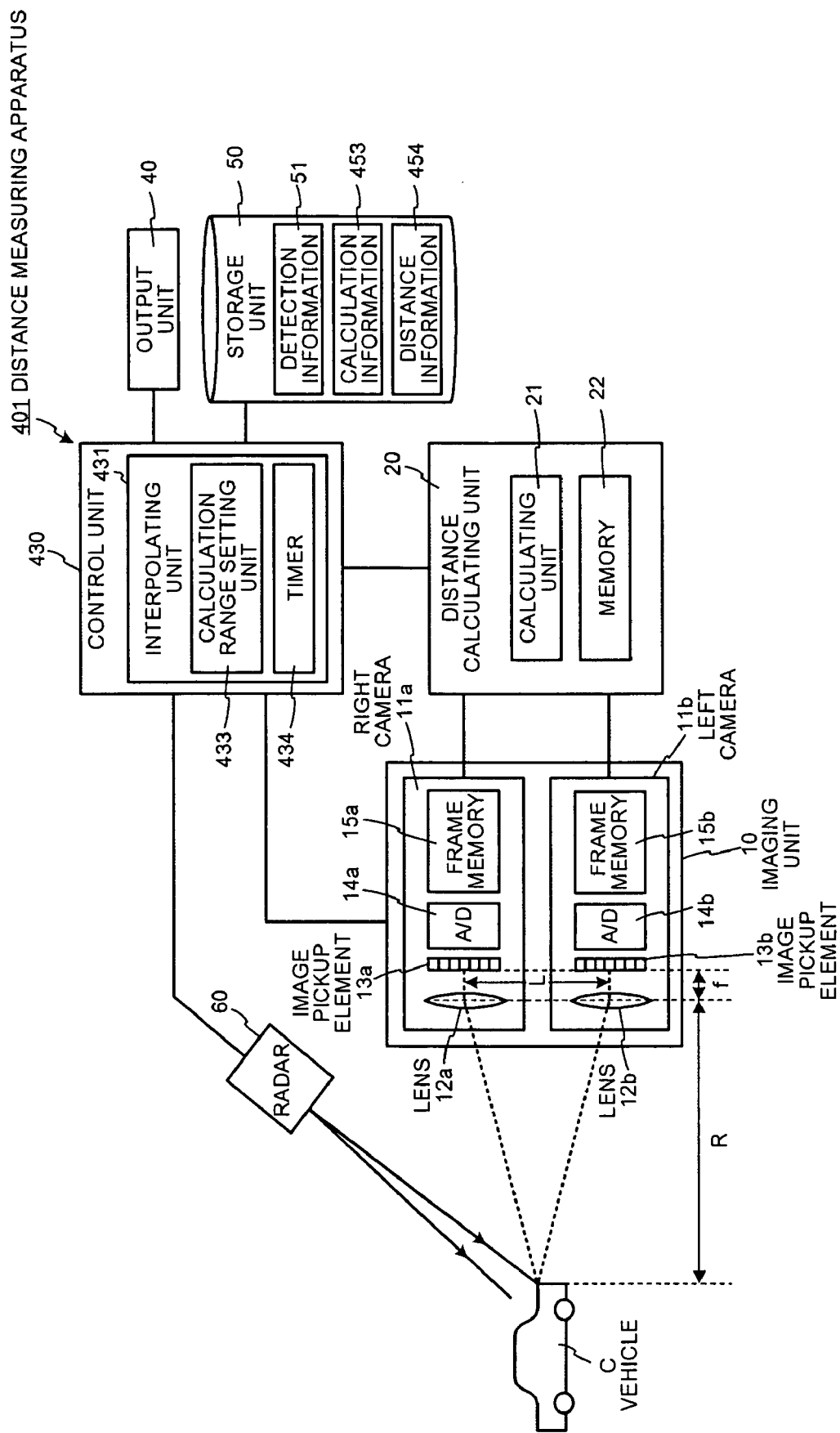
FIG. 30 is a block diagram showing a schematic configuration of a distance measuring apparatus according to a fourth embodiment

Next, a distance measuring apparatus according to a fourth embodiment will be described. FIG. 30 is a block diagram showing a schematic configuration of the distance information device according to the fourth embodiment. As shown in FIG. 30, a distance measuring apparatus 401 according to the fourth embodiment is provided with a control unit 430 in place of the control unit 30 of the distance measuring apparatus 1 shown in FIG. 1. The control unit 430 has the function similar to the control unit 30 and is provided with an interpolating unit 431 having a calculation range setting unit 433 and a timer 434 for measuring time. Meanwhile, a storage unit 50 stores calculation information 453 output from the distance calculating unit 20 and distance information 454 output from the interpolating unit 431.

The interpolating unit 431 has the function similar to that of the interpolating unit 31 shown in FIG. 1, and generates the distance information 454, which is a combination of information in the detected value obtained by interpolating between the detected values in the detection information 51 of the radar 60 by the calculated value of the distance calculating unit 20 and information outside the detection range consisting of the calculated values corresponding to the outside of the detection range of the radar 60. Also, the interpolating unit 431 generates distance information 54 by using previous information outside the detection range until it completes to obtain the information outside the detection range being processed. Also, the interpolating unit 431 obtains the information in the detection range, while the radar 60 obtains the detected value.

The calculation range setting unit 433 sets the calculation range in the distance calculating unit 20 based on a timer value of the timer 434. The distance calculating unit 20 performs the calculation process in the calculation range set by the calculation range setting unit 433.

The calculation range setting unit 433 sets the calculation range, which is the same range as the detection range of the radar 60, when a timer value T of the timer 434 is smaller than a predetermined time period Ts. In this case, the distance calculating unit 20 performs the calculation process for the image signal corresponding to the calculation range, which is the same range as the detection range of the radar 60 set by the calculation range setting unit 433 out of the image signal group output from the imaging unit 10. In addition, the interpolating unit 431 generates the information in the detection range by interpolating between the detected values of the radar 60 with each calculated value corresponding to the calculation range, which is equivalent to the detection range of the radar 60 output from the distance calculating unit 20, and generates the distance information 454 by combining this information in the detection range and the previous information outside the detection range.

On the other hand, in a case in which the timer value T of the timer 434 is not less than a predetermined time period Ts, the calculation range setting unit 433 sets all range in which the distance calculating unit 20 may calculate as the calculation range. In this case, the distance calculating unit 20 performs the calculation process for all the image signals in the image signal group output from the imaging unit 10. The interpolating unit 431 generates the information in the detection range by interpolating between the detected values of the radar 60 with each calculated value, which corresponds to the calculation range being equivalent to the detection range of the radar 60, out of the calculated values output from the distance calculating unit 20, and combines this information in the detection range and the information outside the detection range consisting of the calculated values corresponding to the outside of the detection range out of the calculation information 453 output from the distance calculating unit 20 to generates distance information 454. Meanwhile, the predetermined time period Ts is set, for example, based on a processing capacity of the distance calculating unit 20.

Figure 31:
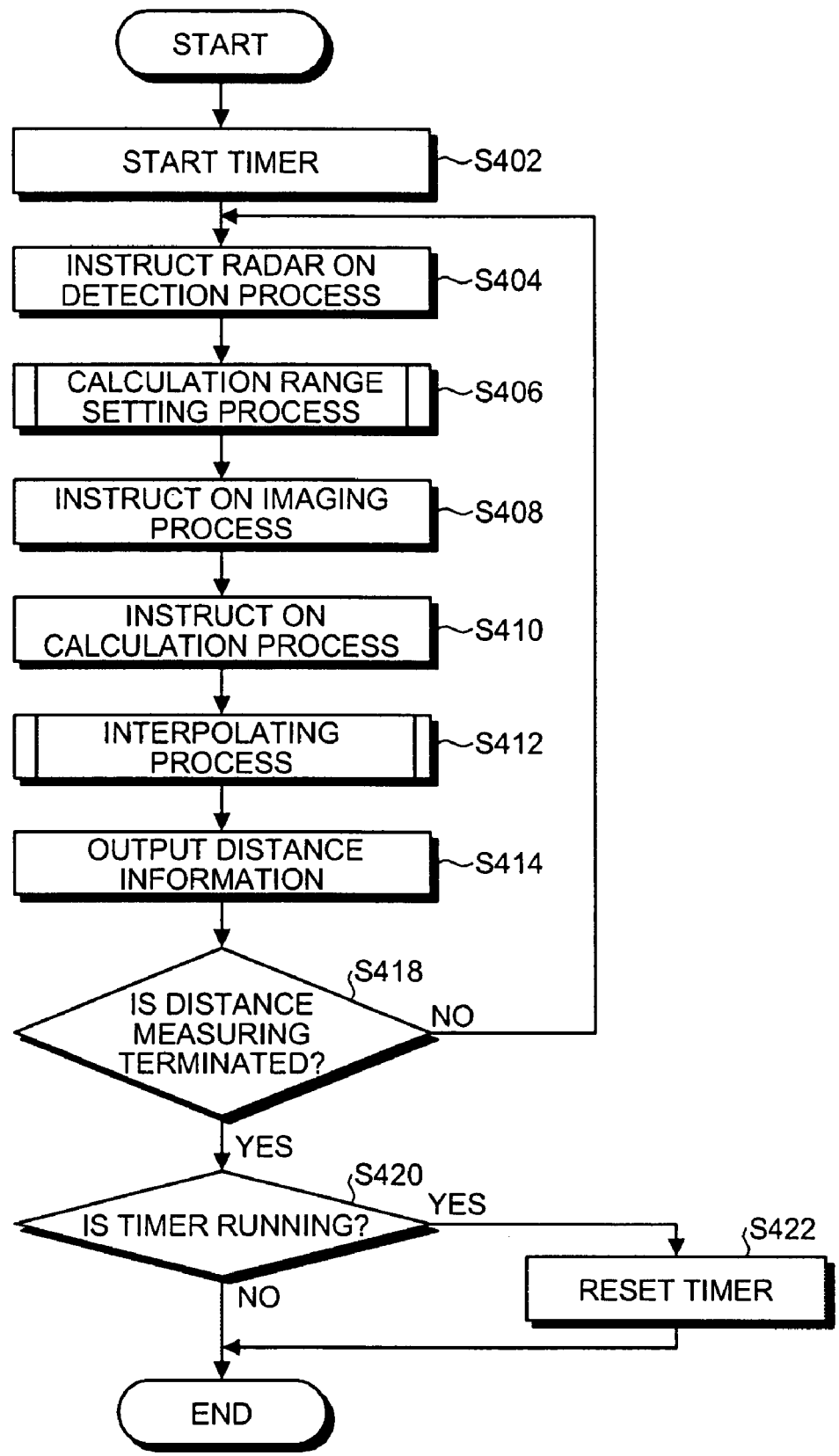
FIG. 31 is a flowchart showing a procedure until output of distance information is completed in the distance measuring apparatus shown in FIG. 30.

Next, the processing operation until the interpolating unit 431 outputs the distance information 454, out of the processing operations performed by the distance measuring apparatus 401, will be described. FIG. 31 is a flowchart showing a procedure until the interpolating unit 431 completes the output of the distance information 454 in the distance measuring apparatus 401.

As shown in FIG. 31, the interpolating unit 431 first makes the timer 434 to start timing (step S402). The control unit 430 instructs the radar 60 on the detection process for detecting the distance to the object located in the detection range (step S404), and the radar 60 performs the detection process following the instruction by the control unit 430 and outputs detection information 51 to the control unit 430.

Next, the calculation range setting unit 433 performs the calculation range setting process for setting the calculation range in the distance calculating unit 20 (step S406). The control unit 430 instructs the imaging unit 10 on the imaging process (step S408), and the imaging unit 10 performs the imaging process for imaging a predetermined imaging field under the control of the control unit 430, and the right camera 11a and the left camera 11b output the image signal group, respectively. After that, the control unit 430 instructs the distance calculating unit 20 on the calculation process for processing the image signal group output from the imaging unit 10 to calculate the distance to the object located in the imaging field (step S410). In the distance calculating unit 20, upon reception of the instruction from the control unit 430, the calculating unit 21 performs the calculation process for calculating each distance value for each image signal corresponding to the calculation range set by the calculation range setting unit 433. The distance calculating unit 20 outputs the calculation information 453 in which each calculated value and the positional information in the imaging field are related to each other to the control unit 430, after the calculation process for each image signal corresponding to the calculation range is completed.

In the interpolating unit 431, an interpolation process for generating the information in the detection range by interpolating between the detected values of the detection information 51 with the calculated value in the corresponding portion of the calculation information 453, and generating the distance information 454 in which the information in the detection range and the information outside the detection range consisting of the calculated values corresponding to the outside of the detection range are combined (step S412), and the interpolating unit 431 outputs the generated distance information 454 (step S414). Then, the control unit 430 judges whether the instruction of termination of the distance measuring is input or not (step S418), and in a case in which it is judged that the instruction of termination of the distance measuring is not input (step S418: No), the procedure shifts to the step S404 to continue measuring the distance. On the other hand, in a case in which the control unit 430 judges that the instruction of termination of the distance measuring is input (step S418: Yes), this judges whether the timer 434 is timing or not (step S420). In a case in which the interpolating unit 431 judges that the timer 434 is not timing (step S420: No), the distance measuring is terminated. In addition, in a case in which the control unit 430 judges that the timer 434 is timing (step S420: Yes), this returns the timer value of the timer 434 to 0 and resets the same (step S422), and after that, the distance measuring is terminated.

Figure 32:
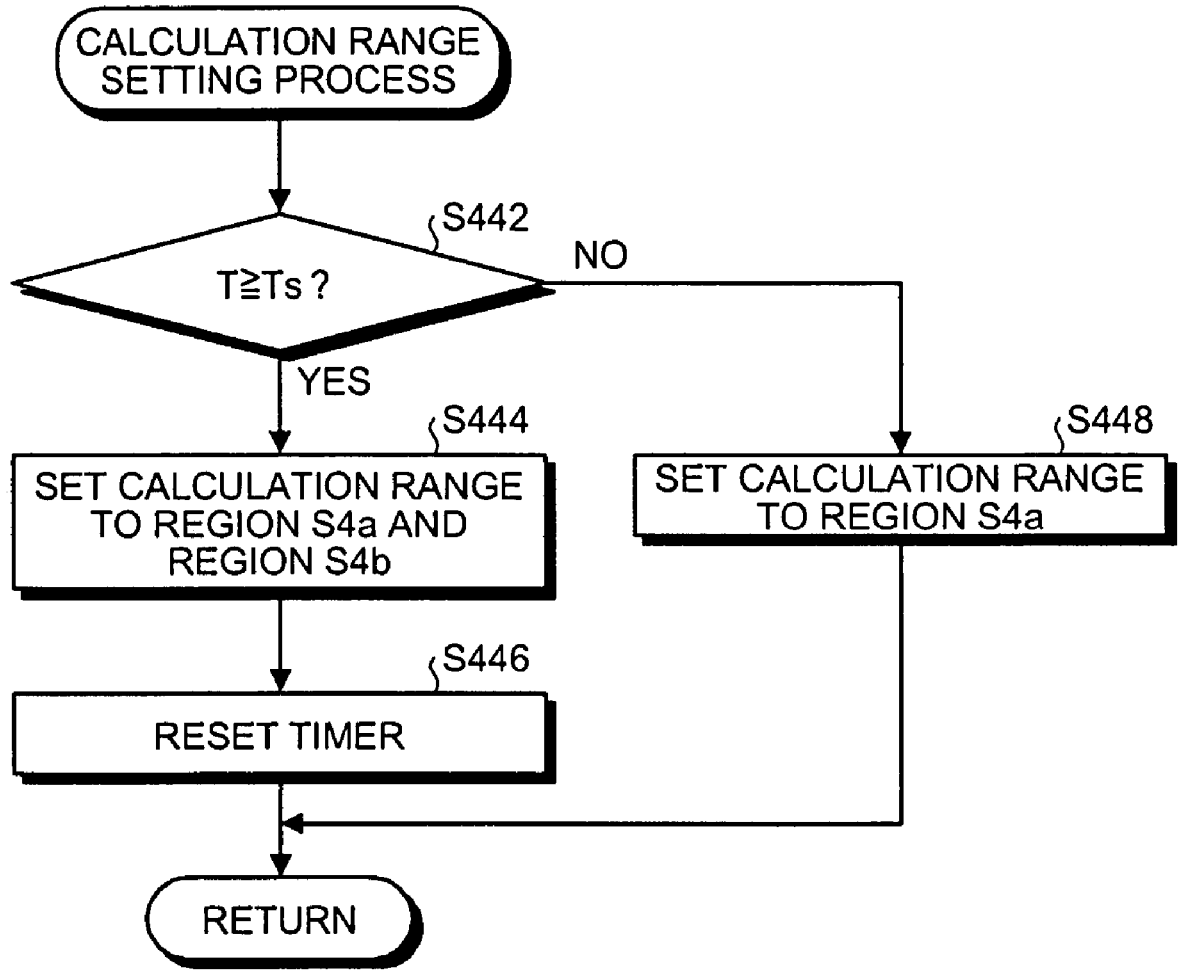
FIG. 32 is a flowchart showing a procedure of a calculation range setting process shown in FIG. 31.
Figure 33:
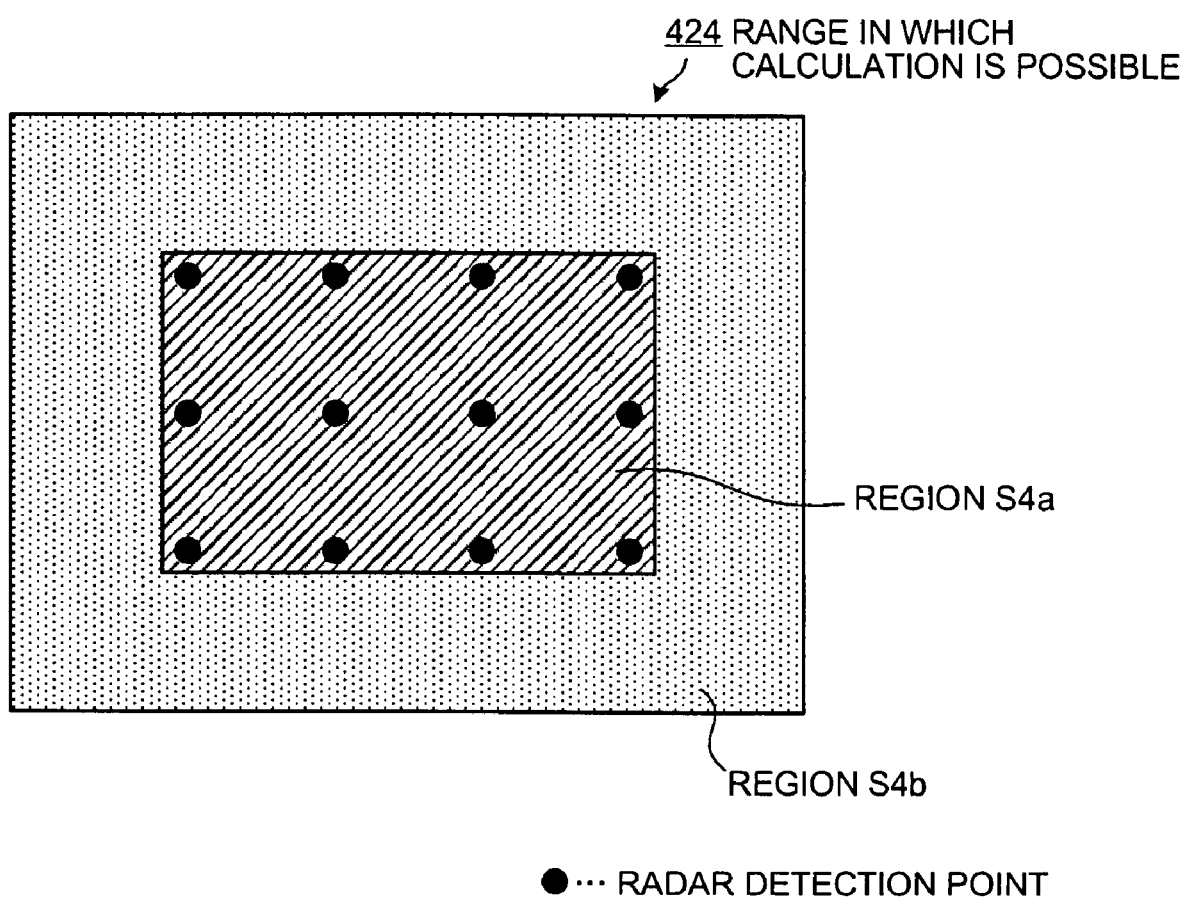
FIG. 33 is a view illustrating the calculation range setting process shown in FIG. 32.

Next, the calculation range setting process shown in FIG. 31 will be described. FIG. 32 is a flowchart showing a procedure of the calculation range setting process shown in FIG. 31. In addition, FIG. 33 is a view illustrating a range in which the distance calculating unit 20 may calculate. In FIG. 33, the range in which the calculation is possible and the detection range of the radar 60 are overlapped, and in FIG. 33, the detection points in the radar 60 are indicated by "•".

As shown in FIG. 32, the calculation range setting unit 433 judges whether the timer value T of the timer 434 is not less than the predetermined time period Ts or not (step S442). The calculation range setting unit 433 sets the calculation range of the distance calculating unit 20 to the region S4a which is the same range as the detection range of the radar 60 and the region S4b, which is the region outside the detection range of the radar 60 (step S444) when it judges that the timer value T of the timer 434 is not less than the predetermined time period Ts (step S442: Yes). Specifically, the calculation range setting unit 433 sets the region S4a, which is the same range as the detection range of the radar 60, and the region S4b, which is the region outside the region S4a, that is to say, all the range in which the calculation process is possible, as the calculation range, as shown in FIG. 33. The interpolating unit 431 returns the timer value of the timer 434 to 0 and resets the same (step S446). As a result, the distance calculating unit 20 performs the calculation process for each image signal corresponding to the calculation range, which is the region S4a and the region S4b set by the calculation range setting unit 433, and outputs the calculation information 453 corresponding to each calculation range.

On the other hand, the calculation range setting unit 433 sets the calculation range of the distance calculating unit 20 to the region S4a being the same range as the detection range of the radar 60 (step S448), when it judges that the timer value T of the timer 434 is less than the predetermined time period Ts, that is to say, the timer value T does not reach the predetermined time Ts (step S442: No), and terminates the calculation range setting process. As a result, the distance calculating unit 20 performs the calculation process for each image signal corresponding to the calculation range being the region S4a set by the calculation range setting unit 433, and outputs the calculation information 453 corresponding to each calculation range.

Figure 34:
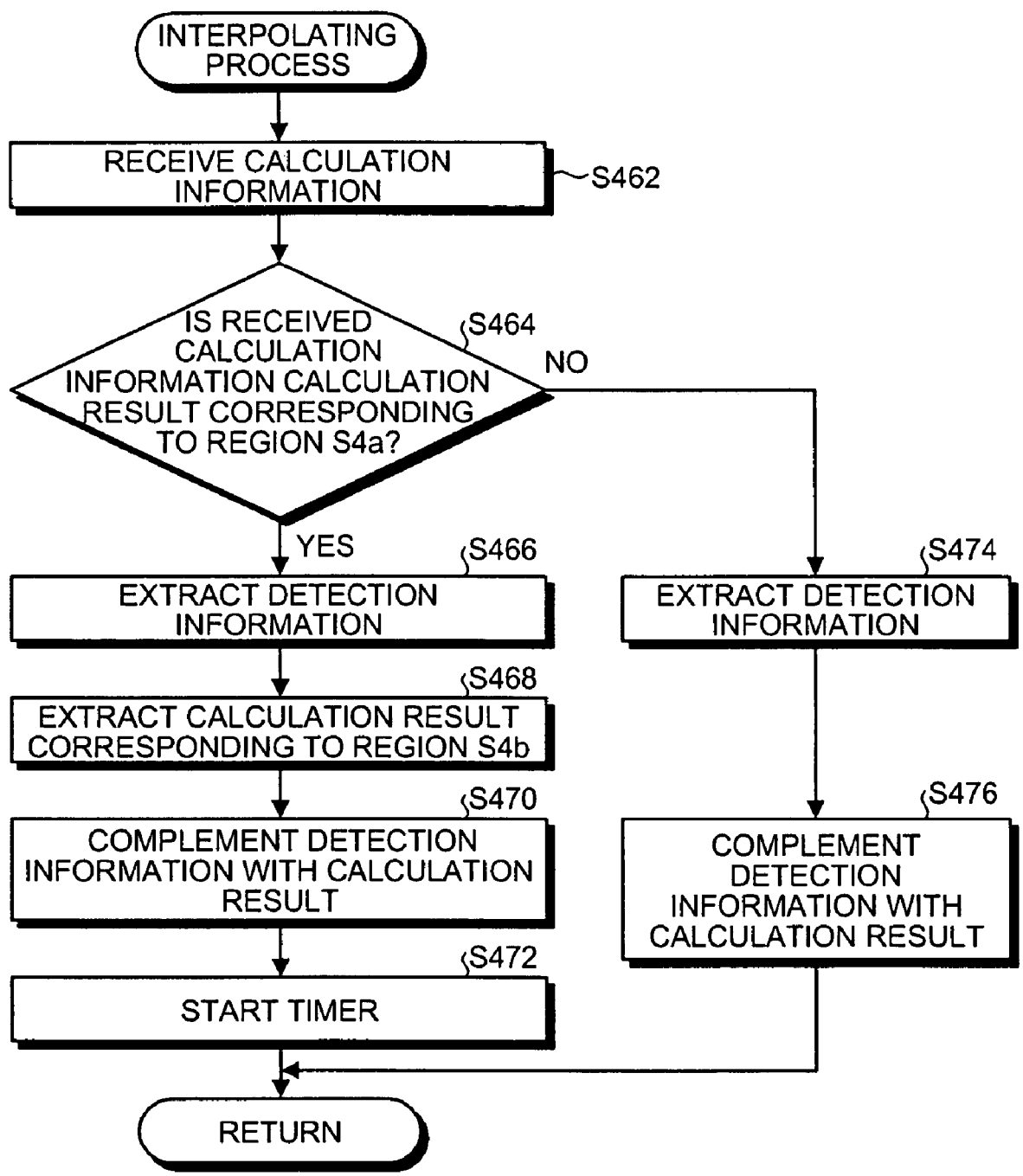
FIG. 34 is a flowchart showing a procedure of an interpolation process shown in FIG. 31.

Next, the interpolation process shown in FIG. 31 will be described. FIG. 34 is a flowchart showing a procedure of the interpolation process shown in FIG. 31. As shown in FIG. 34, the interpolating unit 431 receives the calculation information 453 output from the distance calculating unit 20 (step S462). Next, the interpolating unit 431 judges whether the received calculation information 453 is the calculation result corresponding to the region S4a or not (step S464).

The interpolating unit 431 extracts the detection information 51 (step S466), when it judges that the received calculation information 453 is the calculation result corresponding to the region S4a (step S464: Yes). After that, the interpolating unit 431 obtains the calculation information including the previous information outside the detection range from the storage unit 50, and extracts the calculation result for the region S4b from the calculation information (step S468). The interpolating unit 431 complements the detection information 51 with the calculation result corresponding to the region S4a output from the distance calculating unit 20 and the calculation result corresponding to the region S4b obtained from the storage unit 50 (step S470) to generate the distance information 454. After that, The interpolating unit 431 makes the timer 434 to start timing (step S472) and terminates the interpolation process.

On the other hand, the interpolating unit 431 extracts the detection information 51 (step S474), when it judges that the received calculation information 453 is not the calculation result corresponding to the region S4a (step S464: No), that is to say, the calculation result corresponding to the regions S4a and S4b, complements the detection information 51 with the calculation result corresponding to the regions S4a and S4b output from the distance calculating unit 20 (step S476), and terminates the interpolation process.

Next, the interpolation process shown in FIG. 34 will be specifically described. First, the interpolation process in a case in which the calculation information 453 output from the distance calculating unit 20 is the calculation result for the region S4a will be described with reference to FIG. 35. In FIG. 35, the radar detection points by the radar 60 are indicated by "•" and the calculation points by the distance calculating unit 20 are indicated by "○".

As shown in FIG. 35, the interpolating unit 431 extracts the detected data 451a from the storage unit 50 (step S466), and extracts the information outside the detection range, that is to say, the calculated data 453b corresponding to the region S4b from the calculation information including the previous information outside the detection range stored in the storage unit 50 (step S468), when this judges that the calculated data 453a output from the distance calculating unit 20 is the calculation result for the region S4a (step S464: Yes). Then, the interpolating unit 431 interpolates between the detected values of the detected data 451a with the calculated values of the calculated data 453a to generate the information in the detection range. In this case, the distance information corresponding to the region S4a in the distance data 454a becomes the information in the detection range. Also, the interpolating unit 431 combines the information in the detection range and the calculated data 453a of the region S4b corresponding to the outside of the detection range to generate the distance data 454a and terminates the interpolation process.

Figure 36:
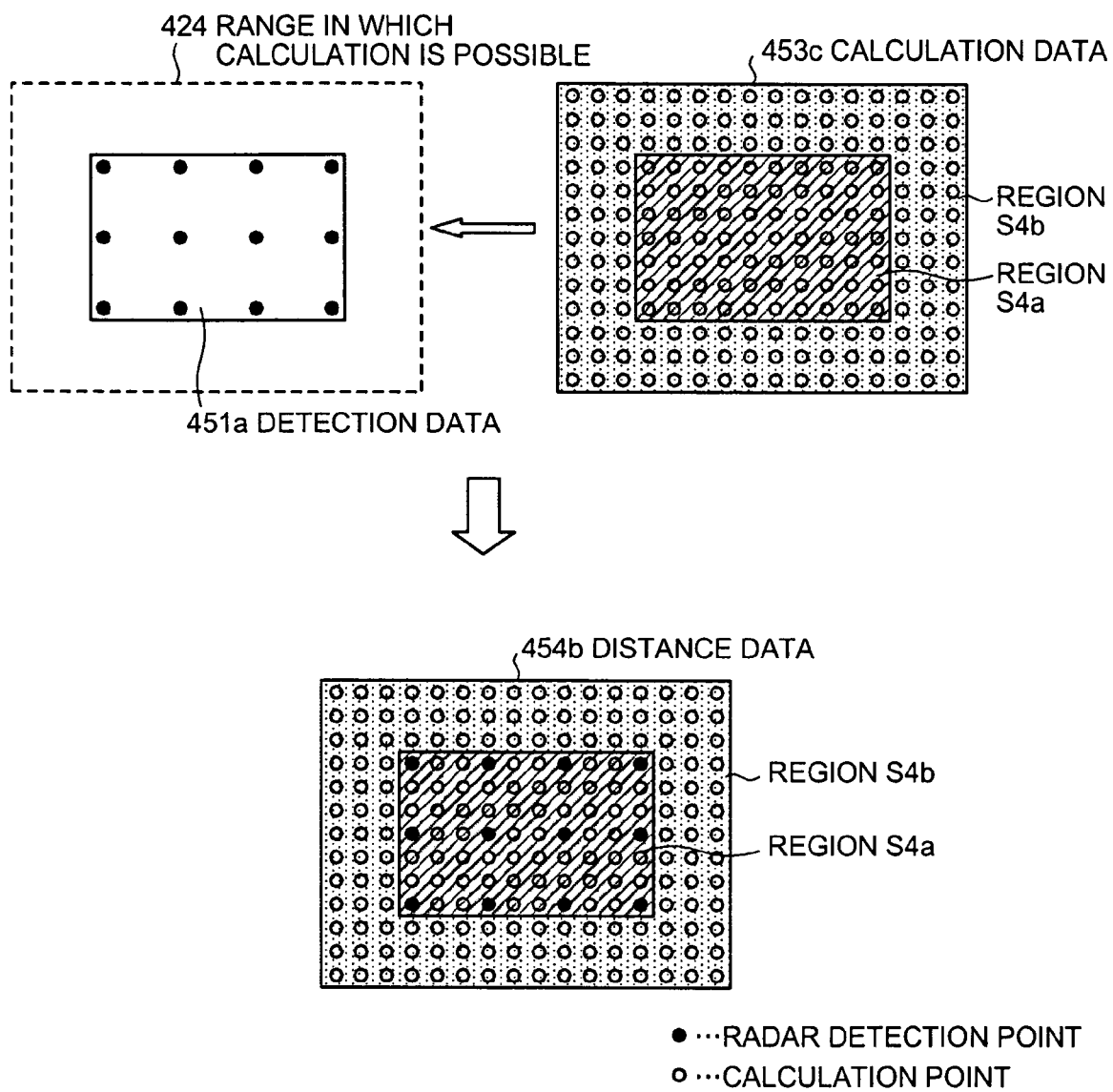
FIG. 36 is a view illustrating the interpolation process shown in FIG. 31.

On the other hand, the interpolation process in a case in which the calculation information 453 output from the distance calculating unit 20 is the calculation result for the regions S4a and S4b will be described with reference to FIG. 36. In FIG. 36, as in FIG. 35, the radar detection points by the radar 60 are indicated by "•" and the calculation points by the distance calculating unit 20 are indicated by "○".

As shown in FIG. 36, the interpolating unit 431 extracts the detected data 451a (step S474), when it judges that the calculated data 453c output from the distance calculating unit 20 is the calculation result for the regions S4a and S4b (step S464: No). In this case, the calculation result corresponding to the region S4b is included in the calculated data 453c output from the distance calculating unit 20, so that it is not necessary that the interpolating unit 431 extract the previous information outside the detection range from the storage unit 50. The interpolating unit 431 interpolates between the detected values of the detected data 451a with the calculated values of the region S4a in the calculated data 453c to generate the information in the detection range. Then, the interpolating unit 431 combines the calculation information of the region S4b in the calculated data 453c to the generated information in the detection range as the information outside the detection range to generate the distance data 454b and terminates the interpolation process.

In this manner, the distance measuring apparatus 401 according to the fourth embodiment generates the distance information in which the information in the detection range obtained by interpolating between the detected values of the radar 60 with the calculated values of the distance calculating unit 20 and the information outside the detection range consisting of the calculated values corresponding to the outside of the detection range of the radar 60 are combined, and outputs the same. Therefore, in the distance measuring apparatus 401 according to the fourth embodiment, it becomes possible to obtain the highly accurate distance information over a wide range.

In addition, in the fourth embodiment, the distance calculating unit 20 calculates the distance value for all the image signals output from the imaging unit 10 in every predetermined time period Ts, following the calculation range set by the calculation range setting unit 433, and other than that, calculates the distance value for the image signal corresponding to the region, which is the region equivalent to the detection range of the radar 60 out of the range in which the calculation is possible. That is to say, the distance calculating unit 20 does not always calculate the distance value for every image signal output from the imaging unit 10 in each calculation process. Therefore, as compared to the conventional distance measuring apparatus in which the distance calculating unit always calculates the distance value for every image signal output from the imaging unit, in the fourth embodiment, it becomes possible to reduce the number of the image signals, which are to be the calculation target. As a result, in the distance measuring apparatus 401 according to the fourth embodiment, it becomes possible to shorten the processing time in the calculation process as compared to the conventional distance measuring apparatus, and it becomes possible to obtain the distance information rapidly.

Figure 37:
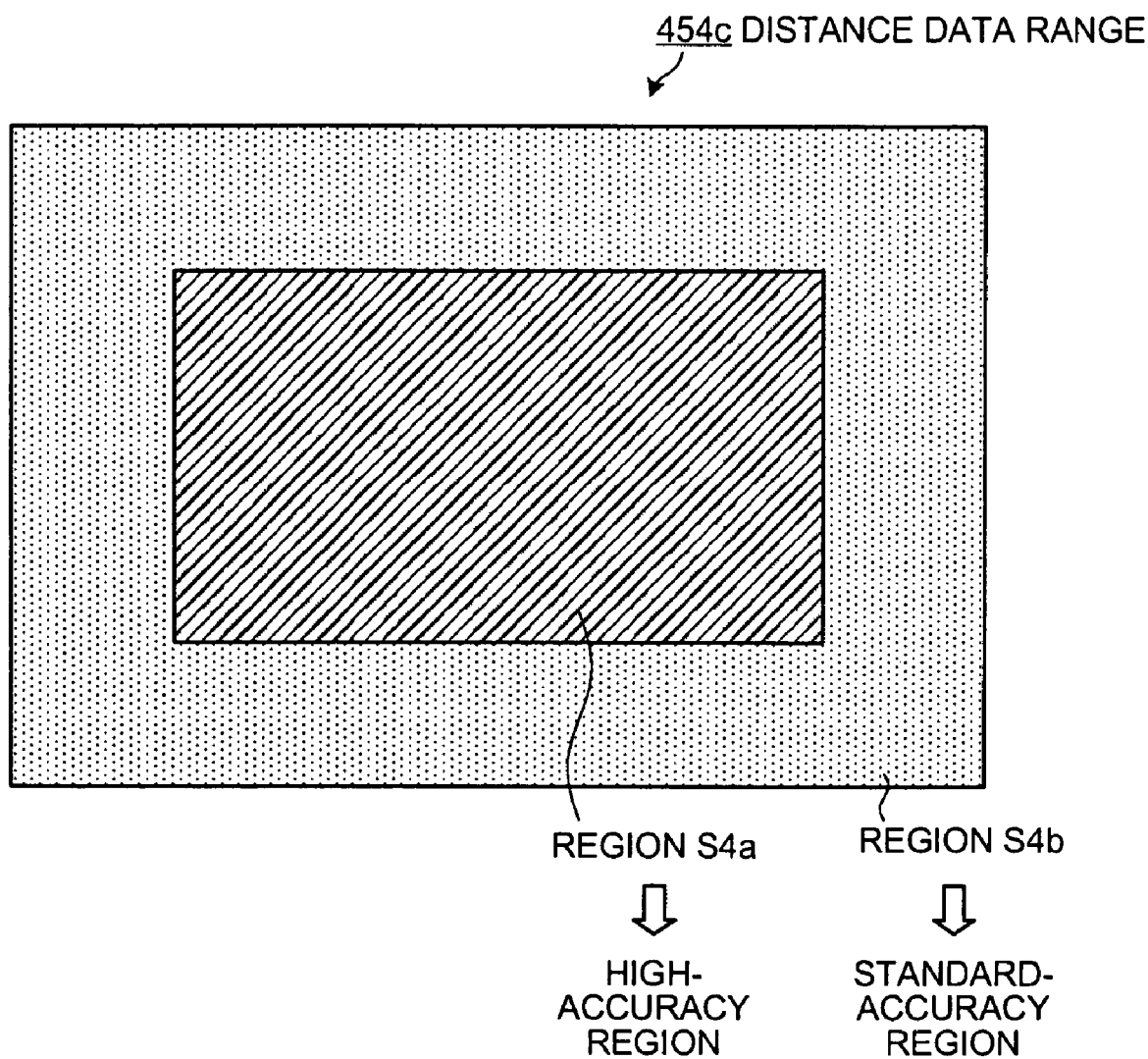
FIG. 37 is a view illustrating distance information shown in FIG. 30.
Figure 38:
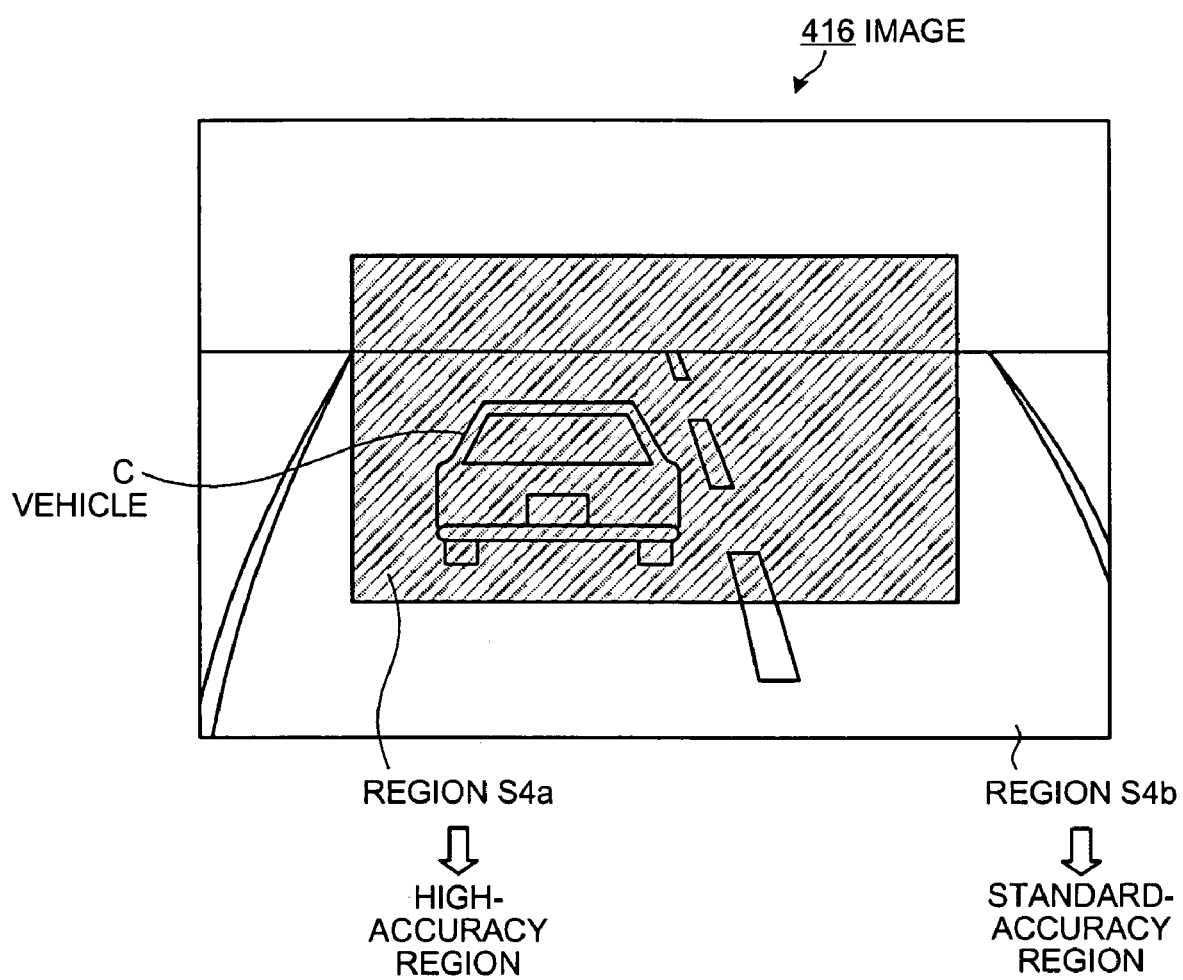
FIG. 38 is a view showing one example of an image picked up by an imaging unit shown in FIG. 30.

Also, the distance measuring apparatus 401 according to the fourth embodiment outputs the information in the detection range obtained by interpolating between the detected values of the radar 60 with the calculated values of the distance calculating unit 20, every time the distance measuring apparatus 401 generates the distance information 454. That is to say, the region S4a in the distance data range 454c of FIG. 37 always includes the newest distance information. Therefore, as shown in an image 416 in FIG. 38, when measuring an inter-vehicle distance between own vehicle and the vehicle ahead, in a case in which a region in which the vehicle C ahead is highly likely to be located is set as the detection range of the radar 60, that is to say, the region S4a, the region in which the vehicle C is highly likely to be located becomes the high-accuracy region. As a result, in the fourth embodiment, it is possible to obtain the distance information to the vehicle C substantially in real time, and it becomes possible to perform various safety drive assist processes in time. On the other hand, in the fourth embodiment, the information outside the detection range is generated every predetermined time period Ts, and before the predetermined time period Ps lapses, the distance information 454 is generated by using the previous information outside the detection range. Therefore, the region S4b in the distance data range 454c in FIG. 37 becomes a standard-accuracy region in which the distance information is updated every predetermined time period Ts. For example, as shown in FIG. 38, when measuring the inter-vehicle distance between the own vehicle and the vehicle ahead, when the region in which the vehicle ahead is unlikely to be located is set as the region outside the detection range of the radar 60, that is to say, the region S4b, the region in which the vehicle C is unlikely to be located becomes the standard-accuracy region. Herein, it is not necessary that the distance value be frequently obtained in the region in which the vehicle C is unlikely to be located, as compared to the region in which the vehicle C is highly likely to be located. Therefore, in the fourth embodiment, it is possible to efficiently obtain the necessary distance information by setting the region in which the vehicle C is unlikely to be located as the standard-accuracy region.

Therefore, the distance measuring apparatus 401 according to the fourth embodiment is capable of rapidly obtaining the high-accuracy and detailed distance information without thinning of the calculation time and the calculation pixel, narrowing of the calculation distance range, calculation process of only the edge portion, and reduction of resolution performance, and as a result, it becomes possible to perform various safety assist processes based on the distance information accurately and in time.

Next, a fifth embodiment will be described. Although it has been supposed that the detection range of the radar is set in advance before measuring the distance in the fourth embodiment, in the fifth embodiment, a case in which the detection range of the radar is variable and the detection range is unknown will be described.

Figure 39:
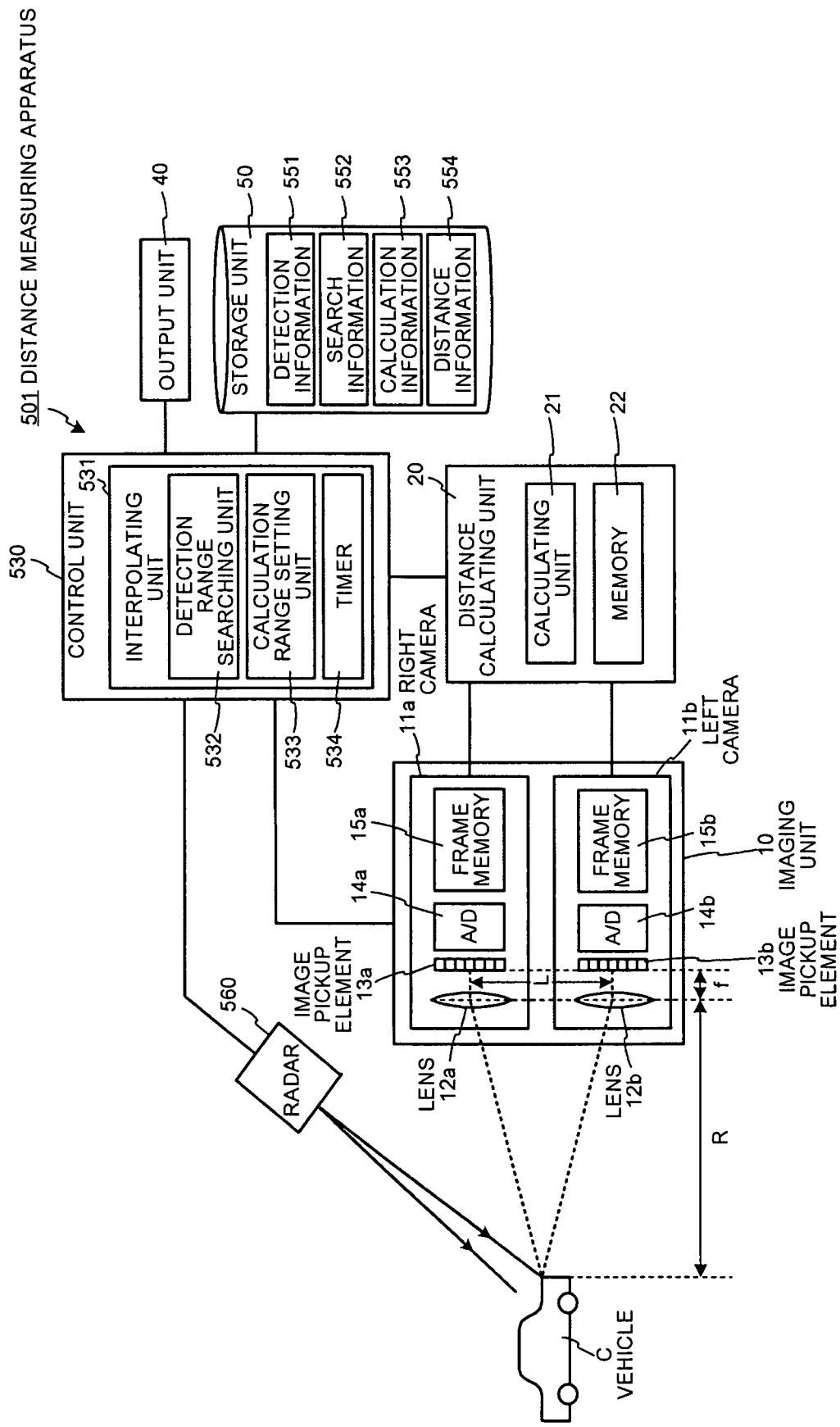
FIG. 39 is a block diagram showing a schematic configuration of a distance measuring apparatus according to a fifth embodiment.

FIG. 39 is a block diagram showing a schematic configuration of a distance measuring apparatus according to the fifth embodiment. As shown in FIG. 39, a distance measuring apparatus 501 according to the fifth embodiment is provided with a control unit 530 in place of the control unit 430 of the distance measuring apparatus according to the fourth embodiment and is provided with radar 560 in place of the radar 60. The control unit 530 has the function similar to that of the control unit 30 and has an interpolating unit 531 having a detection range searching unit 532, a calculation range setting unit 533 and a timer 534. The detection range of the radar 560 may be changed by control of the control unit 530. Meanwhile, the storage unit 50 stores search information 552 output from the interpolating unit 531, calculation information 553 output from the distance calculating unit 20 and distance information 554 output from the interpolating unit 531.

The control unit 530 is provided with the function similar to that of the control unit 430 in the fourth embodiment. The interpolating unit 531 is provided with the function similar to that of the interpolating unit 531 in the fourth embodiment. The detection range searching unit 532 searches for the detection range of the radar 560 based on detection information 551 output from the radar 560. The calculation range setting unit 533 has the function similar to that of the calculation range setting unit 433 in the fourth embodiment, and has the function to set the calculation range of the distance calculating unit 20 based on the search result of the detection range searching unit 532. The timer 534 has the function to measure the time similarly to the timer 434 in the fourth embodiment.

Figure 40:
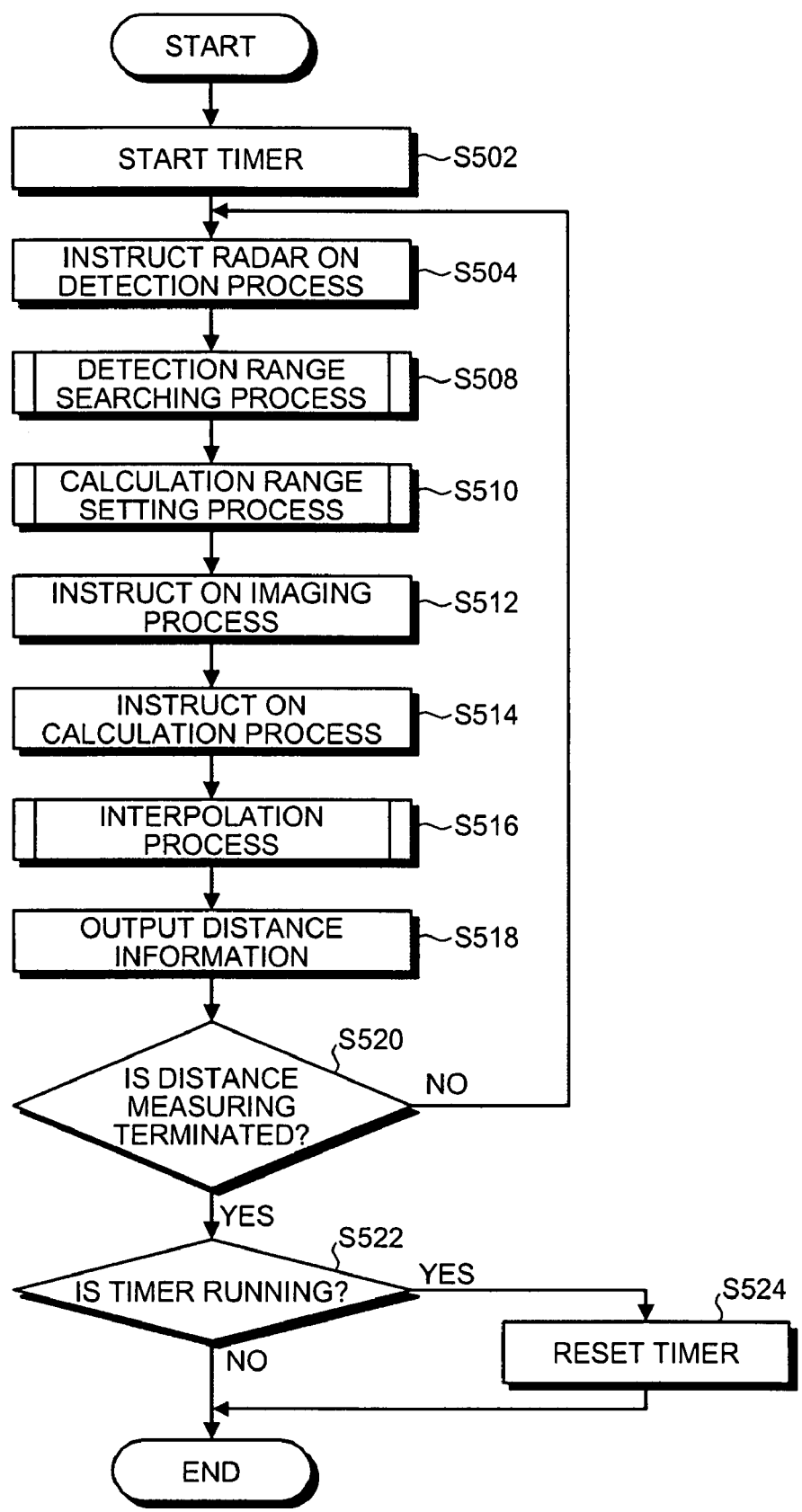
FIG. 40 is a flowchart showing a procedure until output of distance information is completed in the distance measuring apparatus shown in FIG. 39.

Next, a procedure until the interpolating unit 531 outputs the distance information 554 out of the processing operations performed by the distance measuring apparatus 501 will be described. FIG. 40 is a flowchart showing the procedure until the interpolating unit 531 outputs the distance information 554 out of the processing operations performed by the distance measuring apparatus 501.

As shown in FIG. 40, the interpolating unit 531 first makes the timer 534 to start timing (step S502). Next, the control unit 530 instructs the radar 560 on the detection process for detecting the distance to the object located in the detection range, as in the fourth embodiment (step S504), and the radar 560 performs the detection process to output the detection information 551 to the control unit 530.

The detection range searching unit 532 performs the detection information searching process for searching for the detection range of the radar 560 (step S508), and the calculation range setting unit 533 performs the calculation range setting process for setting the calculation range of the distance calculating unit 20 by using the search information 552 output from the detection range searching unit 532 (step S510). The control unit 530 instructs the imaging unit 10 on the imaging process (step S512), as in the fourth embodiment, and the imaging unit 10 performs the imaging process. Next, the control unit 530 instructs the distance calculating unit 20 on the calculation process (step S514), and the distance calculating unit 20 performs the calculation process for calculating the distance value for each image signal corresponding to the calculation range set by the calculation range setting unit 553 out of the image signal group output from the imaging unit 10. Then, the interpolating unit 531 performs the interpolation process by performing the procedure similar to the procedure shown in FIG. 34 (step S516) to output the distance information 554 (step S518).

The control unit 530 judges whether the instruction of termination of the distance measuring process is input or not (step S520), as in the fourth embodiment, and when this judges that the termination of the distance measuring process is not instructed (step S520: No), the procedure shifts to the step S504 to continue to measure the distance. In addition, when the control unit 530 judges that the termination of the distance measuring process is instructed (step S520: Yes), the interpolating unit 531 judges whether the timer 534 is timing or not (step S522) as in the fourth embodiment. The interpolating unit 531 resets the timing value of the timer 534 (step S524) and terminates the distance measuring process when this judges that the timer 534 is timing (Step S522: Yes), and terminates the distance measuring process when this judges that the timer 534 is not timing (step S522: No).

Figure 41:
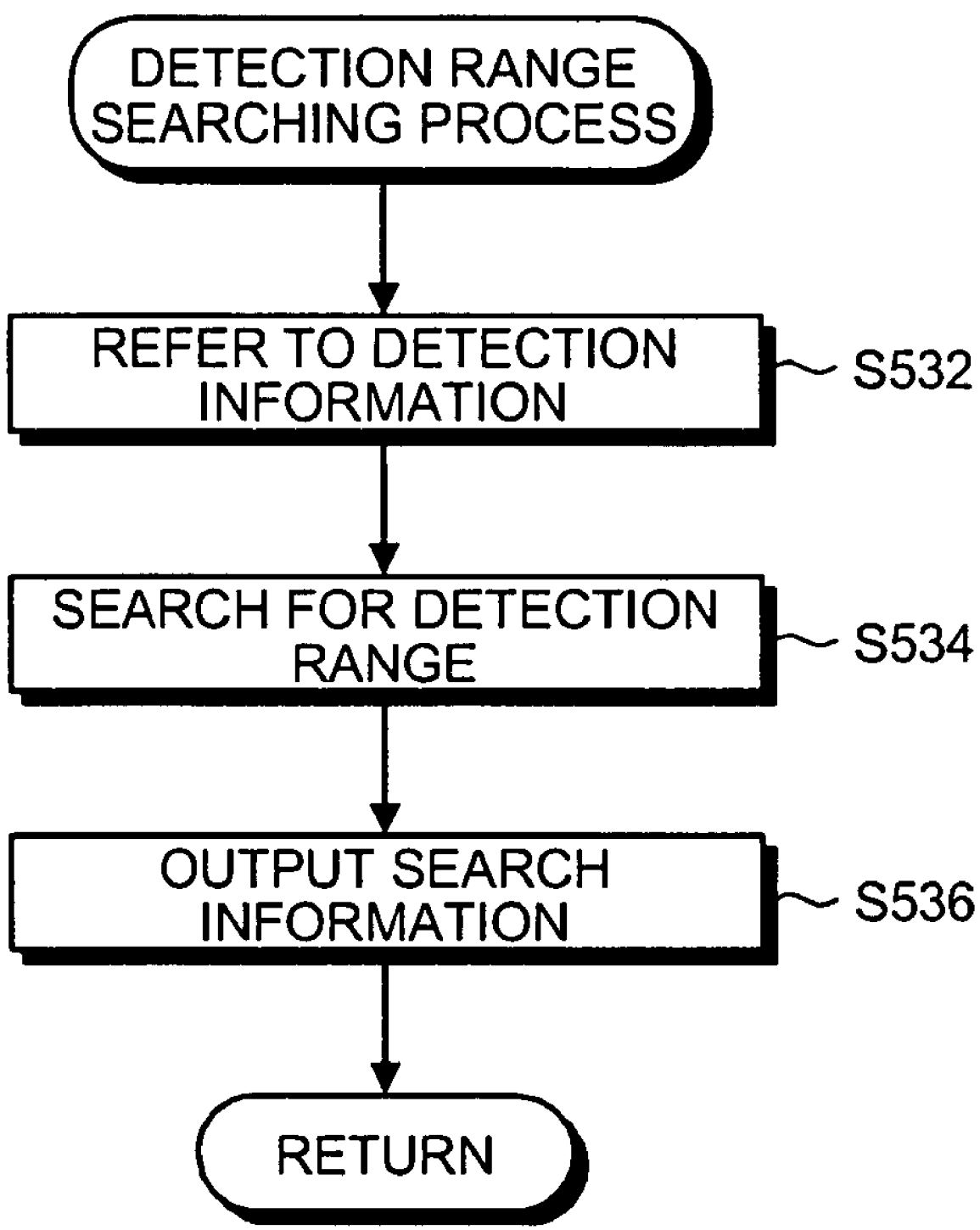
FIG. 41 is a flowchart showing a procedure of a detection range searching process shown in FIG. 40.

Next, the detection range searching process shown in FIG. 40 will be described. FIG. 41 is a flowchart showing a procedure of the detection range searching process shown in FIG. 40. As shown in FIG. 41, the detection range searching unit 532 first refers to the detection information 551 output from the radar 560 (step S532). In the detection information 551, the detected value obtained by detecting the distance to the object located in the detection range and the positional information in the detection range are related to each other. Therefore, the detection range searching unit 532 refers to the detection information 551 and searches for the detection range of the radar 560 based on the positional information in the detection information 551 (step S534) to output the search information 552 (step S536).

Figure 42:
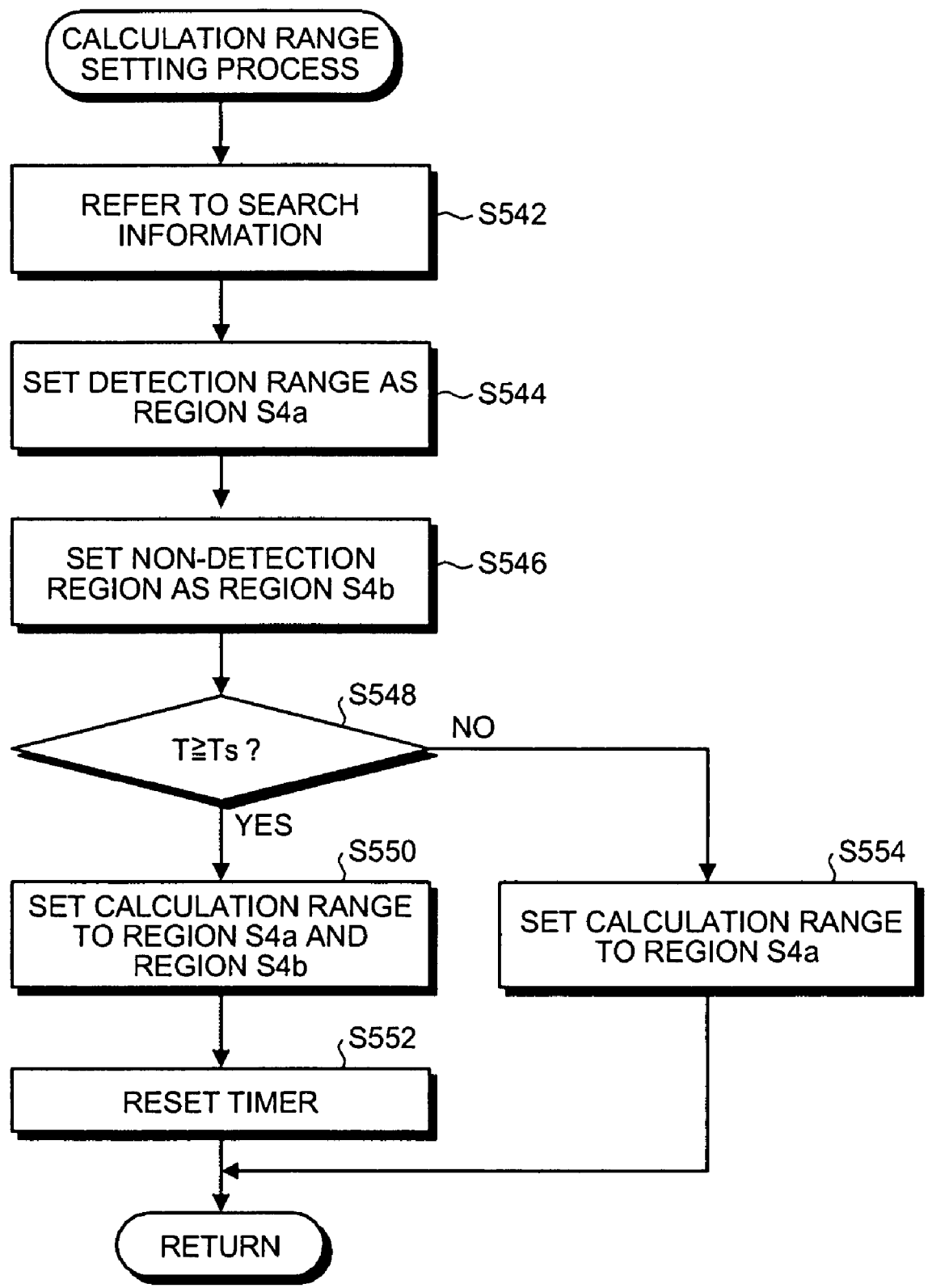
FIG. 42 is a flowchart showing a procedure of a calculation range setting unit shown in FIG. 40.
Figure 43:
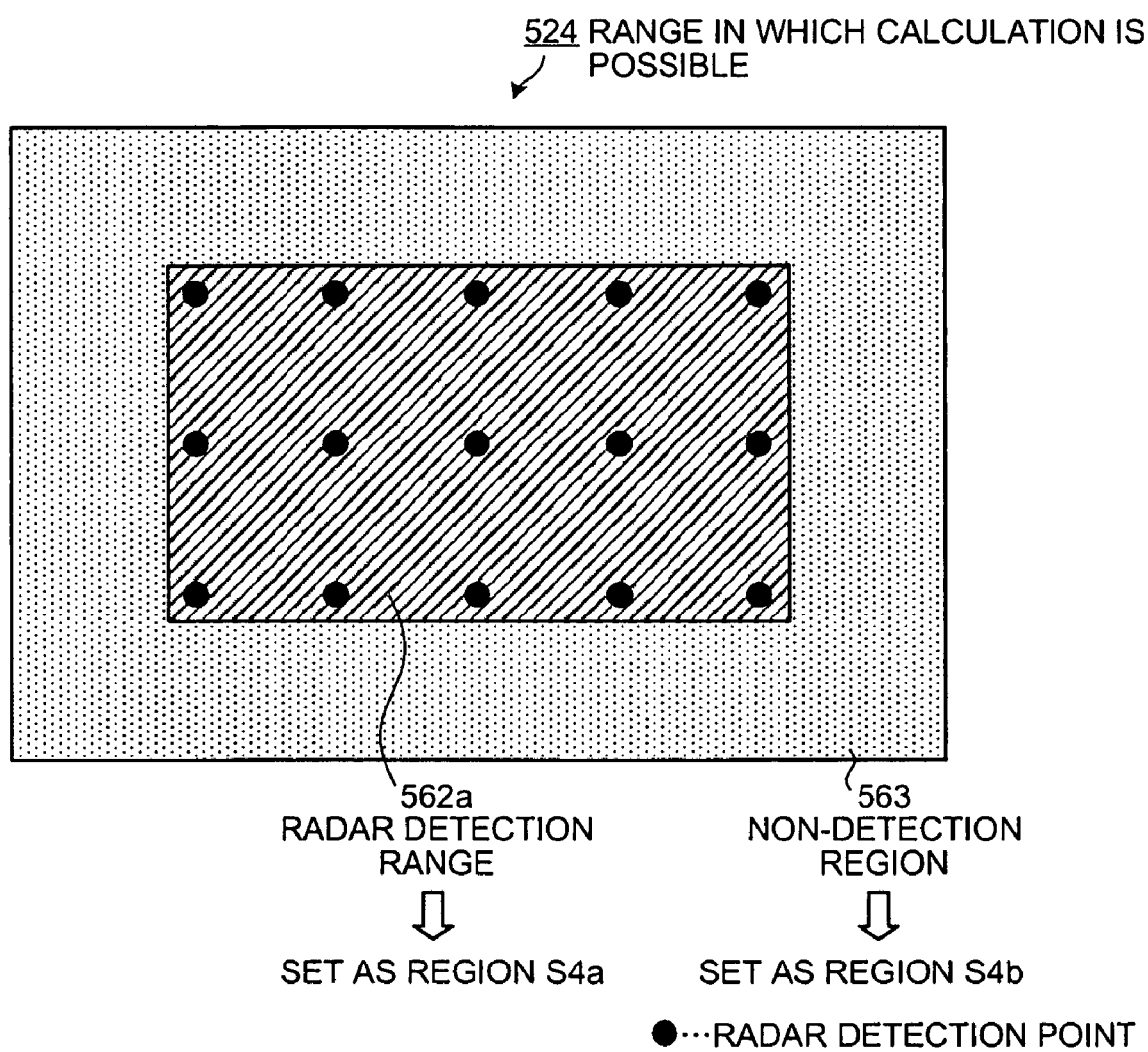
FIG. 43 is a view illustrating the calculation range setting process shown in FIG. 40.

Next, the calculation range setting process shown in FIG. 40 will be described. FIG. 42 is a flowchart showing a procedure of the calculation range setting process shown in FIG. 40. As shown in FIG. 42, the calculation range setting unit 533 refers to the search information 552 output from the detection range searching unit 532 (step S542). Next, the calculation range setting unit 533 sets the detection range of the radar 560 in the search information 552 as the region S4a (step S544). Also, the calculation range setting unit 533 sets the region other than the region S4a out of the range in which the distance calculating unit 20 may calculate, that is to say, the non-detection region by the radar 560, as the region S4b (step S546). Therefore, as shown in FIG. 43 for example, out of the range 524 in which the calculation is possible, a region corresponding to the radar detection range 562a is set as the region S4a, and the non-detection region 563, which is the region outside the detection region by the radar 560, is set as the region S4b.

Then, the calculation range setting unit 533 judges whether the timer value T of the timer 534 is not smaller than the predetermined time period Ts or not (step S548). The calculation range setting unit 533 sets the regions S4a and S4b, that is to say, all the regions in which the calculation is possible, as the calculation range of the distance calculating unit 20 (step S550) when the calculation range setting unit 533 judges that the timer value T of the timer 534 is not smaller than the predetermined time period Ts (step S548: Yes), and returns the timer value of the timer 534 to 0 to reset the same (step S522). Also, the calculation range setting unit 533 sets the calculation range of the distance calculating unit 20 to the region S4a (step S554) when this judges that the timer value T of the timer 534 does not reach the predetermined time period Ts (step S548: No).

After that, the distance calculating unit 20 performs the calculation process following the calculation range set by the calculation range setting unit 533, and the interpolating unit 531 judges the calculation range of the calculation information 553 output from the distance calculating unit 20 and generates the distance information 554 by combining the information in the detection range obtained by interpolating between the detected values of the radar 560 with the calculated values of the distance calculating unit 20 and the information outside the detection range consisting of the calculated values corresponding to the outside of the detection range of the radar 560, as in the fourth embodiment. Therefore, the distance measuring apparatus 501 according to the fifth embodiment is capable of providing the effect similar to that of the fourth embodiment.

Figure 44:
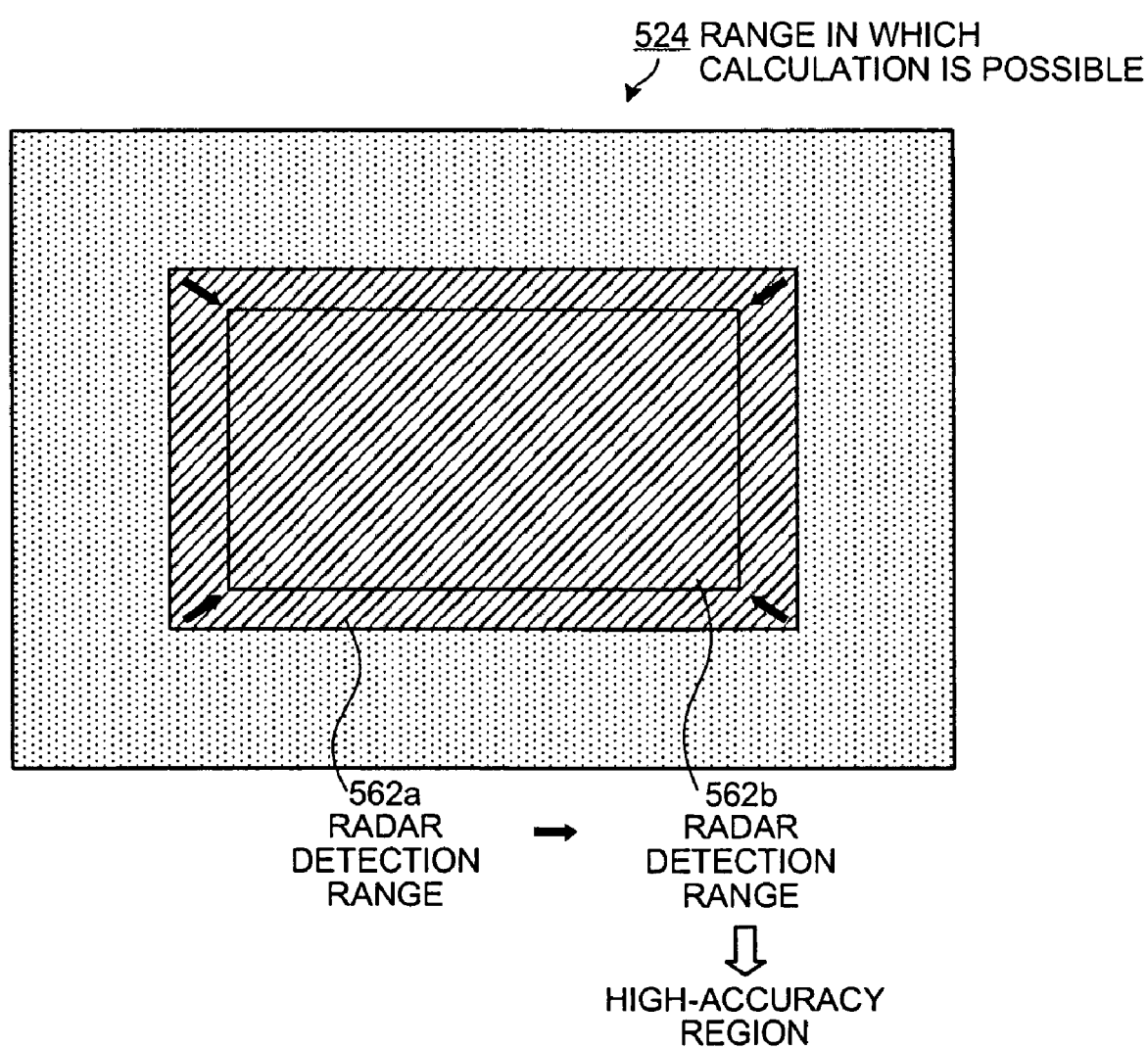
FIG. 44 is a view illustrating the calculation range setting process shown in FIG. 40.

Also, in the calculation range setting process, the calculation range setting unit 533 sets the calculation range of the distance calculating unit 20 according to the detection range of the radar 560 searched by the detection range searching unit 532, thereby, even in a case in which the detection range of the radar 560 changes from the radar detection range 562a to the radar detection range 562b as shown in FIG. 44, it is possible to flexibly set the calculation range corresponding to the radar detection range 562b. Therefore, in the present embodiment, even when the detection range of the radar 560 changes, the distance information in which the region corresponding to the detection range of the radar 560 is always the high-accuracy region can be output, so that it becomes possible to smoothly output the highly accurate, detailed distance information.

Figure 45:
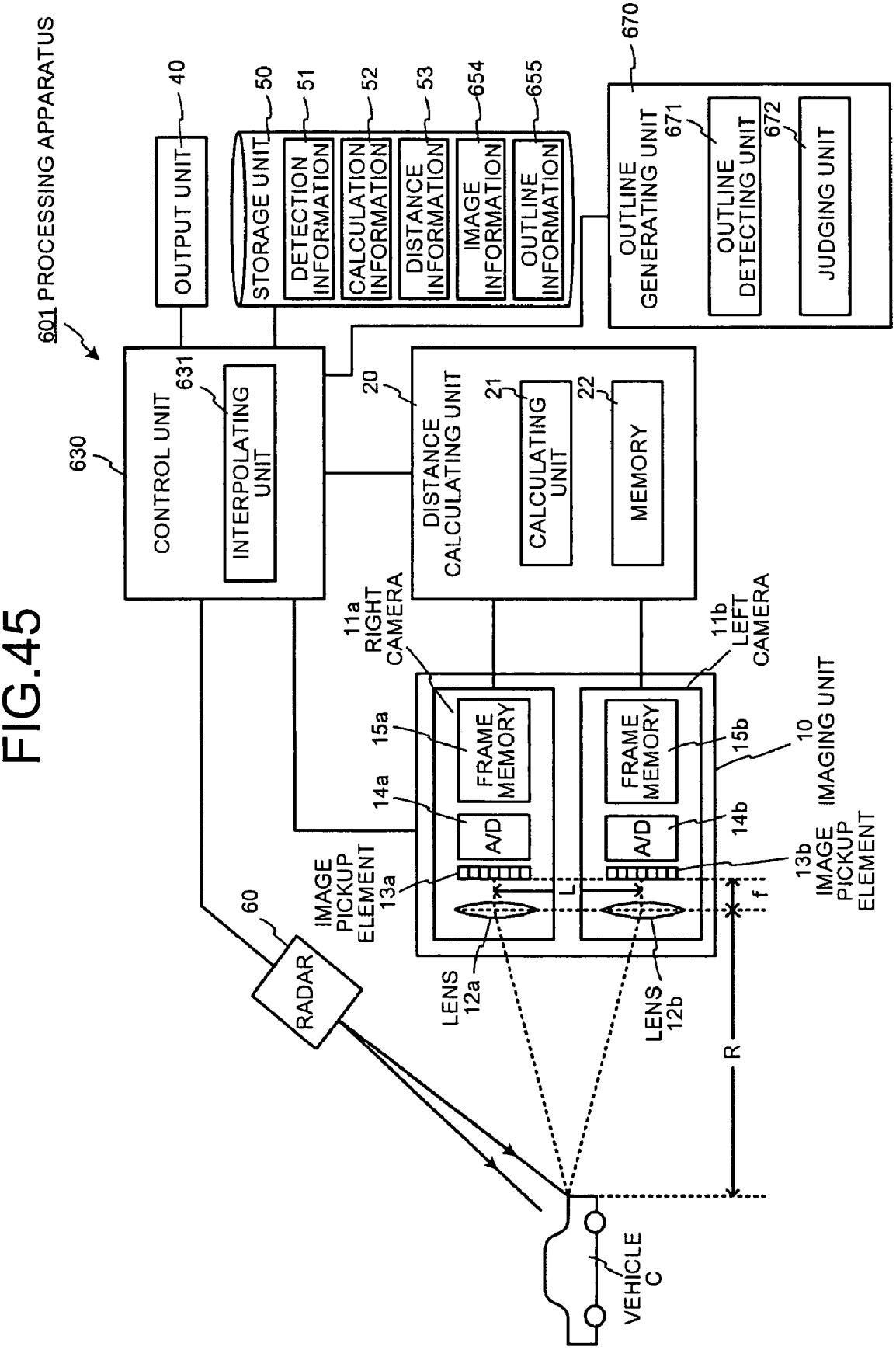
FIG. 45 is a block diagram showing a schematic configuration of a processing apparatus according to a sixth embodiment.

Next, a processing apparatus according to a sixth embodiment will be described. FIG. 45 is a block diagram showing a schematic configuration of the processing apparatus according to the sixth embodiment. As shown in FIG. 45, a processing apparatus 601 according to the sixth embodiment is provided with a control unit 630 in place of the control unit 30 in the distance measuring apparatus 1 shown in FIG. 1. Further, the processing apparatus 601 is provided with an outline generating unit 670 for generating outline information indicating an outline of the object located in the imaging field. Meanwhile, the storage unit 50 stores various information such as image information 654 output from the imaging unit 10 and outline information 655 output from the outline generating unit 670, together with the detection information 51 output from the radar 60, the calculation information 52 output from the distance calculating unit 20 and the distance information 53 output from the interpolating unit 31.

The control unit 630 has the function similar to that of the control unit 30 and is provided with an interpolating unit 631. The interpolating unit 631 has the function similar to that of the interpolating unit 31 shown in FIG. 1 and generates the distance information 53 obtained by interpolating between the detected values in the detection range of the radar 60 with the calculated value of the distance calculating unit 20 by using the calculation information 52 output from the distance calculating unit 20 and the detection information 51 output from the radar 60. In this distance information 53, the distance value and the positional information corresponding to the distance value are related to each other.

The outline generating unit 670 is provided with an outline detecting unit 671 and a judging unit 672. The outline generating unit 670 generates outline information 655 indicating the outline of the object in the imaging field and outputs the same to the control unit 630. The outline detecting unit 671 generates a candidate of the outline information indicating the outline of the object in the imaging field by using the distance information 53. The distance information 53 is interpolated between the detected values detected by the radar 60 with the calculated value calculated by the distance calculating unit 20. For example, the outline detecting unit 671 generates the outline information in which an edge portion of the object is obtained, by using quadratic differential calculus for obtaining a quadratic changing point of each distance value of the distance information 53. The quadratic differential calculus is for detecting a changing point of the distance value, that is to say, the edge portion in which the distance value drastically changes, by using a predetermined differential filter. Meanwhile, the outline detecting unit 671 may generate the outline information by using a method for obtaining a portion corresponding to the distance value having the largest value out of the distance values located in the vicinity as the edge portion, as the method for detecting the outline of the object. In this method, the distance values are sequentially compared and a portion indicating the largest distance value is detected as the edge portion. Also, the outline detecting unit 671 may obtain the changing point of the distance value by using various distance value changing patterns to detect the changing point as the edge portion and obtain the outline information based on the detected edge portion or the like.

The judging unit 672 judges whether the candidate of the outline information generated by the outline detecting unit 671 conforms to another outline information indicating the outline obtained based on the image signal group output from the imaging unit 10 or not. For example, the judging unit 672 uses color information of each image signal in the image signal group as another outline information. The judging unit 672 extracts the color information of each image signal corresponding to the edge portion of the outline information generated by the outline detecting unit 671 out of the image signal group and judges whether the edge portion of the outline information is sufficiently close to the changing portion of the color information or not as conformity condition. In addition, the judging unit 672 judges that the outline information is proper because the position of the edge portion in the outline information is considered to be accurate, when the changing portion of the color information conforms to the edge portion of the outline information. On the other hand, the judging unit 672 judges that the outline information is not proper because the position of the edge portion in the outline information is not always accurate, when the judging unit 672 judges that the changing portion of the color information does not conform to the edge portion of the outline information. The outline generating unit 670 outputs the outline information judged to conform to another outline information indicating the outline obtained based on the image signal group in the judging unit 672 out of the candidates of the outline information, that is to say, the candidate judged to be proper by the judging unit 672, as the outline information 655.

Figure 46:
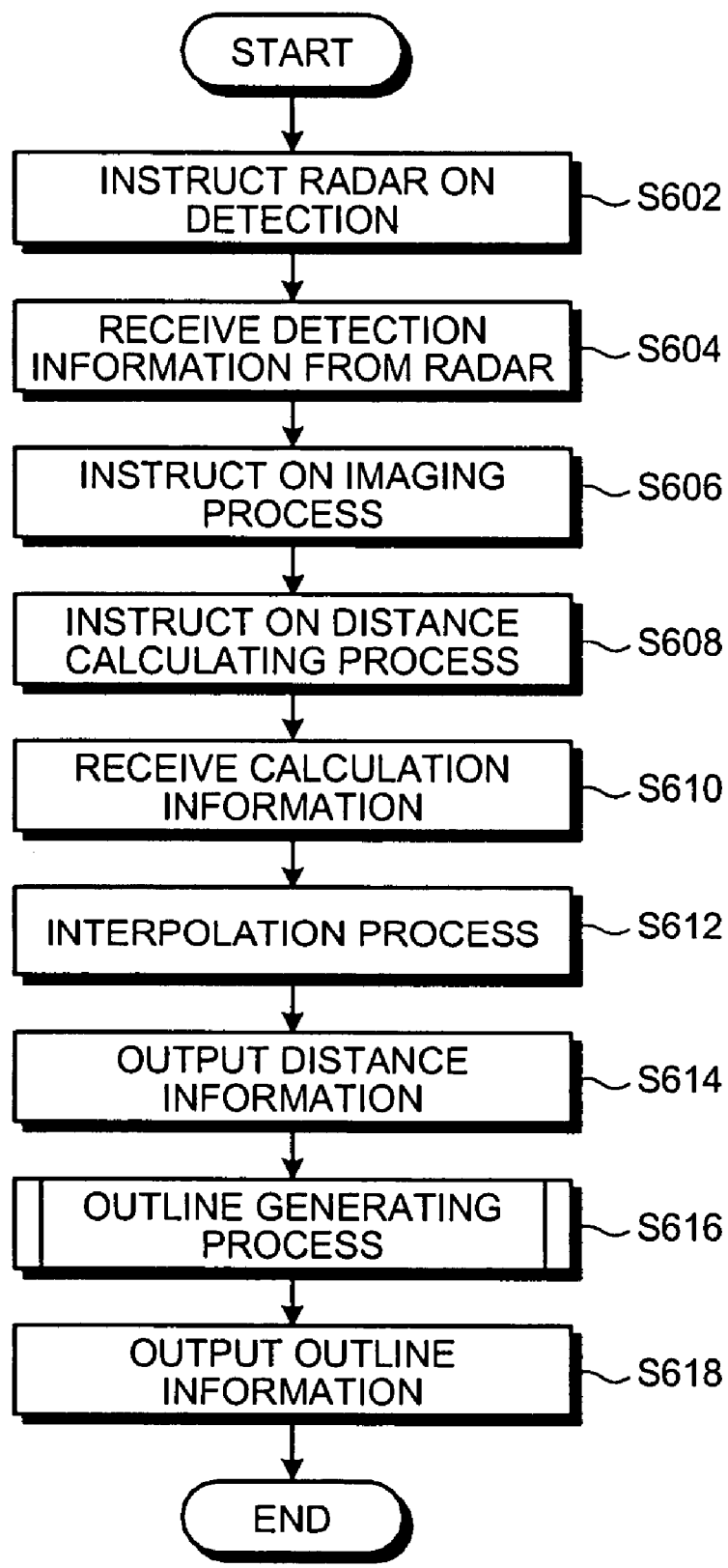
FIG. 46 is a flowchart showing a procedure until output of outline information is completed in the processing apparatus shown in FIG. 45.

Next, a procedure until the outline generating unit 670 outputs the outline information 655 out of the procedures performed by the processing apparatus 601 will be described. FIG. 46 is a flowchart showing a procedure until the outline generating unit 670 completes the output of the outline information 655 in the processing apparatus 601.

As shown in FIG. 46, the control unit 630 instructs the radar 60 on the detection process for detecting the distance to the object located in the detection range (step S602), and the radar 60 performs the detection process and outputs the detection information 51 to the control unit 630. The control unit 630 receives the detection information 51 output from the radar 60 (step S604). The control unit 630 instructs the imaging unit 10 on the imaging process (step S606) and the imaging unit 10 performs the imaging process for imaging the predetermined imaging field under the control by the control unit 630, and the right and left cameras 11a and 11b output the image signal group, respectively. After that, the control unit 630 instructs the distance calculating unit 20 on the distance calculation process for processing the image signal group output from the imaging unit 10 to calculate the distance to the object located in the imaging field (step S608). The distance calculating unit 20 performs the distance calculation process following the instruction by the control unit 630 and outputs the calculation information 52 in which each calculated value and the positional information in the imaging field are related to each other to the control unit 630. As a result, the control unit 630 receives the calculation information 52 output from the distance calculating unit 20 (step S610).

Figure 47:
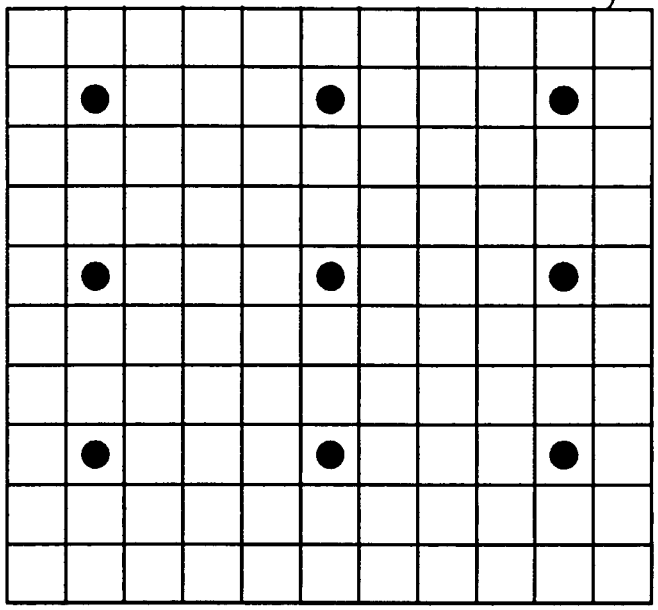
FIG. 47 is a view showing one example of detection information output from radar shown in FIG. 45.
Figure 48:
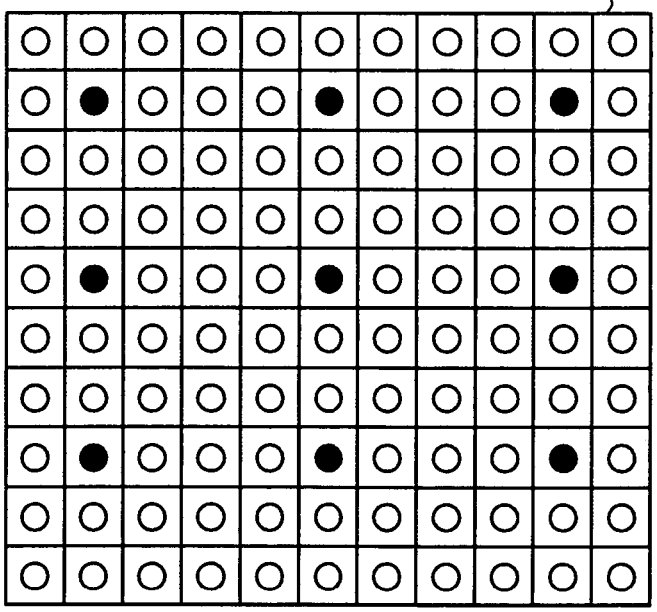
FIG. 48 is a view showing one example of distance information shown in FIG. 45.

The interpolating unit 631 performs the interpolation process for generating the distance information 53 obtained by interpolating between each detected value of the detection information 51 with the calculated values of the calculation information 52 (step S612). In general, the detection information 51 output from the radar 60 is such that intervals between each radar detection point are large and the detected values are sparsely located as in the detected data 651a shown in FIG. 47. The interpolating unit 631 generates the detailed distance data 653a in which each distance value is densely located as shown in FIG. 48, by interpolating between each radar detection point of such detected data 651a with the calculation points of the calculation information 52. The interpolating unit 631 outputs the generated distance information 53 after performing the interpolation process (step S614).

After that, the outline generating unit 670 performs the outline generating process for generating the outline information indicating the outline of the object in the imaging field by using the distance information 53 output from the interpolating unit 631 (step S616) and outputs the outline information 655 (step S618).

Figure 49:
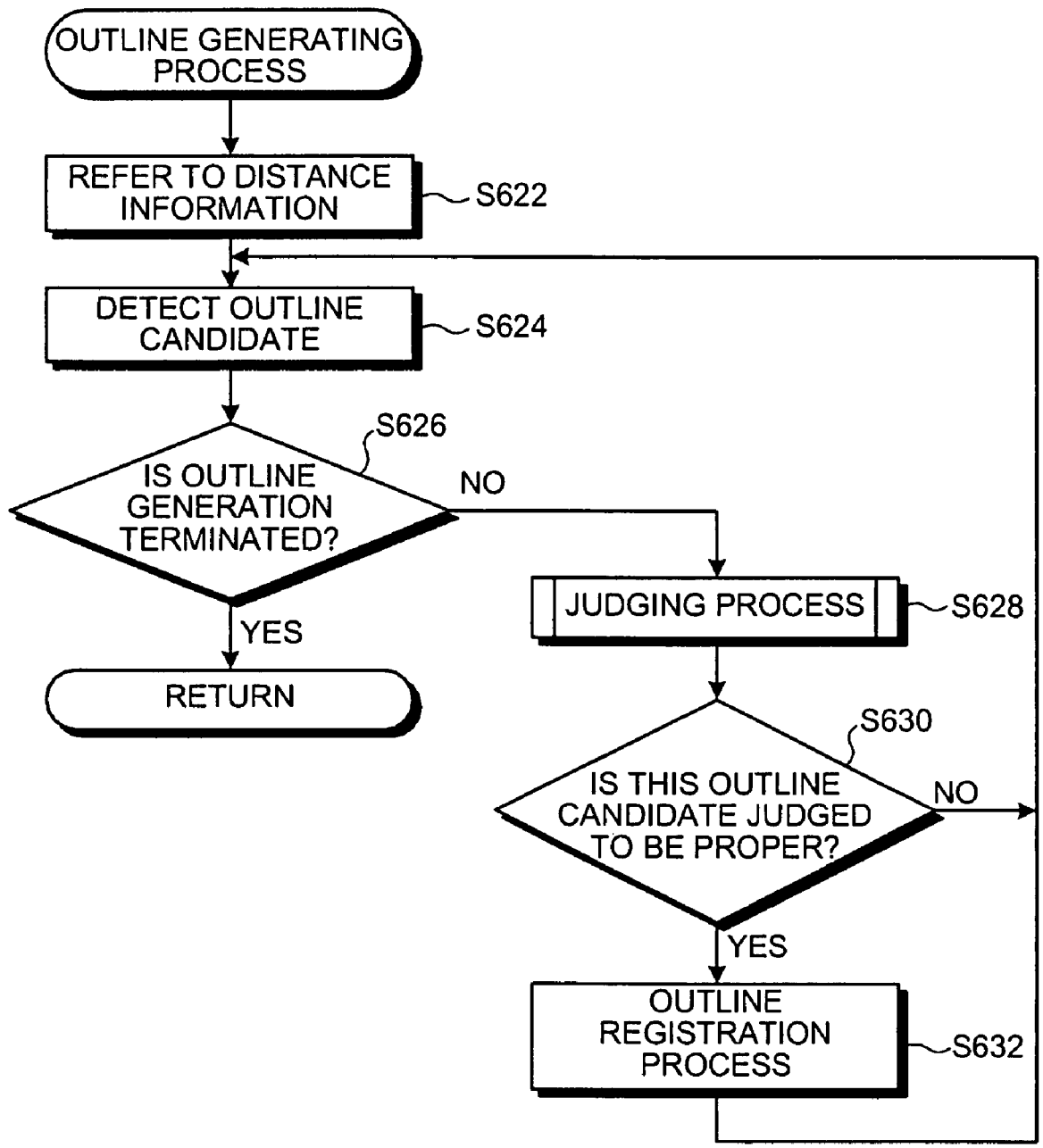
FIG. 49 is a flowchart showing a procedure of an outline generating process shown in FIG. 46.

Next, the outline generating process shown in FIG. 46 will be described. FIG. 49 is a flowchart showing a procedure of the outline generating process shown in FIG. 46. First, the outline detecting unit 671 refers to the distance information 53 output from the interpolating unit 631 (step S622). The outline detecting unit 671 detects the candidate of the outline information indicating the outline of the object located in the imaging field based on the distance information 53 (step S624).

After that, the outline generating unit 670 judges whether generation of all the outline information for the object located in the imaging field is terminated or not (step S626). Then, the judging unit 672 performs the judging process for judging whether the candidate of the outline information detected by the outline detecting unit 671 conforms to another outline information indicating the outline obtained based on the image signal group or not and judging whether the candidate of the outline information is proper or not (step S628), when it is judged that the generation of all the outline information for the object located in the imaging field is not terminated by the outline generating unit 670 (step S626: No).

The judging unit 672 judges whether the candidate of the outline information is proper (step S630), and when the judging unit 672 judges that the candidate of the outline information is not proper (step S630: No), the procedure shifts to a step S624, and the outline generating unit 670 makes the outline detecting unit 671 to detect new candidate of the outline information.

On the other hand, when the judging unit 672 judges that the candidate of the outline information is proper (step S630: Yes), the outline generating unit 670 registers the candidate of the outline information, which is judged to be proper by the judging unit 672 (step S632) and the procedure shifts to the step S624, and the outline generating unit 670 makes the outline detecting unit 671 to detect new candidate of the outline information.

Also, when it is judged that generation of all the outline information for the object located in the imaging field is terminated (step S626: Yes), the outline generating unit 670 makes the outline information 655 having the candidate of each outline information judged to be proper by the judging unit 672.

Figures 50, 51:
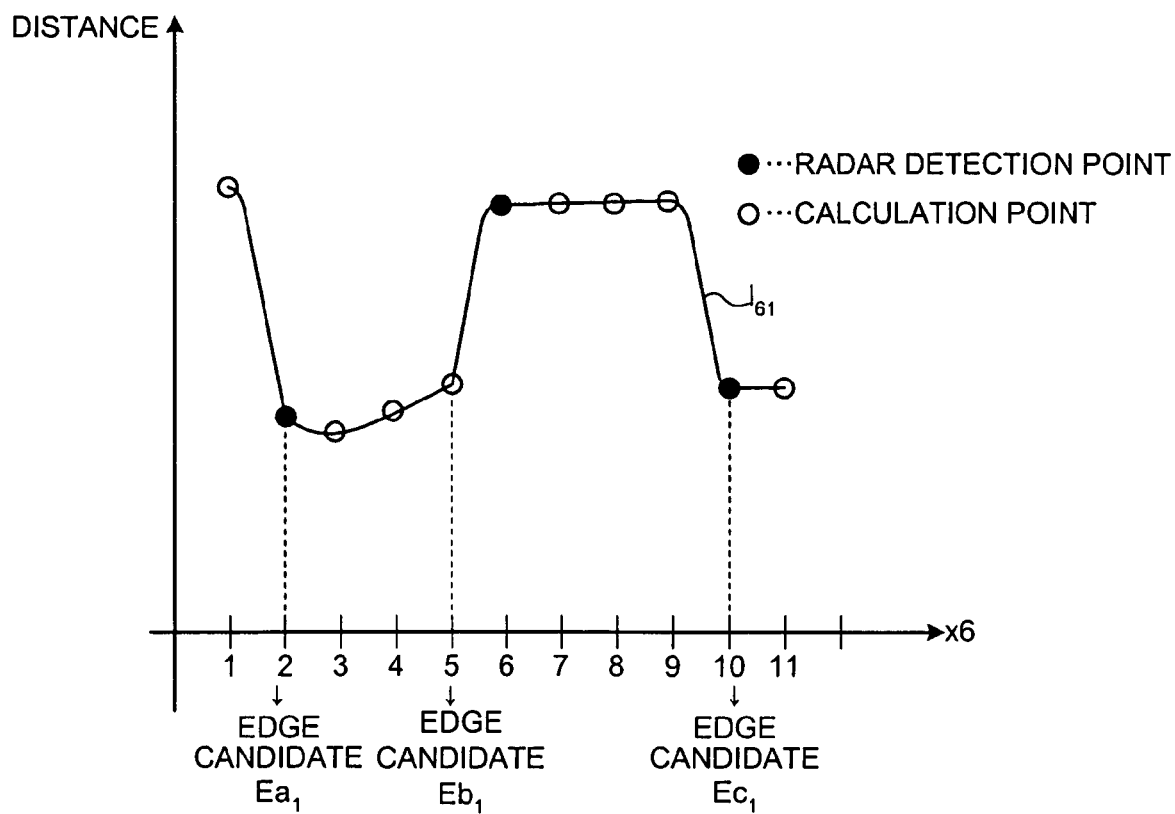
FIG. 50 is a view showing one example of the distance information shown in FIG. 45.
FIG. 51 is a view illustrating the outline generating process shown in FIG. 46.

Next, an outline candidate detection process shown in FIG. 49 will be described in detail. FIG. 50 is a view showing one example of the distance information to which the outline generating unit 670 refers. The outline generating unit 670 detects the candidate of the outline information for each line in the distance data 653b shown in FIG. 50 and outputs an information group provided with the outline information corresponding to all the lines as one outline information 655.

For example, a case in which the outline detecting unit 671 detects the outline information in x6 direction shown in FIG. 50 will be described. The outline detecting unit 671 obtains a change in distance value corresponding to the x6 direction based on the distance value in the x6 direction shown in FIG. 50. Then, the outline detecting unit 671 detects a curved line $l_{61}$ as shown in FIG. 51 from the change in distance value as the candidate of the outline information. Also, the outline detecting unit 671 obtains the changing point of the distance value by using the quadratic differential calculus to the distance value in the x6 direction to obtain edge candidates $Ea_1$, $Eb_1$ and $Ec_1$ shown in FIG. 51. The outline detecting unit 671 outputs the curved line $l_{61}$ shown in FIG. 51 as the candidate of the outline information and outputs the edge candidates $Ea_1$, $Eb_1$ and $Ec_1$ obtained by using the quadratic differential calculus. As will be described later, the judging unit 672 judges whether the outline information shown by the curved line $l_{61}$ is proper of not by comparing the edge candidates $Ea_1$, $Eb_1$ and $Ec_1$ with the color information of the image signal.

Figure 52:
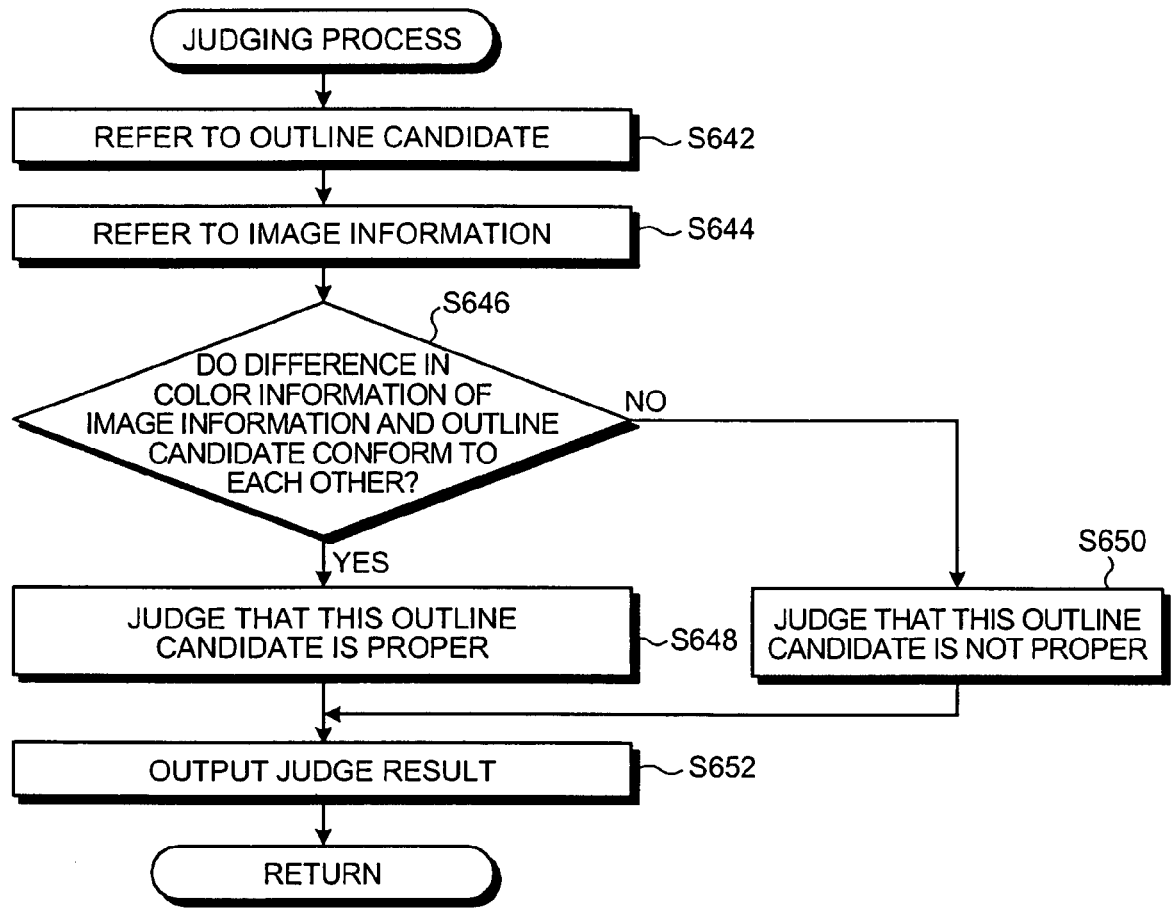
FIG. 52 is a flowchart showing a procedure of a judging process shown in FIG. 49.

Next, the judging process shown in FIG. 49 will be described. FIG. 52 is a flowchart showing a procedure of the judging process shown in FIG. 49. As shown in FIG. 52, the judging unit 672 first refers to the candidate of the outline information generated by the outline detecting unit 671 (step S642). The judging unit 672 refers to the image information 654 including the image signal group output from the imaging unit 10 (step S644). This image information 654 corresponds to the imaging field of the imaging unit 10.

After that, the judging unit 672 compares the edge portion in the candidate of the outline information and the portion in which difference in color information of the adjacent region is large, which corresponds to the edge portion in the image information 654, and judges whether the difference in color information of the image information 654 and the edge portion in the candidate of the outline information conform to each other or not (step S646).

In general, a contrast of the color drastically changes with a boarder, which is the outline of the object displayed on the image. Therefore, a portion in which the difference in color information, for example, the difference of the color concentration value, is large in the image information 654, is said to be the edge portion of the object displayed on the image. Therefore, when the judging unit 672 judges that the difference in color information of the image information 654 and the edge portion in the candidate of the outline information conform to each other (step S646: Yes), it is considered that the edge portion accurately corresponds to the outline of the object. On the other hand, when the judging unit 672 judges that the difference in color information of the image information 654 and the edge portion in the candidate of the outline information do not conform to each other (step S646: No), it is considered that the edge portion does not accurately correspond to the outline of the object.

Therefore, the judging unit 672 judges that the candidate of the outline information including such edge portion is proper (step S648), when it judges that the difference in color information of the image information 654 and the edge portion in the candidate of the outline information conform to each other (step S646: Yes). Also, when the judging unit 672 judges that the difference in color information of the image information 654 and the edge portion in the candidate of the outline information do not conform to each other (step S646: No), it judges that the candidate of the outline information including such edge portion is not proper (step S650). After that, the judging unit 672 outputs the judge result for the candidate of the outline information (step S652) and terminates the judging process.

For example, a case in which the judging process is performed for the edge candidate $Eb_1$ shown in FIG. 51 will be described. First, the judging unit 672 obtains to which region of the referred image information, the adjacent region indicated by the positional information corresponds, based on the positional information of the distance value at which the edge candidate $Eb_1$ is detected. In this case, the judging unit 672 uses the color information of the image signal located in the region $A_{61}$ shown in FIG. 53. The region $A_{61}$ is the region located in the vicinity of the image signal, position of which is the same as that of the edge candidate $Eb_1$. The judging unit 672 obtains the difference in concentration value in the color information between each image signal located in the region $A_{61}$, and judges whether a position of a pair of the image signals between which the difference in the concentration value is the largest and the position of the edge candidate $Eb_1$ conform to each other or not. In a case in which the position of the pair of the image signals between which the difference in the concentration value is the largest and the position of the edge candidate $Eb_1$ substantially conform to each other, the judging unit 672 judges that the difference in the color information of the image information 654 and the edge portion in the candidate of the outline information conform to each other (step S646: Yes). On the other hand, in a case in which the position of the pair of the image signals between which the difference in the concentration value is the largest and the position of the edge candidate $Eb_1$ hardly conform to each other, the judging unit 672 judges that the difference in the color information of the image information 654 and the edge portion in the candidate of the outline information do not conform to each other (step S646: No).

Also, the judging unit 672 performs the judgment process by using the color information of the image signal located in the region $A_{62}$ located in the vicinity of the image signal, position of which is the same as that of the edge candidate $Ec_1$, for the edge candidate $EC_1$. In this manner, it is judged whether the position at which the difference in color information between the image signals is the largest in the region corresponding to the position of the edge candidate out of the image signal group and the position of the edge candidate conform to each other or not, for each edge candidate.

Figure 54:
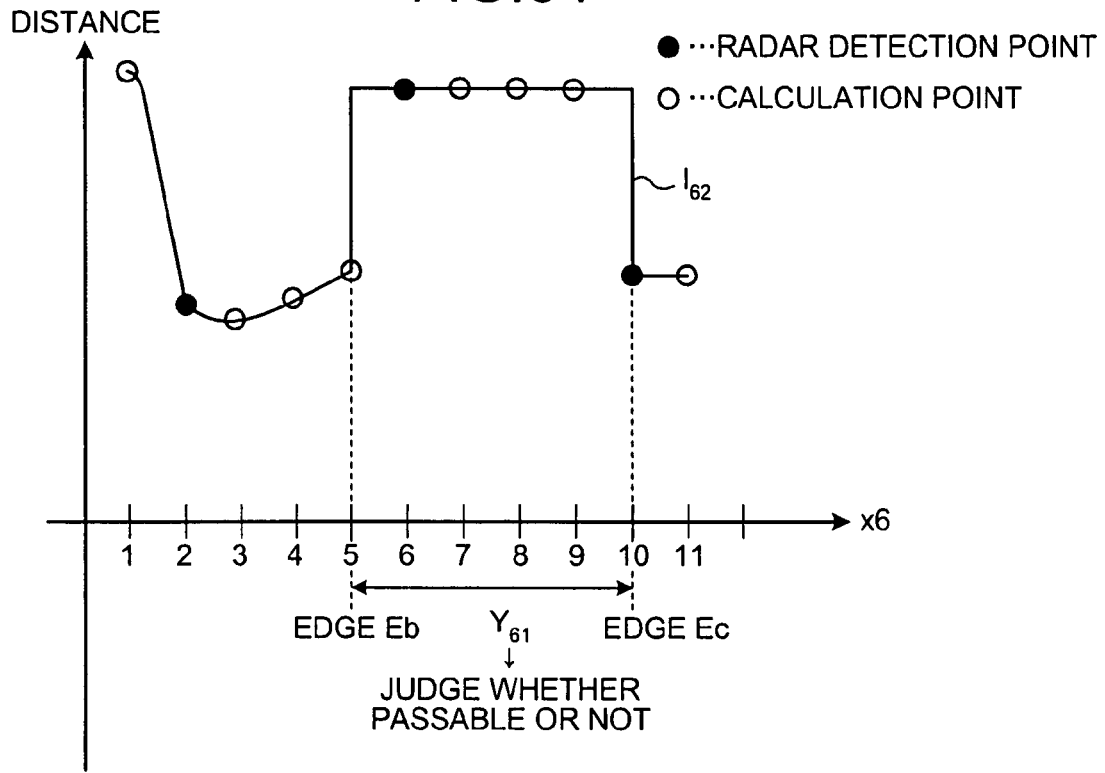
FIG. 54 is a view illustrating the outline information shown in FIG. 45.

Then, as a result of performing the judgment process, the outline generating unit 670 generates the outline information having edges Eb and Ec accurately corresponding to the outline of the object as indicated by the curved line $l_{62}$ shown in FIG. 54. According to the outline information corresponding to the curved line $l_{62}$, a width $Y_{61}$ between the borders of the object corresponding to the edges Eb and Ec may be accurately obtained, and for example, it becomes possible to properly perform the judgment whether own vehicle may pass or not.

For example, in a case shown in FIG. 54, a section, end points of which are the edges Eb and Ec, which are the obtained outline elements, is considered. That is to say, on a left portion of the edge Eb, an interpolation curve is composed of the curved lines interpolating the distance data points of the point group 1, 2, 3, 4 and 5 on the x6 axis. On the other hand, on a right portion of the edge Ec, the interpolation curve is composed of the curved lines interpolating the points of the point group 10, 11, or the like on the x6 axis. On the other hand, in the section interposed between the edges Eb and Ec, an object space is composed of the curved lines extrapolated by the point group 6, 7, 8 and 9 on the x6 axis, thereby defining the border of the object. Herein, although the method for interpolating or extrapolating by the curved lines has been presented as the method of generating the outline, another method may be possible. For example, in a case in which a schematic shape of the target is known in advance, it is possible to determine the object width $Y_{61}$ or the like by directly estimating a parameter approximating the form.

In this manner, in the sixth embodiment, it is possible to generate the detailed outline information by obtaining the distance information 53 obtained by interpolating between the detected values of the radar 60 with the calculated values of the distance calculating unit 20. Also, in the sixth embodiment, by judging whether each edge candidate in the candidate of the outline information conforms to another outline information such as the difference in color information in the image signal group or not, it is judged whether the candidate of the outline information is proper or not, and the outline information judged to be proper is output. Therefore, by using the outline information 655 output from the processing apparatus 601, it becomes possible to accurately perform various judging processes such as to judge whether the vehicle may pass or not.

Meanwhile, although the case in which the outline information in the x6 direction shown in FIG. 50 is generated has been described in the outline generating process in the sixth embodiment, there is a case in which the outline information in a direction corresponding to another line in the transverse direction is generated, of course, and there is a case in which the outline information in a direction corresponding to each row in the vertical direction is generated. In addition, in the outline forming process in the sixth embodiment, there is a case in which the outline information in an oblique direction is generated.

Figure 53:
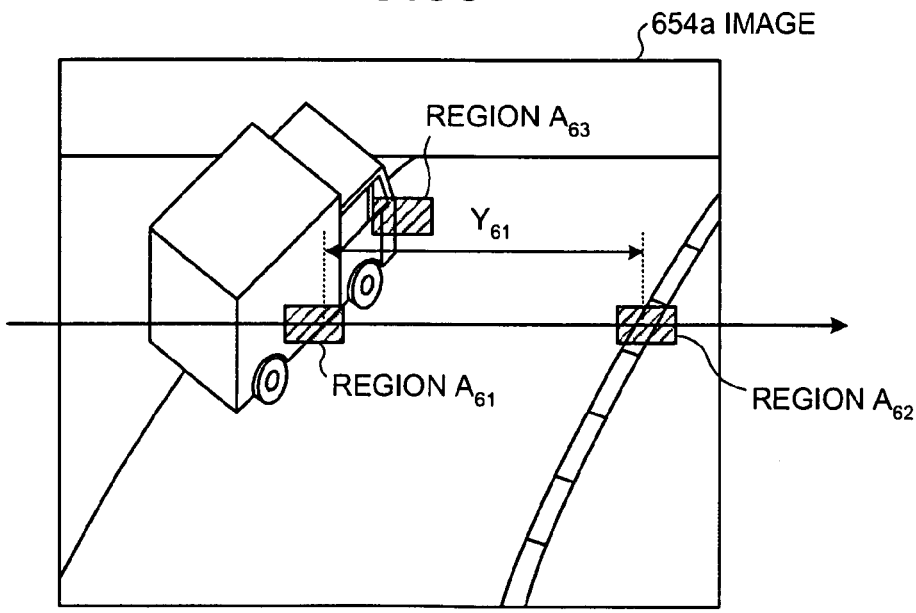
FIG. 53 is a view illustrating the judging process shown in FIG. 49.
Figure 55:
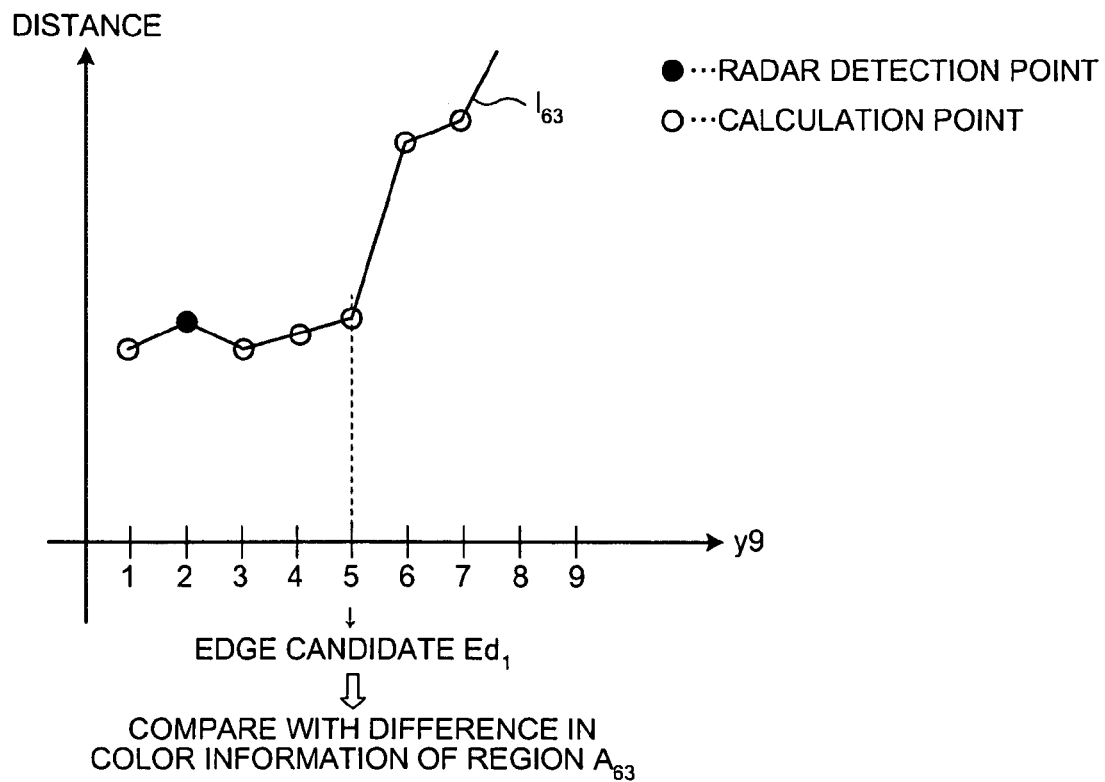
FIG. 55 is a view illustrating the outline generating process shown in FIG. 46.

For example, a case in which the outline generating unit 670 generates the outline information corresponding to a y9 direction shown in FIG. 50 will be described. In this case, the outline detecting unit 671 obtains the change in the distance value corresponding to the y9 direction based on the distance value in the y9 direction shown in FIG. 50, and detects the curved line $l_{63}$ shown in FIG. 55 as the candidate of the outline information. Also, the outline detecting unit 671 obtains the edge candidate $Ed_1$ from the changing point of the distance value and outputs the same together with the candidate of the outline information. Next, the judging unit 672 performs the judging process based on the color information of the image signal included in the region $A_{63}$ in the vicinity of the image signal, position of which is the same as that of the edge candidate $Ed_1$, as shown in FIG. 53. In this case, the judging unit 672 obtains the difference in the concentration value in the color information of the image signal included in the region $A_{63}$ shown in FIG. 53, as in the above-described judging process. After that, the judging unit 672 judges whether the outline candidate is proper or not by judging whether the position of the pair of the image signals between which the difference in the concentration value is large and the position of the edge candidate $Ed_1$ are substantially conform to each other or not.

Also, in the present embodiment, each process is performed after obtaining conformity between the positional relationship in the image information group picked up by the imaging unit 10 and the positional relationship in the detection range in the radars 60 and 560 in advance as follows. For example, the distance measuring apparatuses 1, 201, 301, 401 and 501 and the processing apparatus 601 perform the imaging process in the imaging unit 10 and the detection process in the radars 60 and 560 and obtain the position of the known object in the imaging unit 10 and the position of the known object in the radars 60 and 560 for the object whose form is known. After that, in the distance measuring apparatuses 1, 201, 301, 401 and 501 and the processing apparatus 601, the relationship between the position of the known object in the imaging unit 10 and the position of the known object in the radars 60 and 560 is obtained by using a least-square method or the like, and the positional relationship in the image information group picked up in the imaging unit 10 and the positional relationship in the detection range in the radars 60 and 560 are conformed.

In addition, in the distance measuring apparatuses 1, 201, 301, 401 and 501 and the processing apparatus 601, even in a case in which the original imaging point of the imaging unit 10 and the original detection point of the radars 60 and 560 are out of alignment, if the distance from the imaging point and the detection point to the distance measuring apparatuses 1, 201, 301, 401 and 501 and the processing apparatus 601 is sufficiently large, it can be considered that the original imaging point and the original detection point substantially overlap with each other. Further, in a case in which the conformity between the positional relationship in the image information group picked up at the imaging unit 10 and the positional relationship in the detection range in the radars 60 and 560 is accurately performed, it is possible to compensate misalignment between the original imaging point and the original detection point by geometric conversion.

In addition, although the case in which each radar detection point is located at a predetermined intervals on the pixel line on which each image signal is located has been described regarding the distance measuring apparatuses 1, 201, 301, 401 and 501 and the processing apparatus 601 according to Embodiments 1 to 6, it is not always true that each radar detection point exists on the pixel line on which each image signal output from imaging unit 10 is located. In such a case, the interpolating units 31, 331, 431, 531 and 631 and the complement unit 231 may obtain the radar interpolating values of the same pixel line as each image signal, which is to be the judging target and the correction target, by using the linear interpolation or the like based on a plurality of radar detection points located in the vicinity of each image signal, and use this interpolated values.

Figure 56:
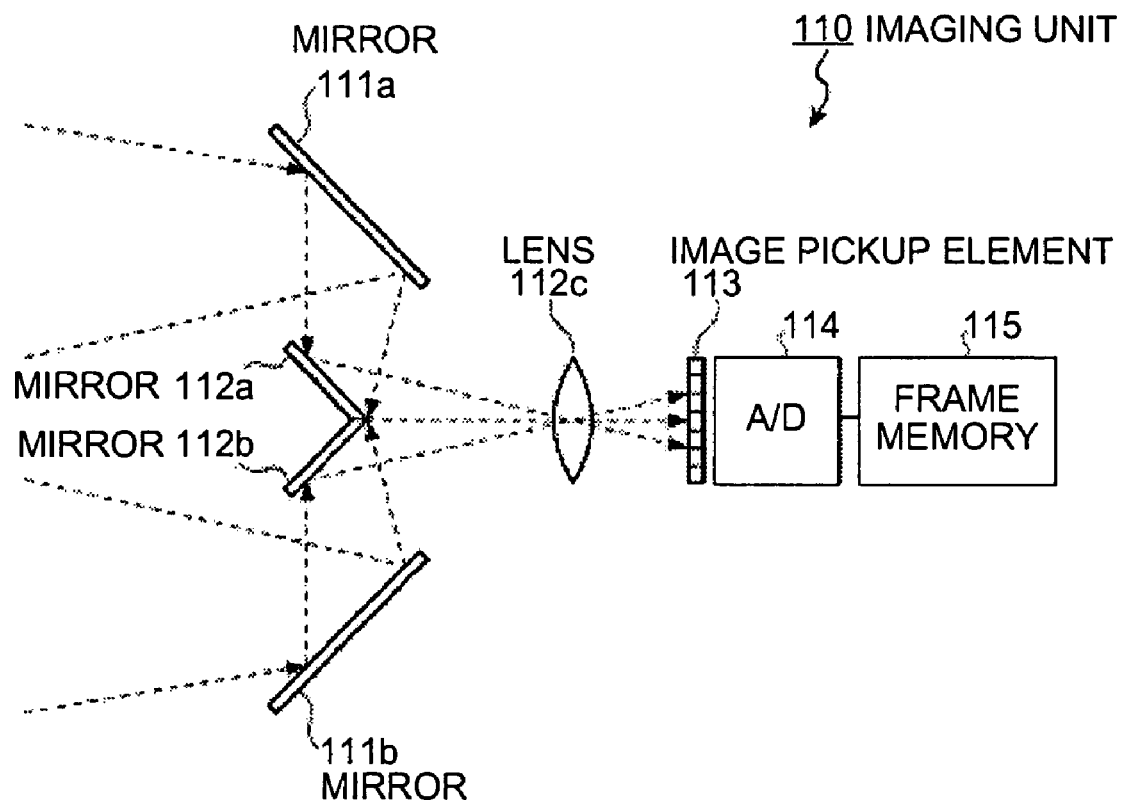
FIG. 56 is a block diagram showing another example of a schematic configuration of an imaging unit shown in FIG. 1.
Figure 57:
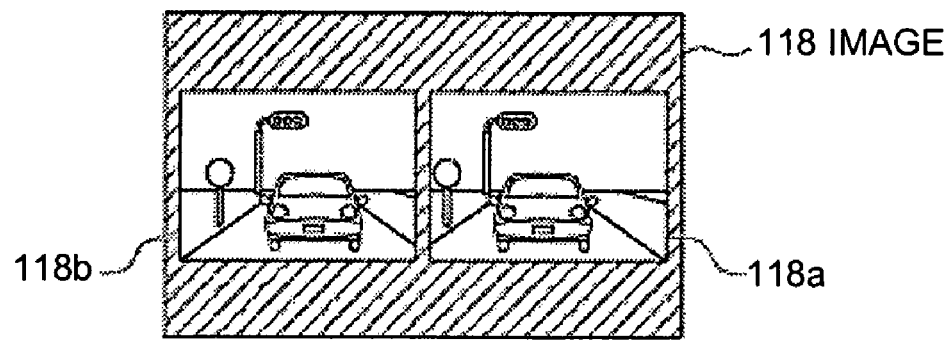
FIG. 57 is a view showing one example of an image output from the imaging unit shown in FIG. 56.

Also, although the imaging unit 10 provided with a pair of image pickup elements 13a and 13b corresponding to each of a pair of lenses 12a and 12b has been described as the imaging unit in Embodiments 1 to 6, the invention is not limited to this, and this may be an imaging unit 110 having a pair of waveguide optical systems and imaging regions corresponding to each waveguide optical system and is provided with the image pickup element for converting an optical signal guided by each waveguide optical system to an electrical signal in each imaging region may be used, as shown in FIG. 56 (for example, refer to Japanese Patent Application Laid-Open No. 8-171151 by the applicant of this application). As shown in FIG. 56, the imaging unit 110 is provided with a pair of mirrors 111a and 111b, mirrors 112a and 112b corresponding to the mirrors 111a and 111b, respectively, a lens 112c, an image pickup element 113 for converting light focused by the lens 112c to an analog image signal, an A/D converting unit 114 for changing the analog image signal output from the image pickup element 113 to a digital image signal, and a frame memory 115 for storing the digital signal. The mirrors 111a and 111b receive the light from a subject such as the vehicle C, and the mirrors 112a and 112b reflect the light received by the mirrors 111a and 111b to the lens 112c. Therefore, images corresponding to each optical system are provided on the image pickup element 113, respectively. Therefore, the imaging unit 110 outputs an image 118 including images 118a and 118b, as shown in FIG. 57. It is possible to calculate the distance value corresponding to each image signal in the distance calculating units 20 and 220 based on such images 118a and 118b.

Also, although the distance measuring apparatuses 1, 201, 301, 401 and 501 provided with a plurality of cameras and the processing apparatus 601 have been described in Embodiments 1 to 6, the invention is not limited to this and this may be adopted to the processing apparatus provided with a single camera. In this case, the distance calculating units 20 and 220 calculate the distance in the imaging field by using a shape from focus method, a shape from defocus method, a shape from motion method or a shape from shading method based on an image signal group output from the imaging unit. Meanwhile, the shape from focus method is the method for obtaining the distance from the focus position at which it best focuses. Also, the shape from defocus method is the method in which a relative blurring amount is obtained from a plurality of images having different focus distances and the distance is obtained from a correlation between the blurring amount and the distance. Also, the shape from motion method is the method to obtain the distance to the object based on a movement locus of a predetermined feature point in a plurality of temporally continuous images. Further, the shape from shading method is the method to obtain the distance to the object based on a shade in the image, a reflecting property and light source information of the object to be the target.

Also, the imaging unit 10 may compose a so-called trinocular stereo camera configuration, and a so-called quadrocular stereo camera configuration. In a case of the imaging unit which is the trinocular stereo camera configuration or the quadrocular stereo camera configuration, it becomes possible to realize the processing apparatus capable of obtaining highly reliable and stable distance calculation result by performing a three-dimensional reconfiguration processor the like. Specifically, in a case in which a plurality of cameras are arranged so as to have base line lengths in two directions, even when a plurality of objects are arranged in a complicated arrangement, the three-dimensional reconfiguration process becomes possible and the distance calculation result may be stably obtained. And in this case, it becomes possible to adopt a multi base line method in which a plurality of cameras are arranged in one base line direction, thereby realizing the high-accuracy distance measurement.

Also, although the distance measuring apparatuses 1, 201, 301, 401 and 501 and the processing apparatus 601 have been described in Embodiments 1 to 6, a processing apparatus provided with a detecting unit realized by a semiconductor laser element for sending an infrared light or a visible light, a light source such as a light-emitting diode or a laser diode, and a light receiving element such as a photo sensor for receiving the reflected light from the object, or a distance measuring apparatus provided with a radar-type detecting unit for measuring the distance by a delay of the reflected wave by using a light wave, a micro wave, a millimeter wave, or a silent sound, in place of the radars 60 and 560.

Also, although the distance measuring apparatuses 1, 201, 301, 401 and 501 and the processing apparatus 601 mounted on the vehicle have been described as Embodiments 1 to 6, the invention is not limited to this and this may be adopted to the processing apparatus mounted on another mobile object. Also, this is not limited to the processing apparatus mounted on the mobile object, and may be adopted to the processing apparatus performing the distance measuring in the detection range in a condition fixed to a predetermined position, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distance measuring apparatus comprising:
a detecting unit which detects first distance information to an object located in a predetermined detection range based on a difference between an outgoing wave sent to the object and a reflected wave from the object;
an imaging unit which generates an image signal group corresponding to a predetermined imaging field including the predetermined detection range;
a calculating unit which calculates second distance information to the object located in the imaging field based on the image signal group;
an interpolating unit which either interpolates the second distance information by using the first distance information, or interpolates the first distance information by using the second distance information; and
a calculation range setting unit which sequentially sets a calculation range in the calculating unit based on the detected value or the calculated value located in a vicinity of an image signal which is to be a calculation target,
wherein the interpolating unit interpolates between detected values by the detecting unit with calculated values by the calculating unit, and
wherein the calculating unit detects an image signal satisfying a predetermined condition out of the image signal group corresponding to the calculation range, and calculates the second distance information to the object located in the imaging field.

2. A distance measuring apparatus comprising:
a detecting unit which detects first distance information to an object located in a predetermined detection range based on a difference between an outgoing wave sent to the object and a reflected wave from the object;
an imaging unit which generates an image signal group corresponding to a predetermined imaging field including the predetermined detection range;
a calculating unit which calculates second distance information to the object located in the imaging field based on the image signal group;
an interpolating unit which either interpolates the second distance information by using the first distance information, or interpolates the first distance information by using the second distance information; and
a reliability obtaining unit which obtains a reliability of a calculated value by the calculating unit,
wherein the interpolating unit outputs distance information in which the calculated value, whose reliability obtained by the reliability obtaining unit does not satisfy evaluation criterion, is replaced with a detected value by the detecting unit corresponding to the calculated value, and
wherein the interpolating unit sets as the detection range of the detecting unit a range corresponding to the calculated value whose reliability does not satisfy the evaluation criterion, and the detecting unit detects the first distance information to the object located in the detection range.

3. A distance measuring apparatus comprising:
a detecting unit which detects first distance information to an object located in a predetermined detection range based on a difference between an outgoing wave sent to the object and a reflected wave from the object;
an imaging unit which generates an image signal group corresponding to a predetermined imaging field including the predetermined detection range;
a calculating unit which calculates second distance information to the object located in the imaging field based on the image signal group;
an interpolating unit which either interpolates the second distance information by using the first distance information, or interpolates the first distance information by using the second distance information,
wherein the interpolating unit generates distance information in which information in the detection range obtained by interpolating between detected values by the detecting unit with calculated values by the calculating unit and information outside the detection range including the calculated values corresponding to the outside of the detection range are combined, and
wherein the distance measuring apparatus further comprises a detection range searching unit which searches for a detection range of the detecting unit, wherein the interpolating unit obtains the information in the detection range and the information outside the detection range based on a search result by the detection range searching unit.

4. A distance measuring apparatus comprising:
a detecting unit which detects first distance information to an object located in a predetermined detection range based on a difference between an outgoing wave sent to the object and a reflected wave from the object;
an imaging unit which generates an image signal group corresponding to a predetermined imaging field including the predetermined detection range;
a calculating unit which calculates second distance information to the object located in the imaging field based on the image signal group; and
an interpolating unit which either interpolates the second distance information by using the first distance information, or interpolates the first distance information by using the second distance information,
wherein:
the imaging unit generates as the image signal group a first image signal group picked up through a first optical path and a second image signal group picked up through a second optical path, and
the calculating unit detects the image signal matched with an arbitrary image signal of the first image signal group from the second image signal group, and calculates the second distance information to the object located in the imaging field based on an amount of movement of the detected image signal from the arbitrary image signal.

* * * * *